(12) United States Patent
Dennis

(10) Patent No.: US 10,107,028 B2
(45) Date of Patent: *Oct. 23, 2018

(54) METHOD OF MAKING VACUUM INSULATED GLASS (VIG) WINDOW UNIT

(71) Applicant: Guardian Glass, LLC, Auburn Hills, MI (US)

(72) Inventor: Timothy A. Dennis, Bloomdale, OH (US)

(73) Assignee: Guardian Glass, LLC, Auburn Hills, MI (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/090,821

(22) Filed: Apr. 5, 2016

(65) Prior Publication Data

US 2016/0215557 A1   Jul. 28, 2016

Related U.S. Application Data

(63) Continuation of application No. 13/339,463, filed on Dec. 29, 2011, now Pat. No. 9,309,146, which is a (Continued)

(51) Int. Cl.
  *E06B 3/677* (2006.01)
  *C03C 3/062* (2006.01)
  (Continued)

(52) U.S. Cl.
  CPC ............ *E06B 3/6775* (2013.01); *C03B 23/24* (2013.01); *C03C 3/062* (2013.01); *C03C 3/122* (2013.01);
  (Continued)

(58) Field of Classification Search
  CPC ....... Y02B 80/22; Y02B 80/24; E06B 3/6775; E06B 3/66342; E06B 3/673
  See application file for complete search history.

(56) References Cited

U.S. PATENT DOCUMENTS 3,120,433 A   2/1964   Van Zee
3,252,811 A   5/1966   Beall
(Continued)

FOREIGN PATENT DOCUMENTS

AU       60 657       1/1967
DE   195 45 422       6/1997
(Continued)

OTHER PUBLICATIONS

U.S. Appl. No. 13/339,463, filed Dec. 29, 2011; Dennis.
(Continued)

*Primary Examiner* — Donald J Loney
(74) *Attorney, Agent, or Firm* — Nixon & Vanderhye P.C.

(57) ABSTRACT

Certain example embodiments relate to seals for glass articles. Certain example embodiments relate to a composition used for sealing an insulted glass unit. In certain example embodiments the composition includes vanadium oxide, barium oxide, zinc oxide, and at least one additional additive. For instance, another additive that is a different metal oxide or different metal chloride may be provided. In certain example embodiments, a composition may be combined with a binder solution that substantially or completely burns out by the time the composition is melted. In certain example embodiments, a vacuum insulated glass unit includes first and second glass substrates that are sealed together with a seal that includes the above-described composition.

11 Claims, 33 Drawing Sheets

Related U.S. Application Data continuation-in-part of application No. 13/238,358, filed on Sep. 21, 2011, now Pat. No. 9,290,408, which is a continuation-in-part of application No. 12/929,875, filed on Feb. 22, 2011, now Pat. No. 8,802,203.

(51) Int. Cl.

| | |
|---|---|
| C03C 3/12 | (2006.01) |
| C03C 8/04 | (2006.01) |
| C03C 8/24 | (2006.01) |
| E06B 3/66 | (2006.01) |
| C03C 8/06 | (2006.01) |
| C03C 27/06 | (2006.01) |
| C03B 23/24 | (2006.01) |
| E06B 3/673 | (2006.01) |

(52) U.S. Cl.
CPC .............. C03C 8/04 (2013.01); C03C 8/06 (2013.01); C03C 8/24 (2013.01); C03C 27/06 (2013.01); E06B 3/6612 (2013.01); C03C 2207/00 (2013.01); E06B 3/673 (2013.01); E06B 3/67334 (2013.01); Y02A 30/25 (2018.01); Y02B 80/24 (2013.01)

(56) References Cited

U.S. PATENT DOCUMENTS

| | | |
|---|---|---|
| 3,331,659 A | 7/1967 | Malloy |
| 3,650,778 A | 3/1972 | Dumesnil et al. |
| 3,837,866 A | 9/1974 | Malmendier et al. |
| 3,862,830 A | 1/1975 | Stern |
| 4,186,023 A | 1/1980 | Dumesnil et al. |
| 4,221,604 A | 9/1980 | Chirino et al. |
| 4,256,495 A | 3/1981 | Kawamura et al. |
| 4,314,031 A | 2/1982 | Sanford et al. |
| 4,482,579 A | 11/1984 | Fujii et al. |
| 4,683,154 A | 7/1987 | Benson et al. |
| 4,743,302 A | 5/1988 | Dumesnil et al. |
| 4,788,471 A | 11/1988 | Strauss |
| 4,801,488 A | 1/1989 | Smith |
| 4,810,484 A | 3/1989 | Uedaira et al. |
| 4,820,365 A | 4/1989 | Brumm et al. |
| 5,013,360 A | 5/1991 | Finkelstein et al. |
| 5,051,381 A | 9/1991 | Ohji et al. |
| 5,089,446 A | 2/1992 | Cornelius et al. |
| 5,188,990 A | 2/1993 | Dumesnil et al. |
| 5,336,644 A | 8/1994 | Akhtar et al. |
| 5,355,051 A | 10/1994 | Fondrk |
| 5,516,733 A | 5/1996 | Morena |
| 5,534,469 A | 7/1996 | Hayashi |
| 5,643,840 A | 7/1997 | Hikata et al. |
| 5,657,607 A | 8/1997 | Collins et al. |
| 5,664,395 A | 9/1997 | Collins et al. |
| 5,902,652 A | 5/1999 | Collins et al. |
| 6,187,700 B1 | 2/2001 | Merkel |
| 6,300,263 B1 | 10/2001 | Merkel |
| 6,326,685 B1 | 12/2001 | Jin et al. |
| 6,365,242 B1 | 4/2002 | Veerasamy |
| 6,383,580 B1 | 5/2002 | Aggas |
| 6,391,809 B1 | 5/2002 | Young |
| 6,399,169 B1 | 6/2002 | Wang et al. |
| 6,444,281 B1 | 9/2002 | Wang et al. |
| 6,472,032 B1 | 10/2002 | Asano |
| 6,503,583 B2 | 1/2003 | Nalepka et al. |
| 6,541,083 B1 | 4/2003 | Landa et al. |
| 6,566,290 B2 | 5/2003 | Beall et al. |
| 6,635,321 B2 | 10/2003 | Wang et al. |
| 6,641,689 B1 | 11/2003 | Aggas |
| 6,692,600 B2 | 2/2004 | Veerasamy et al. |
| 6,701,749 B2 | 3/2004 | Wang et al. |
| 6,946,171 B1 | 9/2005 | Aggas |
| 6,998,776 B2 | 2/2006 | Aitken et al. |
| 7,105,235 B2 | 9/2006 | Lo et al. |
| 7,244,480 B2 | 7/2007 | Minaai et al. |
| 7,425,518 B2 | 9/2008 | Yoshida et al. |
| 7,435,695 B2 | 10/2008 | Hormadaly |
| 7,452,489 B2 | 11/2008 | Sawai et al. |
| 7,602,121 B2 | 10/2009 | Aitken et al. |
| 7,736,546 B2 | 6/2010 | Prunchak |
| 8,766,524 B2 | 7/2014 | Kohara et al. |
| 8,802,203 B2 | 8/2014 | Dennis |
| 9,309,146 B2 | 4/2016 | Dennis |
| 2004/0043887 A1 | 3/2004 | Paulson |
| 2004/0207314 A1 | 10/2004 | Aitken et al. |
| 2005/0001545 A1 | 1/2005 | Aitken et al. |
| 2005/0110168 A1 | 5/2005 | Chuang |
| 2005/0191515 A1 | 9/2005 | Brese et al. |
| 2005/0233885 A1 | 10/2005 | Yoshida et al. |
| 2006/0003883 A1 | 1/2006 | Yoshida et al. |
| 2006/0042748 A1 | 3/2006 | Hasegawa et al. |
| 2006/0128549 A1 | 6/2006 | Hormadaly |
| 2007/0194395 A1 | 8/2007 | Zu et al. |
| 2009/0064717 A1 | 3/2009 | Son et al. |
| 2009/0151854 A1 | 6/2009 | Cooper |
| 2009/0151855 A1 | 6/2009 | Wang et al. |
| 2009/0297862 A1 | 12/2009 | Boek et al. |
| 2010/0180934 A1 | 7/2010 | Naito et al. |
| 2010/0275654 A1 | 11/2010 | Wang |
| 2010/0330308 A1 | 12/2010 | Cooper et al. |
| 2011/0130264 A1 | 6/2011 | Beall |
| 2012/0213954 A1 | 8/2012 | Dennis |
| 2012/0308747 A1 | 12/2012 | Dennis |

FOREIGN PATENT DOCUMENTS

| | | |
|---|---|---|
| EP | 0 061 183 | 9/1982 |
| EP | 0 889 010 | 1/1999 |
| EP | 1 065 183 | 1/2001 |
| EP | 1 571 134 | 9/2005 |
| EP | 2 017 236 | 1/2009 |
| JP | 2002-137939 | 5/2002 |
| JP | 2005-112715 | 4/2005 |
| JP | 2011-84437 | 4/2011 |
| SU | 852811 | 8/1981 |
| SU | 1 578 093 | 7/1990 |
| SU | 1590472 | 9/1990 |
| SU | 1694561 | 11/1991 |
| SU | 1791433 | 1/1993 |
| WO | WO 96/02473 | 2/1996 |
| WO | WO 96/22255 | 7/1996 |
| WO | WO 02/14640 | 2/2002 |
| WO | WO 02/27135 | 4/2002 |
| WO | WO 2006/044383 | 4/2006 |
| WO | WO 2011/108115 | 9/2011 |
| WO | WO 2012/115796 | 8/2012 |
| WO | WO 2013/043340 | 3/2013 |
| WO | WO 2013/101748 | 7/2013 |

OTHER PUBLICATIONS

U.S. Appl. No. 13/238,358, filed Sep. 21, 2011; Dennis.
U.S. Appl. No. 13/480,987, filed May 25, 2012; Dennis.
U.S. Appl. No. 13/354,963, filed Jan. 20, 2012; Dennis.
U.S. Appl. No. 12/929,874, filed Feb. 22, 2011; Dennis.
U.S. Appl. No. 12/929,876, filed Feb. 22, 2011; Cooper et al.
U.S. Appl. No. 12/929,875, filed Feb. 22, 2011; Dennis.
U.S. Appl. No. 12/000,663, filed Dec. 14, 2007; Cooper.
U.S. Appl. No. 12/000,791, filed Dec. 17, 2007, Wang et al.
U.S. Appl. No. 12/453,221, filed May 1, 2009; Wang.
"Pb-Free Vanadium-Based Low-Melting Glass Paste: VS-1026"; Hitachi Powered Metals Technical Report No. 7, (2008).
International Search Report dated Apr. 9, 2009.
International Search Report dated Jul. 8, 2010.
International Search Report dated Mar. 18, 2009.
U.S. Appl. No. 12/458,071, filed Jun. 30, 2009; Cooper et al.

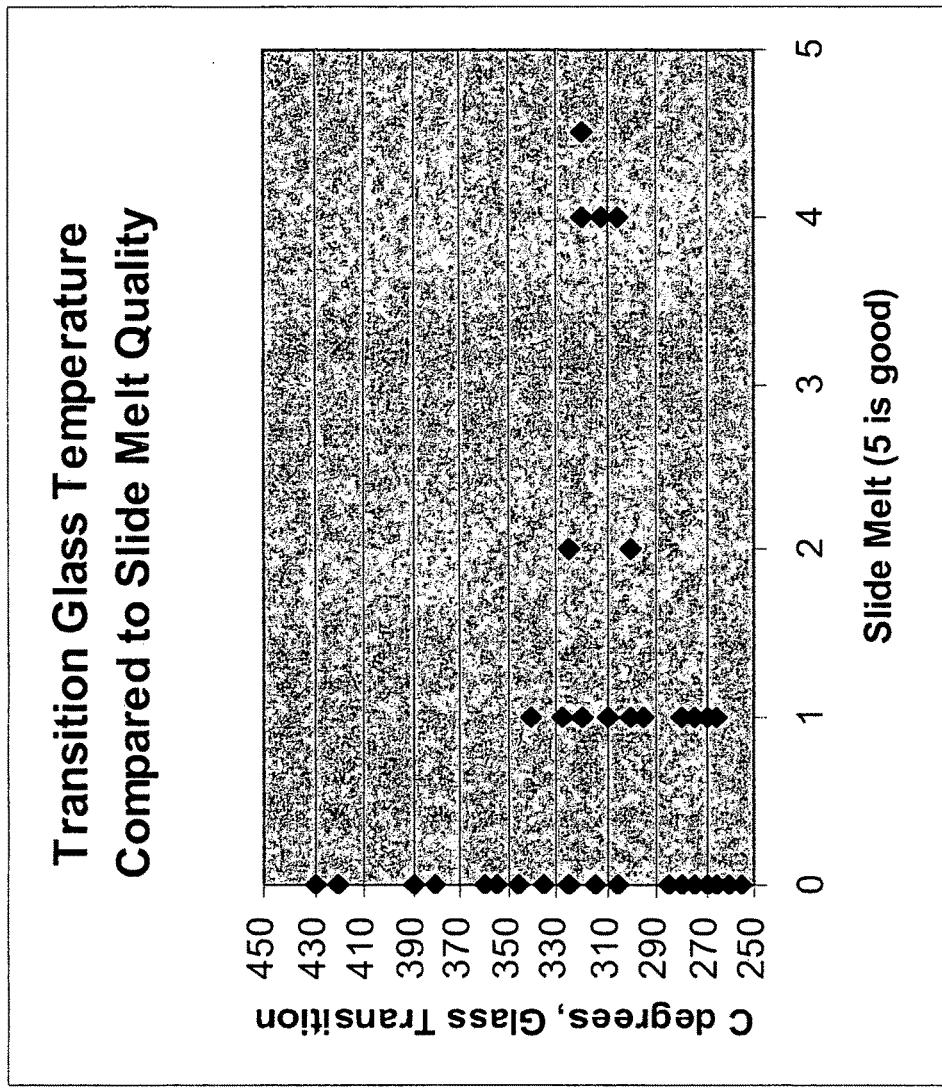

METHOD OF MAKING VACUUM INSULATED GLASS (VIG) WINDOW UNIT

CROSS REFERENCE TO RELATED APPLICATION

This application is a continuation of U.S. application Ser. No. 13/339,463, filed Dec. 29, 2011 (now U.S. Pat. No. 9,309,146), which is a continuation-in-part of U.S. application Ser. No. 13/238,358, filed Sep. 21, 2011, which is a continuation-in-part of U.S. application Ser. No. 12/929,875, filed Feb. 22, 2011 (now U.S. Pat. No. 8,802,203), the entire contents of which are all hereby incorporated herein by reference.

FIELD OF THE INVENTION

Certain example embodiments of this invention relate to improved frit materials for glass articles (e.g., for use in vacuum insulated glass or VIG units), and/or methods of making the same, as well as articles including such improved frit materials and/or methods of making the same. More particularly, certain example embodiments relate to binders used in vanadium-based frit materials. In certain example embodiments, improved insulated seals created with the fit materials are used in connection with vacuum insulated glass (VIG) units, and/or a method is provided for sealing VIG units with the improved seals.

BACKGROUND AND SUMMARY OF EXAMPLE EMBODIMENTS OF THE INVENTION

Vacuum IG units are known in the art. For example, see U.S. Pat. Nos. 5,664,395, 5,657,607, and 5,902,652, the disclosures of which are all hereby incorporated herein by reference.

FIGS. 1-2 illustrate a conventional vacuum IG unit (vacuum IG unit or VIG unit). Vacuum IG unit 1 includes two spaced apart glass substrates 2 and 3, which enclose an evacuated or low pressure space 6 there between. Glass sheets/substrates 2 and 3 are interconnected by peripheral or edge seal of fused solder glass 4 and an array of support pillars or spacers 5.

Pump out tube 8 is hermetically sealed by solder glass 9 to an aperture or hole 10 which passes from an interior surface of glass sheet 2 to the bottom of recess 11 in the exterior face of sheet 2. A vacuum is attached to pump out tube 8 so that the interior cavity between substrates 2 and 3 can be evacuated to create a low pressure area or space 6. After evacuation, tube 8 is melted to seal the vacuum. Recess 11 retains sealed tube 8. Optionally, a chemical getter 12 may be included within recess 13.

Conventional vacuum IG units, with their fused solder glass peripheral seals 4, have been manufactured as follows. Glass frit in a solution (ultimately to form solder glass edge seal 4) is initially deposited around the periphery of substrate 2. The other substrate 3 is brought down over top of substrate 2 so as to sandwich spacers 5 and the glass frit/solution there between. The entire assembly including sheets 2, 3, the spacers, and the seal material is then heated to a temperature of approximately 500° C., at which point the glass frit melts, wets the surfaces of the glass sheets 2, 3, and ultimately forms hermetic peripheral or edge seal 4. This approximately 500° C. temperature is maintained for from about one to eight hours. After formation of the peripheral/edge seal 4 and the seal around tube 8, the assembly is cooled to room temperature. It is noted that column 2 of U.S. Pat. No. 5,664,395 states that a conventional vacuum IG processing temperature is approximately 500° C. for one hour. Inventors Lenzen, Turner and Collins of the '395 patent have stated that "the edge seal process is currently quite slow: typically the temperature of the sample is increased at 200° C. per hour, and held for one hour at a constant value ranging from 430° C. and 530° C. depending on the solder glass composition." After formation of edge seal 4, a vacuum is drawn via the tube to form low pressure space 6.

The composition of conventional edge seals are known in the art. See, for example, U.S. Pat. Nos. 3,837,866; 4,256,495; 4,743,302; 5,051,381; 5,188,990; 5,336,644; 5,534,469; 7,425,518, and U.S. Publication No. 2005/0233885, the disclosures of which are all hereby incorporated herein by reference.

Unfortunately, the aforesaid high temperatures and long heating times of the entire assembly utilized in the formulation of edge seal 4 are undesirable. This is especially the case when it is desired to use a heat strengthened or tempered glass substrate(s) 2, 3 in the vacuum IG unit. As shown in FIGS. 3-4, tempered glass loses temper strength upon exposure to high temperatures as a function of heating time. Moreover, such high processing temperatures may adversely affect certain low-E coating(s) that may be applied to one or both of the glass substrates in certain instances.

FIG. 3 is a graph illustrating how fully thermally tempered plate glass loses original temper upon exposure to different temperatures for different periods of time, where the original center tension stress is 3,200 MU per inch. The x-axis in FIG. 3 is exponentially representative of time in hours (from 1 to 1,000 hours), while the y-axis is indicative of the percentage of original temper strength remaining after heat exposure. FIG. 4 is a graph similar to FIG. 3, except that the x-axis in FIG. 4 extends from zero to one hour exponentially.

Seven different curves are illustrated in FIG. 3, each indicative of a different temperature exposure in degrees Fahrenheit (° F.). The different curves/lines are 400° F. (across the top of the FIG. 3 graph), 500° F., 600° F., 700° F., 800° F., 900° F., and 950° F. (the bottom curve of the FIG. 3 graph). A temperature of 900° F. is equivalent to approximately 482° C., which is within the range utilized for forming the aforesaid conventional solder glass peripheral seal 4 in FIGS. 1-2. Thus, attention is drawn to the 900° F. curve in FIG. 3, labeled by reference number 18. As shown, only 20% of the original temper strength remains after one hour at this temperature (900° F. or 482° C.). Such a significant loss (i.e., 80% loss) of temper strength may be undesirable.

As seen in FIGS. 3-4, the percentage of remaining tempering strength varies based on the temperature that is exposed to the tempered glass. For example, at 900° F. only about 20% of the original temper strength remains. When the temperature that the sheet is exposed to is reduced to 800° F., about 428° C., the amount of strength remaining is about 70%. Finally, a reduction in temperature to about 600° F., about 315° C., results in about 95% of the original temper strength of the sheet remaining. As will be appreciated, it is desirable to reduce any temper strength losses as a result of exposing a tempered sheet of glass to high temperatures.

As noted above, the creation of VIG units includes the creation of a hermetic seal that can withstand the pressure applied from the vacuum created on inside of the unit. As also discussed above, the creation of the seal may conventionally involve temperatures of at or above 500° C. These temperatures are required in order to obtain a high enough temperature in order for the frit material used for the seal to melt and form the required seal for the VIG units. As shown above, such a temperature can result in a strength reduction for VIG units using tempered glass.

One conventional solution to sealing glass substrates together is to use an epoxy. However, in the case of VIG units, epoxy compositions may be insufficient to hold a seal on a vacuum. Furthermore, epoxies may be susceptible to environmental factors that may further reduce their effectiveness when applied to VIG units.

Another conventional solution is to use a frit solution that contains lead. As is known, lead has a relatively low melting point. Accordingly, temperatures for sealing the VIG units may not need to be as high for other frit materials, and thus the tempering strength of tempered glass substrates may not be reduced by the same amount required for other frit based materials. However, while lead based frits may resolve the above structural issues, the usage of lead in the frit may create new problems. Specifically, the health consequences to the population for products that contain lead. Additionally, certain countries (e.g., in the European Union) may impose strict requirements on the amount of lead that can be contained in a given product. Indeed, some countries (or customers) may require products that are completely lead-free.

Thus, it will be appreciated that techniques for creating improved seals for glass articles are continuously sought after.

Furthermore, frit materials may sometimes include binder agents that are used to, for example, facilitate binding the various materials that make up the frit. However, in certain instances the materials used in a frit may have a melting temperature that is less than a burn out point for a binder that is used in the frit. In such situations, the incomplete burn off of a binder may result in a porous frit seal, reduced frit to glass bonding due to, for example, carbon contamination in the frit, or other characteristics that may be undesirable for frit based seals.

Accordingly, it will be appreciated that there exists a need in the art for binders, solvents, etc., that may be used with frit materials, e.g., with frit materials that have a relatively reduced melting point such as vanadium based frits (e.g., VBZ frits).

It also will be appreciated that there exists a need in the art for improved seals and the like that can be integrated with tempered glass units, such as, for example, VIG units. The seals may be designed to allow for reduced temperature sealing such that annealed or tempered glass can be sealed without detrimental impact on the properties of the glass.

In certain example embodiments, a frit material may provide glass to frit bonding sufficient for VIG purposes (e.g., in terms of structural strength). In certain example embodiments, the provided frit may provide proper glass wetting properties. In certain example embodiments, the frit may seal and have structural strength and a homogenous glassy structure to provide an adequate barrier to prevent vacuum degradation in example VIG units over a period of time.

In certain instances, improvements in melt flow may enable improved frit matching to glass expansion and/or increase process tolerances to frit bead variations. Improved wetting and bonding properties of a frit material may increase VIG yield by reducing bonding failures of the frit to the glass. A reduction in crystallization may additionally or alternatively facilitate a selected composition to meeting different heating environments (e.g., an internal seal, an external seal, etc).

In certain example embodiments, a frit material having a composition is provided. The frit material may include vanadium oxide between about 50% and 60% weight, barium oxide between about 27% and 33% weight, and zinc oxide between about 9% and 12% weight. In certain example embodiments, the frit material may also include at least one additive selected from among: $Ta_2O_5$, $Ti_2O_3$, $SrCl_2$, $GeO_2$, $CuO$, $AgO$, $Nb_2O_5$, $B_2O_3$, $MgO$, $SiO_2$, $TeO_2$, $Tl_2O_3$, $Y_2O_3$, $SnF2$, $SnO2$, $CuCl$, $SnCl_2$, $CeO_2$, $AgCl$, $In_2O_3$, $SnO$, $SrO$, $MgO$, $MoO_3$, $CsCO_3$, $CuCl_2$, and $Al_2O_3$.

In certain example embodiments, a vacuum insulted glass (VIG) unit is provided. The VIG unit may include first and second substantially parallel, spaced apart glass substrates. An edge seal is provided around a periphery of the first and second substrates to form a hermetic seal there between and at least partially defining a gap between the first and second substrates. The gap defined between the first and second substrates is at a pressure less than atmospheric. The edge seal includes a frit material, e.g., as made from a base composition as described herein.

In certain example embodiments, a method of making a frit material is provided. A base composition is provided to a holder. The base composition includes vanadium oxide between about 50% and 60% weight, barium oxide between about 27% and 33% weight, zinc oxide between about 9% and 12% weight, and at least one additive selected from among: $Ta_2O_5$, $Ti_2O_3$, $SrCl_2$, $GeO_2$, $CuO$, $AgO$, $Nb_2O_5$, $B_2O_3$, $MgO$, $SiO_2$, $TeO_2$, Tl2O3, Y2O3, SnF2, SnO2, CuCl, SnCl2, CeO2, AgCl, In2O3, SnO, SrO, MgO, $MoO_3$, $CsCO_3$, $CuCl_2$, and $Al_2O_3$. The base composition is melted. The base composition is cooled or allowed to cool, forming an intermediate glass article. The intermediate glass article is ground to make the frit material.

In certain example embodiments, a method of making a vacuum insulated glass (VIG) unit is provided. First and second glass substrates in substantially parallel, spaced apart relation to one another are provided. The first and second glass substrates using a frit material are sealed together, with a gap being defined between the first and second substrates. The sealing being performed by melting the frit material at a temperature of no more than about 400 degrees C., where the frit material has been formed from a base composition including vanadium oxide between about 50% and 60% weight, barium oxide between about 27% and 33% weight, zinc oxide between about 9% and 12% weight, and at least one oxide or chloride-base additive.

In certain example embodiments, a frit material having a composition is provided. The frit material may include vanadium oxide between about 50% and 60% weight (40-55% molar, more preferably 45-50% molar), barium oxide (e.g., barium carbonate that converts in whole or in part to BaO) between about 23% and 33% weight (15-35% molar, more preferably 20-23% molar), and zinc oxide between about 9% and 12% weight (15-25% molar, more preferably 19-22% molar). The frit material includes at least a first and second additive selected from among $SnCl_2$, $CuCl_2$, $MoO_3$, $TeO_2$, $Ta_2O_5$, $Nb_2O_5$, $Al_2O_3$, $SiO_2$, and $CsCO_3$.

Certain example embodiments may include at least two additives. For example SnCl2 and SiO2. Certain example embodiments may include three or four additives selected from among $SiO_2$, $SnCl_2$, $Al_2O_3$, and $TeO_2$. Certain example embodiments may use between 5 and 10 different additives that are selected from among: $SnCl_2$, $CuCl_2$, $MoO_3$, $TeO_2$, $Ta_2O_5$, $Nb_2O_5$, $Al_2O_3$, $SiO_3$, and $CsCO_3$.

In certain example embodiments, a method of making a vacuum insulated glass unit is provided. First and second glass substrates are provided in substantially parallel, spaced apart relation to one another, with a gap being defined between the first and second substrates. A material is disposed proximate to edges of the first and/or second glass substrates, with the material comprising at least a frit material and a binder solution. Energy is applied to the frit material so as to melt the frit material at a melting temperature, the melting temperature being less than about 400 degrees C. Application of the energy burns off the binder solution of the material. The frit material is formed from a base composition including (Normalized Mole %): vanadium oxide: ~45-50%, barium oxide: ~20-23%, and zinc oxide: 19-22%.

In certain example embodiments, a material is provided. The material may include a binder solution and a frit material with a composition that includes (Normalized Mole %): vanadium oxide: ~45-50%, barium oxide: ~20-23%, and zinc oxide: 19-22%. The binder solution may have a burnout temperature that is less than a melting temperature of the frit material.

In certain example embodiments, a method of making a material is provided. A composition is provided to a holder, the composition including (Normalized Mole %): vanadium oxide: ~45-50%, barium oxide: ~20-23%, and zinc oxide: 19-22%. The composition is melted. The melted composition is cooled and/or allowed to cool so as to form an intermediate article. The intermediate article is ground or otherwise transformed to create a base frit material. The base frit material is combined with a binder solution, wherein a burnout temperature for the binder solution is less than a melting temperature of the base frit material.

A method of bonding a frit material to a substrate is provided. The frit material is combined with a binder solution to form a combined material. The combined material is disposed on the substrate. The combined material is heated to a first temperature of less than about 300 degrees C. A temperature of the combined material is held within a range of the first temperature for a first period of time to burnout the binder solution of the frit material. Subsequent to holding the temperature of the combined material, energy applied to the combined material is increased so as to raise the temperature of the combined material to a second temperature, greater than the first temperature and less than about 400 degrees C., over a second period of time. The frit material includes a composition including (Normalized Mole %): vanadium oxide: ~45-50%, barium oxide: ~20-23%, and zinc oxide: 19-22%.

The features, aspects, advantages, and example embodiments described herein may be combined in any suitable combination or sub-combination to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIGS. 7A-7D are graphs summarizing properties of compositions according to certain example embodiments;

DETAILED DESCRIPTION OF EXAMPLE EMBODIMENTS OF THE INVENTION

The following description is provided in relation to several example embodiments which may share common characteristics, features, etc. It is to be understood that one or more features of any one embodiment may be combinable with one or more features of other embodiments. In addition, single features or a combination of features may constitute an additional embodiment(s).

Certain example embodiments may relate to glass units (e.g., VIG units) that include two glass substrates sealed with an improved seal, e.g., of or including a vanadium-based frit material. In certain example embodiments an improved seal may include the following materials: vanadium oxide, barium oxide, and zinc oxide. In addition, certain example embodiments may include one or more of the following compounds: $Ta_2O_5$, $Ti_2O_3$, $SrCl_2$, $GeO_2$, CuO, AgO, $Nb_2O_5$, $B_2O_3$, MgO, $SiO_2$, TeO2, Tl2O3, Y2O3, SnF2, SnO2, CuCl, SnCl2, CeO2, AgCl, In2O3, SnO, SrO, MgO, $MoO_3$, $CsCO_3$, $CuCl_2$, and $Al_2O_3$.

Figure 5:
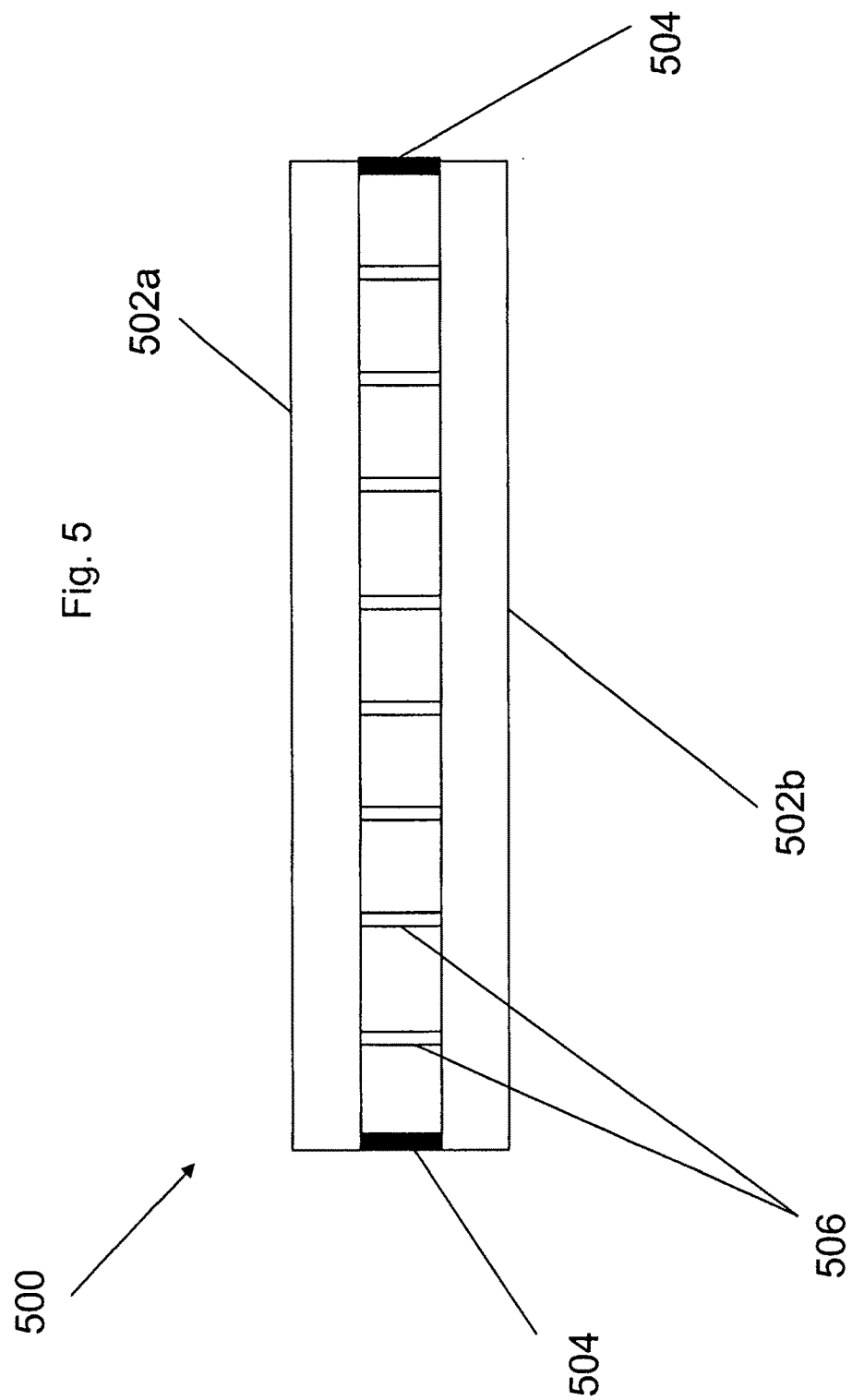
FIG. 5 is cross-sectional view of a vacuum insulated glass unit according to certain example embodiments.

FIG. 5 is cross-sectional view of a vacuum insulated glass unit according to certain example embodiments. VIG unit 500 may include first and second glass substrates 502a and 502b that are spaced apart and define a space therebetween. The glass substrates 502a and 502b may be connected via an improved seal 504, of or including a vanadium-based frit. Support pillars 506 may help maintain the first and second substrates 502a and 502b in substantially parallel spaced apart relation to one another. It will be appreciated that the CTE of the improved seal 504 and the glass substrates 502a and 502b may substantially match one another. This may be advantageous in terms of reducing the likelihood of the glass cracking, etc. Although FIG. 5 is described in relation to a VIG unit, it will be appreciated that the improved seal 504, of or including a vanadium-based frit may be used in connection with other articles and/or arrangements including, for example, insulating glass (IG) units and/or other articles.

Figure 6:
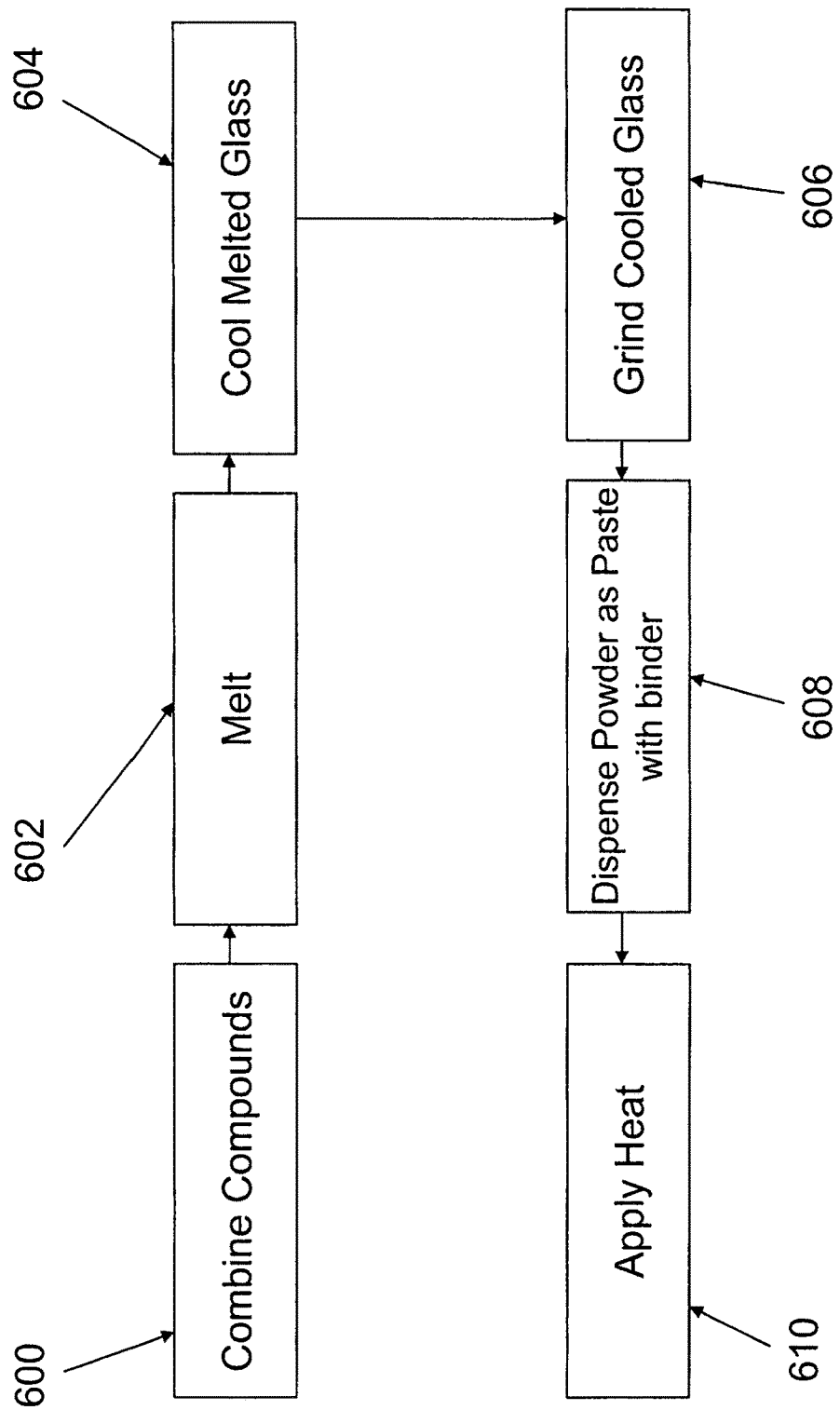
FIG. 6 is a flowchart illustrating a process for making a vacuum insulated glass unit with a frit material according to certain example embodiments.

FIG. 6 is a flowchart illustrating a process for preparing a frit material to be used in making a vacuum insulated glass unit according to certain example embodiments. In step 600, base compounds are combined and disposed into an appropriate container (e.g., a heat resistant container such as, for example, a ceramic container). In step 602, the combined compound is melted. Preferably, the temperature to melt the combined material may be at least 1000° C. In certain exemplary embodiments, the combined compound is melted at 1000° C. for between 30 to 60 minutes. In certain exemplary embodiments, the combined compound is melted at 1100° C. for 60 minutes. In certain exemplary embodiments, the combined compound is melted at 1200° C. for 60 minutes. In certain exemplary embodiments, the melting temperature is a cycle that includes 500° C. for 15 minutes, 550° C. for 15 minutes, 600° C. for 15 minutes, and a ramp up to 1000° C. for 60 minutes.

After the combined compounds are melted, the material may be cooled in step 604, e.g., to form a glass sheet. After cooling, the glass may be crushed or ground into fine particulates in step 606. In certain example embodiments, the size of the particulates may be no larger than about 100 mesh. Once the glass is ground into a powder, it may be disposed between the substrates in step 608. In certain example embodiments, the powder may be dispensed as a paste with a binder. Additional details on binding and/or solvent agents that may be used in certain example embodiments are provided in greater detail below. Heat may then be applied in step 610 to the glass substrate and the powder. In certain example embodiments, the heat may be between 300° C. and 400° C., or more preferably between 325° C. and 375° C. It will be appreciated that when heat of the above temperatures is applied to tempered glass that the tempered glass may lose a reduced amount of strength versus when heat of in excess of 350° C. is applied to the tempered glass. Thus, certain example embodiments preferably involve a frit melting temperature of less than 500° C., more preferably less than 425° C., and sometimes less than 350° C.

In certain example embodiments, the combined compounds include the following materials: vanadium oxide, barium oxide, and zinc oxide.

FIGS. 7A-7D show graphs summarizing properties of compositions according to certain example embodiments.

The table below corresponds to the data shown in FIG. 7A with those compositions with a melt quality of less than 4 (on a scale of 0 to 5) omitted from the table.

TABLE 1

| Normalized Moles of Batch Composition | | | | | | | | |
|---|---|---|---|---|---|---|---|---|
| $V_2O_5$ | BaO | ZnO | BaO/ZnO | $Bi_2O_3$ | $B_2O_3$ | Tg(C.) | Tx1(C.) | Rating |
| 43.66% | 9.87% | 46.47% | 0.21 | | | 320 | 410 | 4 |
| 39.01% | 13.25% | 37.37% | .35 | 2.18% | 8.20% | 312 | 430 | 4 |
| 47.33% | 12.96% | 24.41% | 0.53 | 9.95% | 5.53% | 305 | 380 | 4 |
| 50.24% | 23.38% | 21.39% | 1.33 | | | 320 | 425 | 4 |
| 51.54% | 26.26% | 16.46% | 1.60 | 5.75% | | 320 | 410 | 4.5 |

Figure 7A:
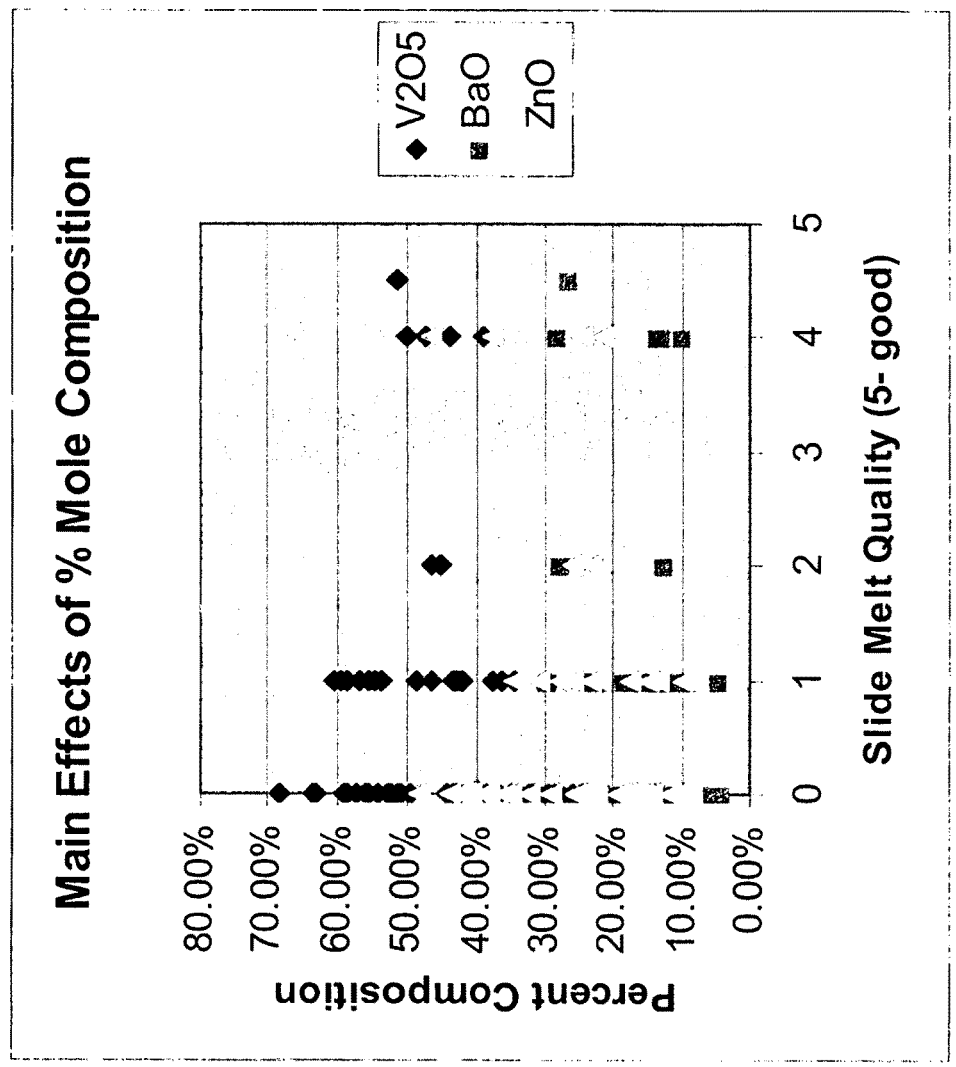
Figure 7B:
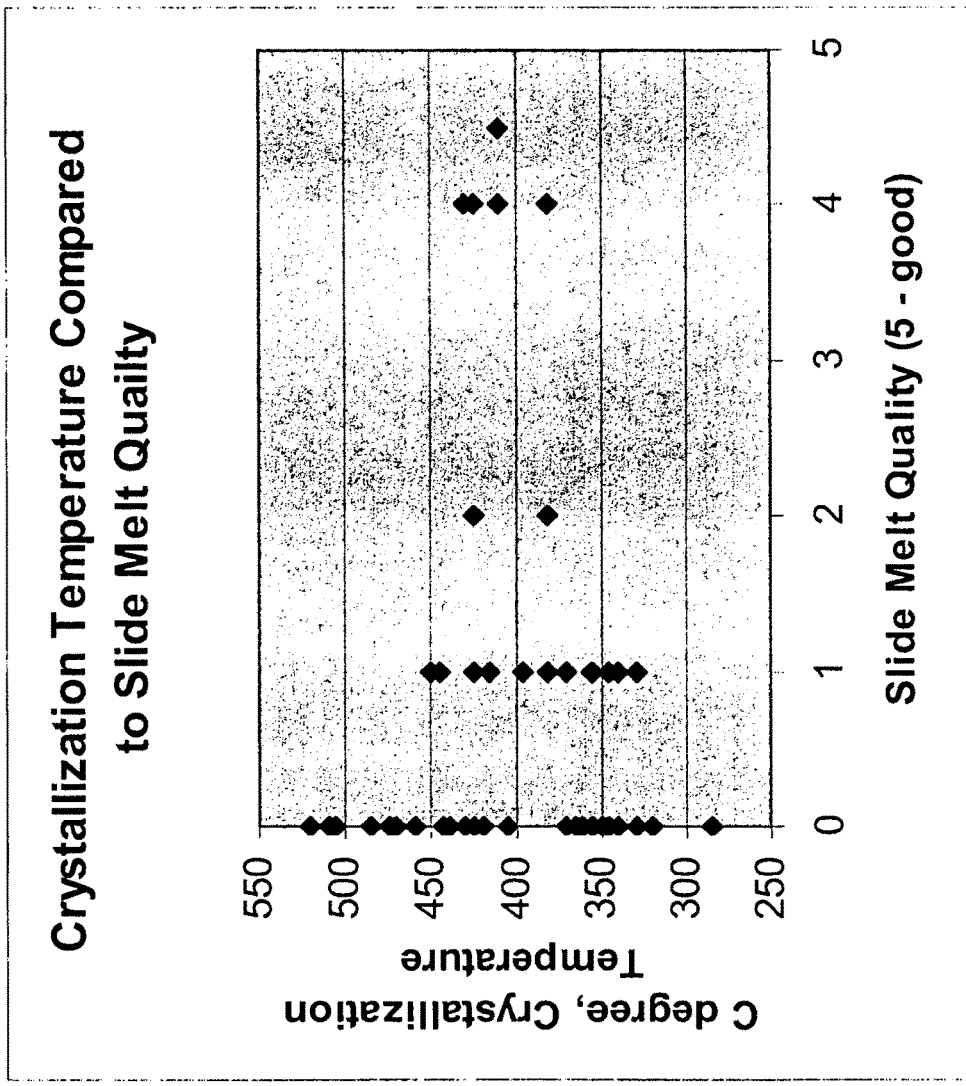

The melts shown in FIG. 7A were applied to a microscope glass slide with a temperature of 375° C. applied for 15 minutes. FIG. 7B shows a graph that includes the crystallization temperature (first crystallization peak—Tx1—of the above table) of the above melts. According to certain exemplary embodiments, a preferred temperature for Tx1 may be between about 375° C. and 425° C., preferably about 400° C.

FIG. 7C shows the transition glass temperatures, Tg, compared the above melts. The graph showing exemplary data shows that Tg values between about 290 C and 335 C may be preferred for the above compositions.

Figure 7D:
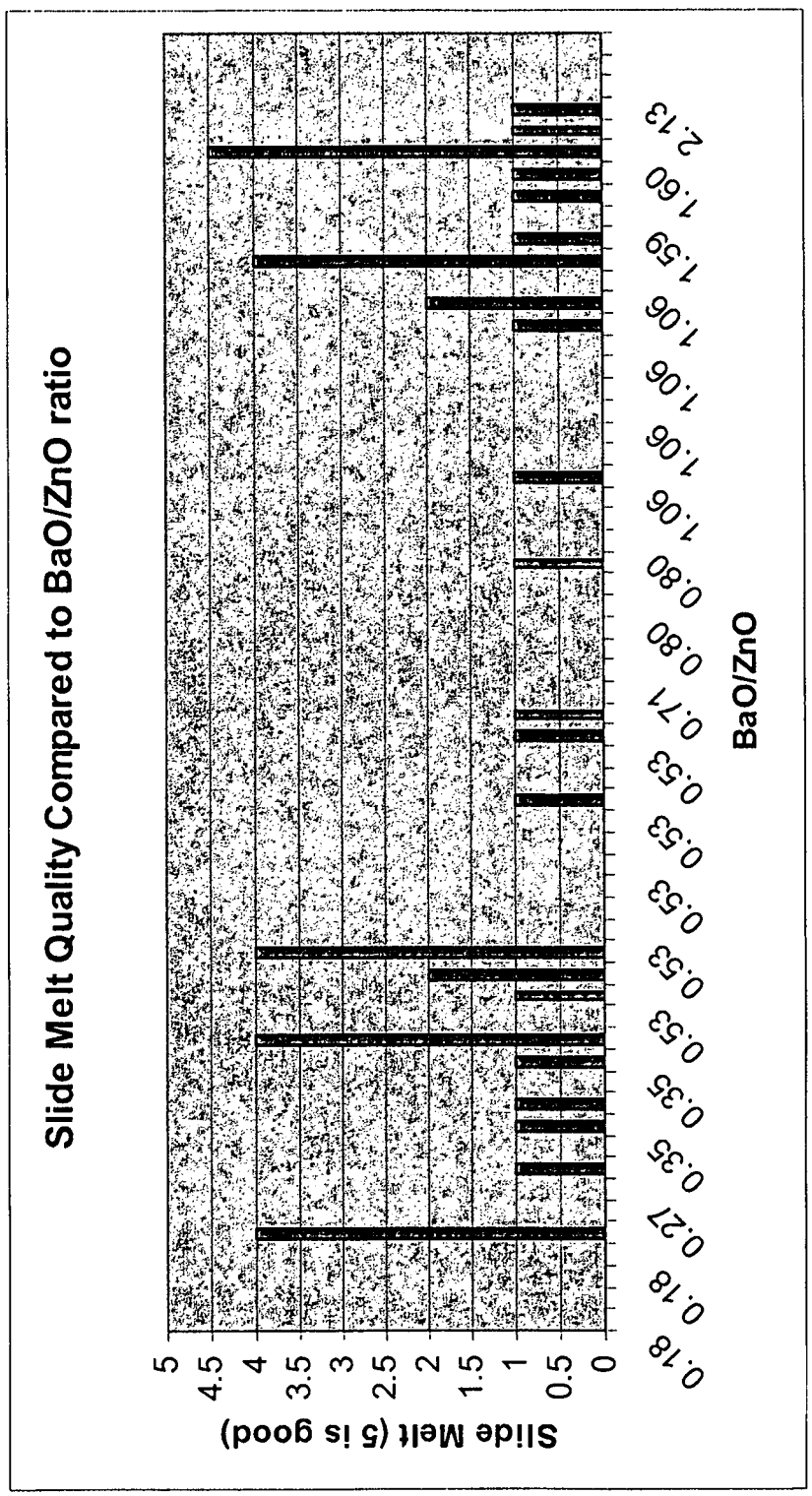

FIG. 7D includes the above melts in a graph showing the melt quality versus the barium/zinc ratio.

Figure 8A:
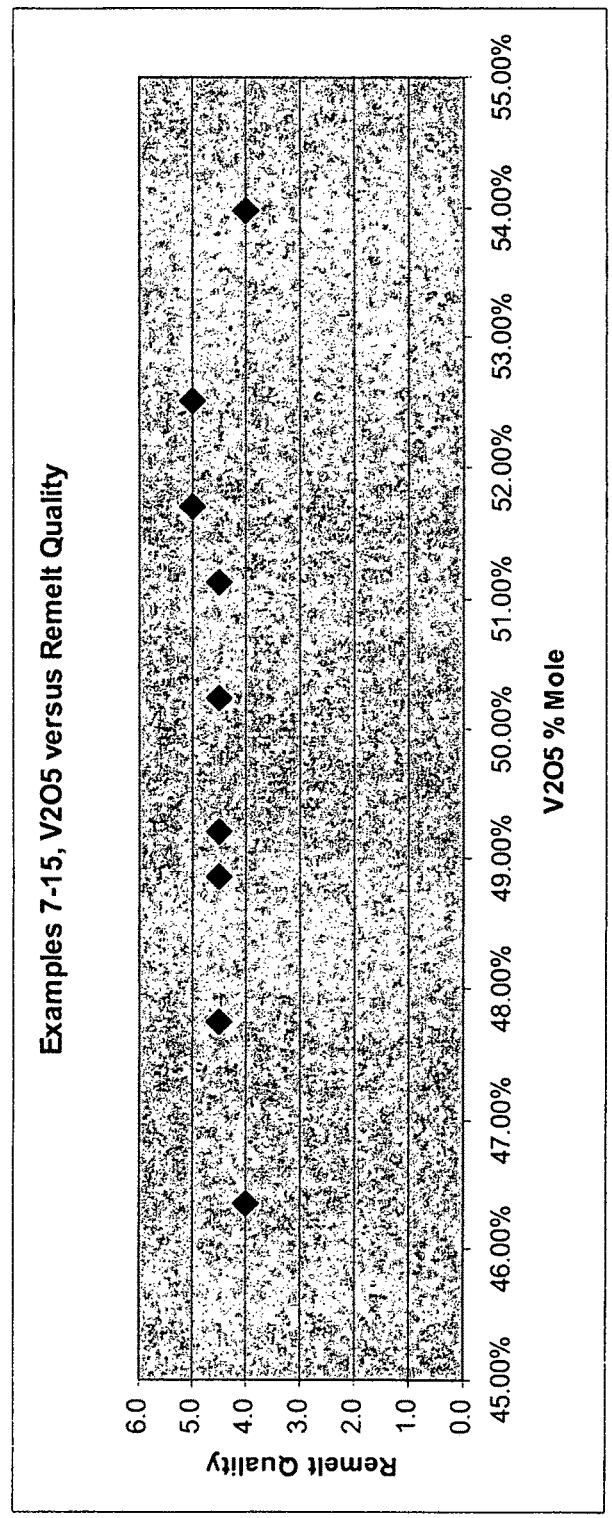
FIGS. 8A-8C are graphs summarizing the quality of compositions according to certain exemplary embodiments.
Figure 8B:
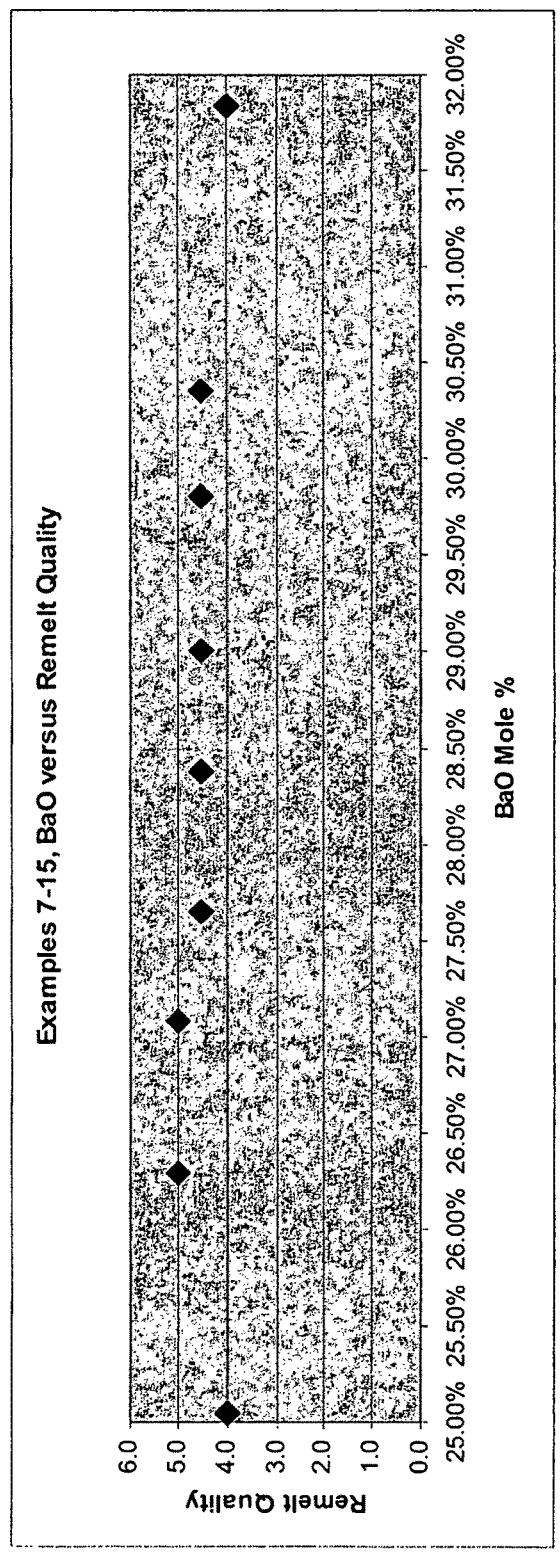
Figure 8C:
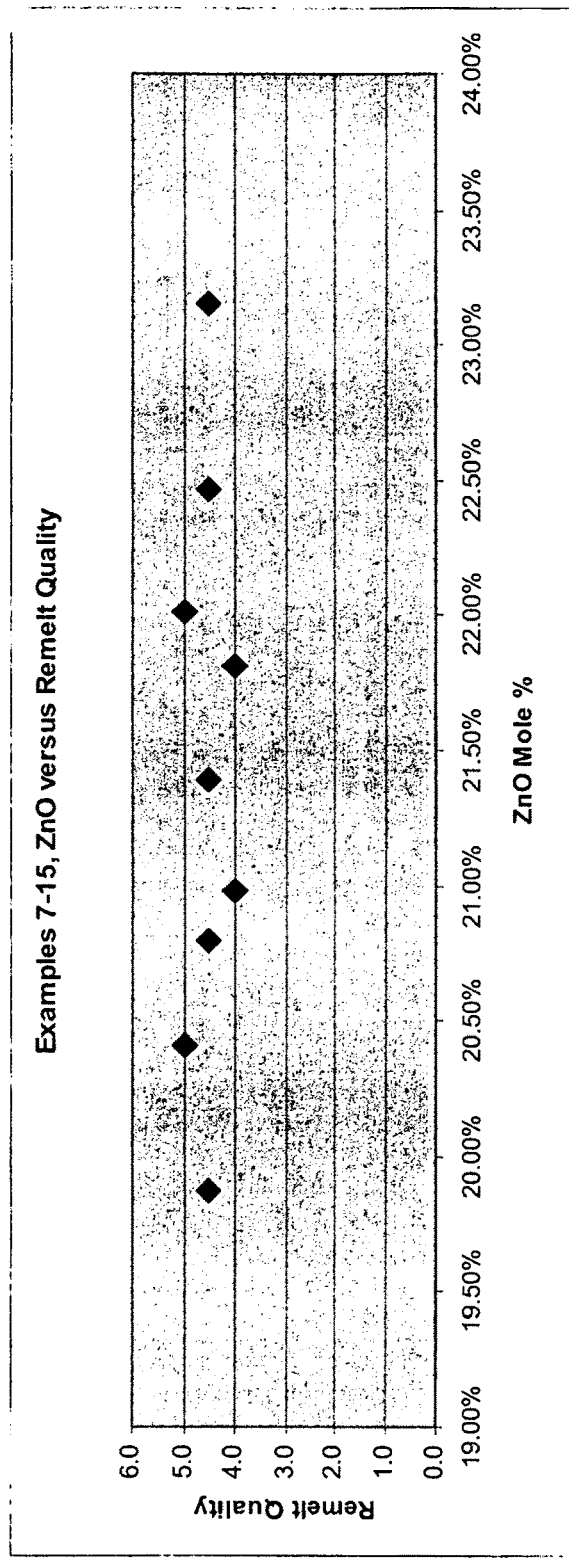

FIGS. 8A-8C show graphs that summarize the quality of compositions according to certain exemplary embodiments. FIG. 8A summarizes the $V_2O_5$ percentage used in certain exemplary compositions. FIG. 8B summarizes the BaO percentage used in certain exemplary compositions. FIG. 8C summarizes the ZnO percentage used in certain exemplary compositions. As shown in the illustrative graphs, a vanadium percentage of between about 51% and 53% may be preferable according to certain example embodiments.

Below, tables 2A-2C show exemplary compositions according to certain example embodiments. Additionally, examples 7-15 in the tables correspond to graphs 8A-8C. For the compositions shown in the below tables, $BaCO_3$ factor of 1.287027979 was used to convert to a BaO resulting compound.

TABLE 2A

| | Weight Percentage | | | Weight Normal | Weights of Batch Composition for 25 grams | | | Normalized Weight Percentage | | |
|---|---|---|---|---|---|---|---|---|---|---|
| Ex. | $V_2O_5$ | BaO | ZnO | | $V_2O_5$ | BaO | ZnO | $V_2O_5$ | BaO | ZnO |
| 1 | 60 | 30 | 10 | 0.23 | 13.800 | 8.880 | 2.300 | 55.24 | 35.55 | 9.21 |
| 2 | 52.5 | 25 | 10 | 0.27 | 14.175 | 8.687 | 2.700 | 55.45 | 33.99 | 10.56 |
| 3 | 45 | 20 | 10 | 0.31 | 13.950 | 7.980 | 3.100 | 55.73 | 31.88 | 12.39 |
| 4 | 45 | 10 | 20 | 0.32 | 14.400 | 4.118 | 6.400 | 57.79 | 16.53 | 25.68 |
| 5 | 52.5 | 10 | 25 | 0.28 | 14.700 | 3.604 | 7.000 | 58.09 | 14.24 | 27.66 |
| 6 | 60 | 10 | 30 | 0.25 | 15.000 | 3.218 | 7.500 | 58.33 | 12.51 | 29.16 |
| 7 | 52.5 | 25 | 10 | 0.24 | 12.600 | 7.722 | 2.400 | 55.45 | 33.99 | 10.56 |
| 8 | 57.5 | 25 | 10 | 0.25 | 14.375 | 8.044 | 2.500 | 57.69 | 32.28 | 10.03 |
| 9 | 47.5 | 25 | 10 | 0.28 | 13.300 | 9.009 | 2.800 | 52.97 | 35.88 | 11.15 |
| 10 | 52.5 | 27.5 | 10 | 0.26 | 13.650 | 9.202 | 2.600 | 53.63 | 36.15 | 10.22 |
| 11 | 57.5 | 27.5 | 10 | 0.25 | 14.375 | 8.848 | 2.500 | 55.88 | 34.40 | 9.72 |
| 12 | 47.5 | 27.5 | 10 | 0.27 | 12.825 | 9.556 | 2.700 | 51.13 | 38.10 | 10.77 |
| 13 | 52.5 | 22.5 | 10 | 0.28 | 14.700 | 8.108 | 2.800 | 57.40 | 31.66 | 10.93 |
| 14 | 57.5 | 22.5 | 10 | 0.26 | 14.950 | 7.529 | 2.600 | 59.61 | 30.02 | 10.37 |
| 15 | 47.5 | 22.5 | 10 | 0.29 | 13.775 | 8.398 | 2.900 | 54.94 | 33.49 | 11.57 |

TABLE 2B

| | Moles of Batch | | | Normalized Moles | | | Glass Type |
|---|---|---|---|---|---|---|---|
| Ex. | $V_2O_5$ | BaO | ZnO | $V_2O_5$ | BaO | ZnO | |
| 1 | 0.3037 | 0.1801 | 0.1132 | 50.87% | 30.17% | 18.95% | amorphous |
| 2 | 0.3049 | 0.1722 | 0.1298 | 50.24% | 28.38% | 21.39% | glassy |
| 3 | 0.3064 | 0.1616 | 0.1522 | 49.41% | 26.05% | 24.54% | amorphous |
| 4 | 0.3177 | 0.0838 | 0.3156 | 44.31% | 11.68% | 44.01% | amorphous |
| 5 | 0.3194 | 0.0722 | 0.3400 | 43.66% | 9.87% | 46.47% | amorphous |
| 6 | 0.3207 | 0.0634 | 0.3584 | 43.19% | 8.54% | 48.27% | amorphous |
| 7 | 0.3049 | 0.1722 | 0.1298 | 50.24% | 28.38% | 21.39% | glassy |
| 8 | 0.3172 | 0.1636 | 0.1233 | 52.51% | 27.08% | 20.41% | glassy |
| 9 | 0.2912 | 0.1818 | 0.1370 | 47.74% | 29.80% | 22.46% | glassy |
| 10 | 0.2949 | 0.1832 | 0.1255 | 48.85% | 30.35% | 20.80% | glassy |
| 11 | 0.3073 | 0.1743 | 0.1194 | 51.12% | 29.00% | 19.87% | glassy |
| 12 | 0.2811 | 0.1931 | 0.1323 | 46.35% | 31.83% | 21.81% | glassy |
| 13 | 0.3156 | 0.1604 | 0.1344 | 51.70% | 26.28% | 22.01% | glassy |
| 14 | 0.3278 | 0.1521 | 0.1274 | 53.97% | 25.05% | 20.98% | glassy |
| 15 | 0.3021 | 0.1697 | 0.1421 | 49.20% | 27.65% | 23.15% | glassy |

The rating shown in Table 2C is based off of depositing the ground composition on a microscope glass slide and heating the composition at about 375° C. for between 10 and, 30 minutes.

TABLE 2C

| Example | Tg (C.°) | Tx2 (C.°) | Tx2 (C.°) | Tx1 − Tg | Rating |
|---|---|---|---|---|---|
| 1 | 280 | 330 | 540 | 50 | 0.0 |
| 2 | 320 | 425 | 525 | 105 | 4.0 |
| 3 | 280 | 430 | 550 | 150 | 0.0 |
| 4 | 280 | 320 | 365 | 40 | 0.0 |
| 5 | 320 | 410 | 560 | 90 | 4.0 |
| 6 | 285 | 425 | 560 | 140 | 0.0 |
| 7 | 315 | 390 | 530 | 75 | 4.5 |
| 8 | 295, 325 | 415 | 535 | 90 | 5.0 |
| 9 | 320 | 420 | 525 | 100 | 4.5 |
| 10 | 325 | 410 | 540 | 85 | 4.5 |
| 11 | 315 | 395 | 530 | 80 | 4.5 |
| 12 | 330 | 415 | 560 | 85 | 4.0 |
| 13 | 315 | 400 | 530 | 85 | 5.0 |
| 14 | 305 | 395 | 530 | 90 | 4.0 |
| 15 | 320 | 395 | 525 | 75 | 4.5 |

Figure 9:
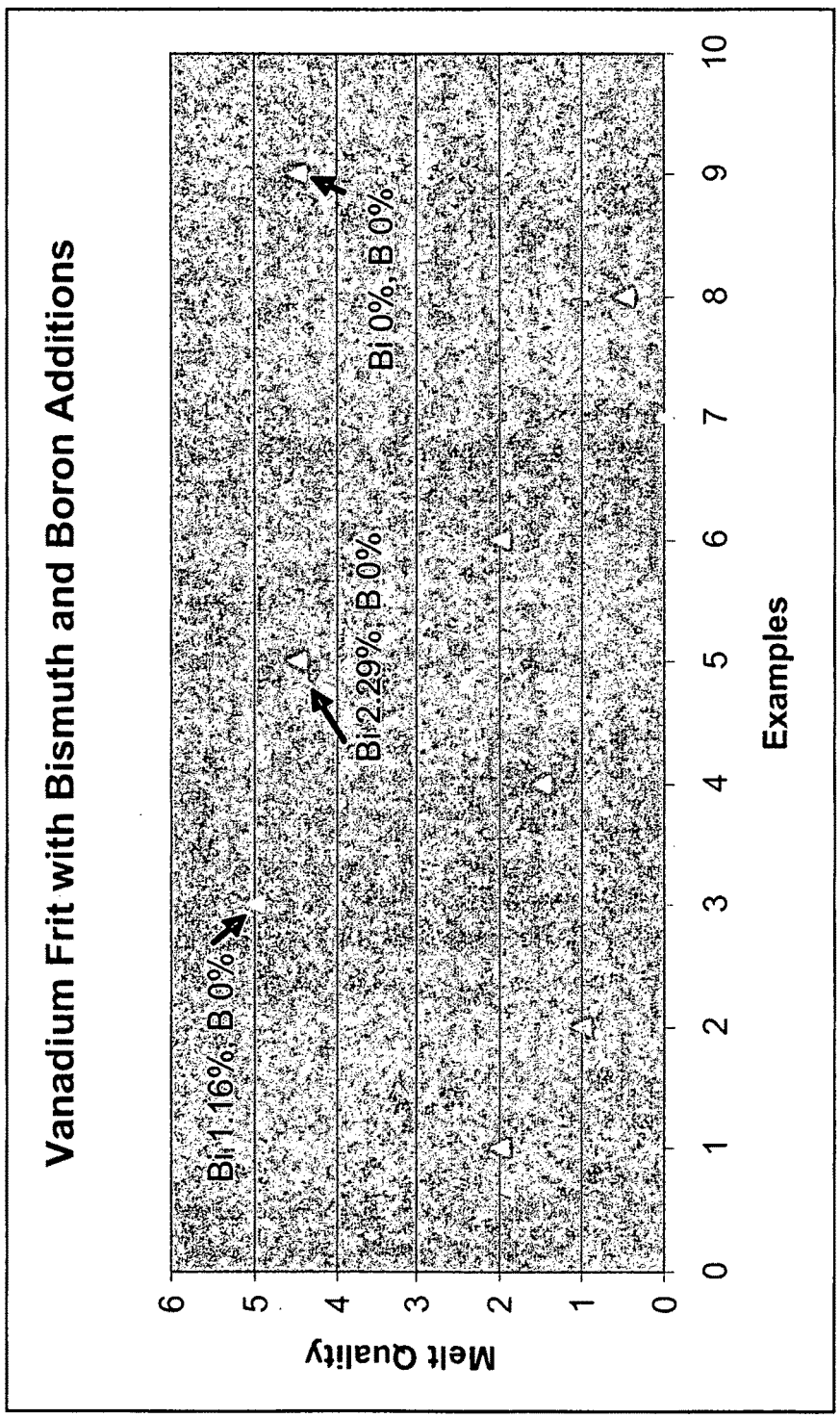
FIG. 9 is a graph showing results when additional elements are added to compositions according to certain example embodiments.

FIG. 9 shows a graph with results of adding additional elements (e.g., $Bi_2O_3$ and $B_2O_3$) to a vanadium based frit. Corresponding data shown in FIG. 9 is also displayed below in Table 3.

TABLE 3

| Ex. | V2O5 | BaO | ZnO | Bi2O3 | B2O3 | Tg(C.) | Tx1(C.) | DSC Responses |
|---|---|---|---|---|---|---|---|---|
| 1 | 65.39% | 14.87% | 12.46% | 0.00% | 7.28% | 320 | 430 | medium weak |
| 2 | 60.96% | 13.86% | 11.61% | 0.00% | 13.57% | 240 | 415 | very weak |
| 3 | 69.71% | 15.85% | 13.28% | 1.16% | 0.00% | 315 | 405 | strong peaks |
| 4 | 64.69% | 14.71% | 12.32% | 1.08% | 7.20% | 325 | 440 | very weak |
| 5 | 68.91% | 15.67% | 13.13% | 2.29% | 0.00% | 320 | 410 | medium weak |
| 6 | 64.00% | 14.56% | 12.19% | 2.13% | 7.12% | 320 | 425 | very weak |
| 7 | 59.74% | 13.59% | 11.38% | 1.99% | 13.30% | 315 | 410 | very weak |
| 8 | 60.34% | 13.72% | 11.49% | 1.00% | 13.43% | 315 | 400 | very weak |
| 9 | 70.53% | 16.04% | 13.43% | 0.00% | 0.00% | 315 | 380 | strong peaks |

In certain example embodiments, a strong DSC response may correspond to a good remelt quality. In certain example embodiments, the addition of bismuth in concentrations of between about 0% and 3% may result in increased remelt flow quality.

In certain example embodiments, a frit that includes $V_2O_5$, BaO, and ZnO may further include one or more additives. In certain example embodiments, the additives may be between about 0.5% and 15% weight. According to certain example embodiments, the additives may be added to a base composition that includes between about 50% and 60% weight $V_2O_5$, 27% and 33% weight BaO, and 9% and 12% weight ZnO.

Figure 10A:
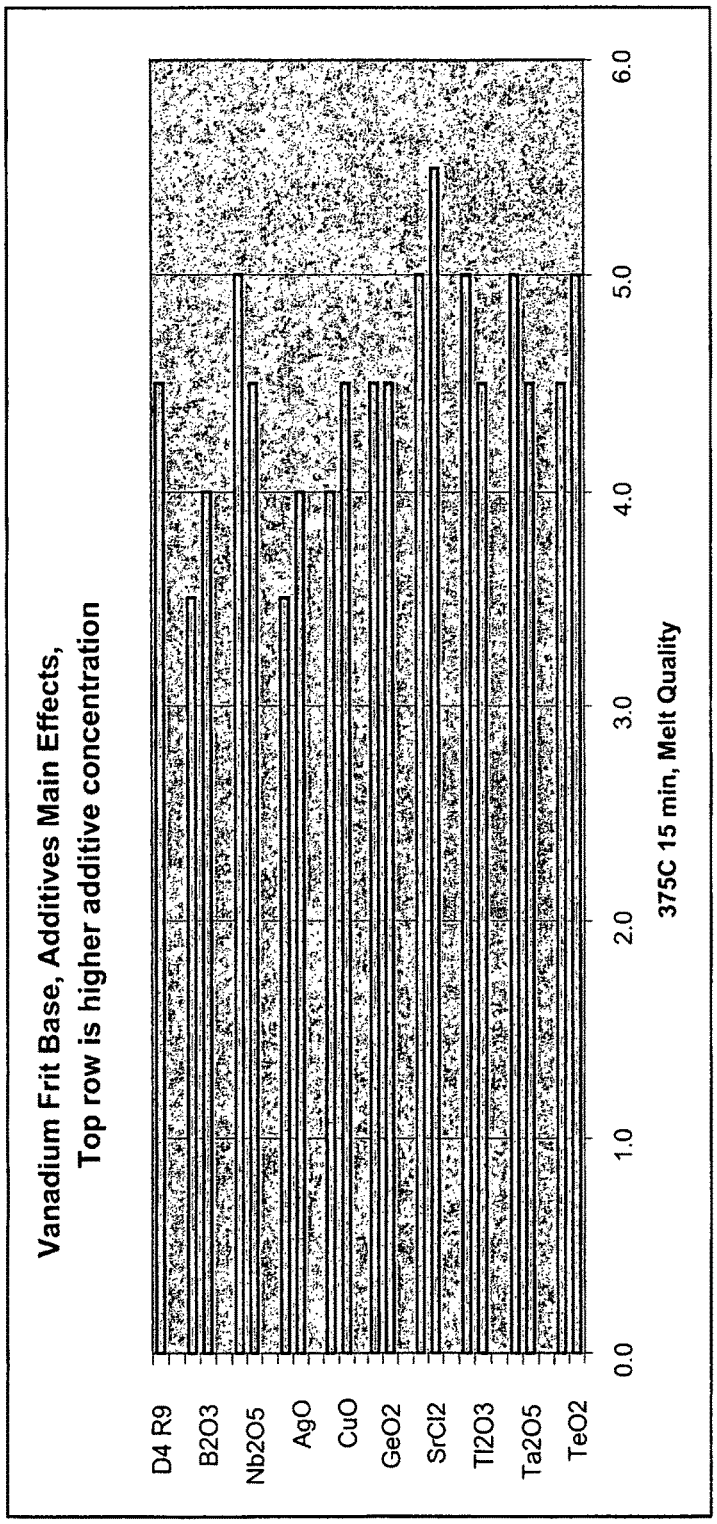
FIGS. 10A-10C show graphs summarizing impacts of additives being added to vanadium based frits according to certain example embodiments.
Figure 10B:
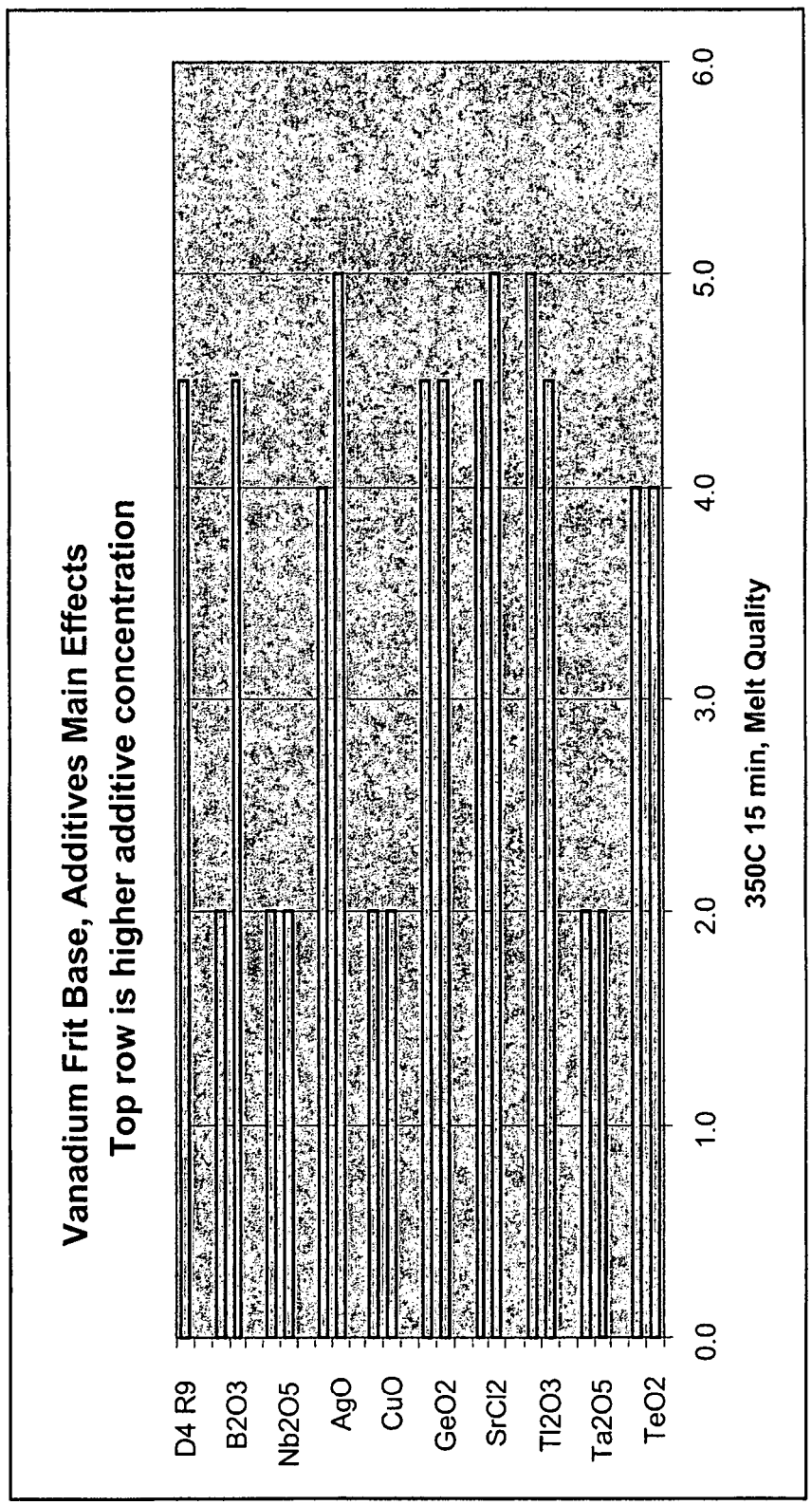
Figure 10C:
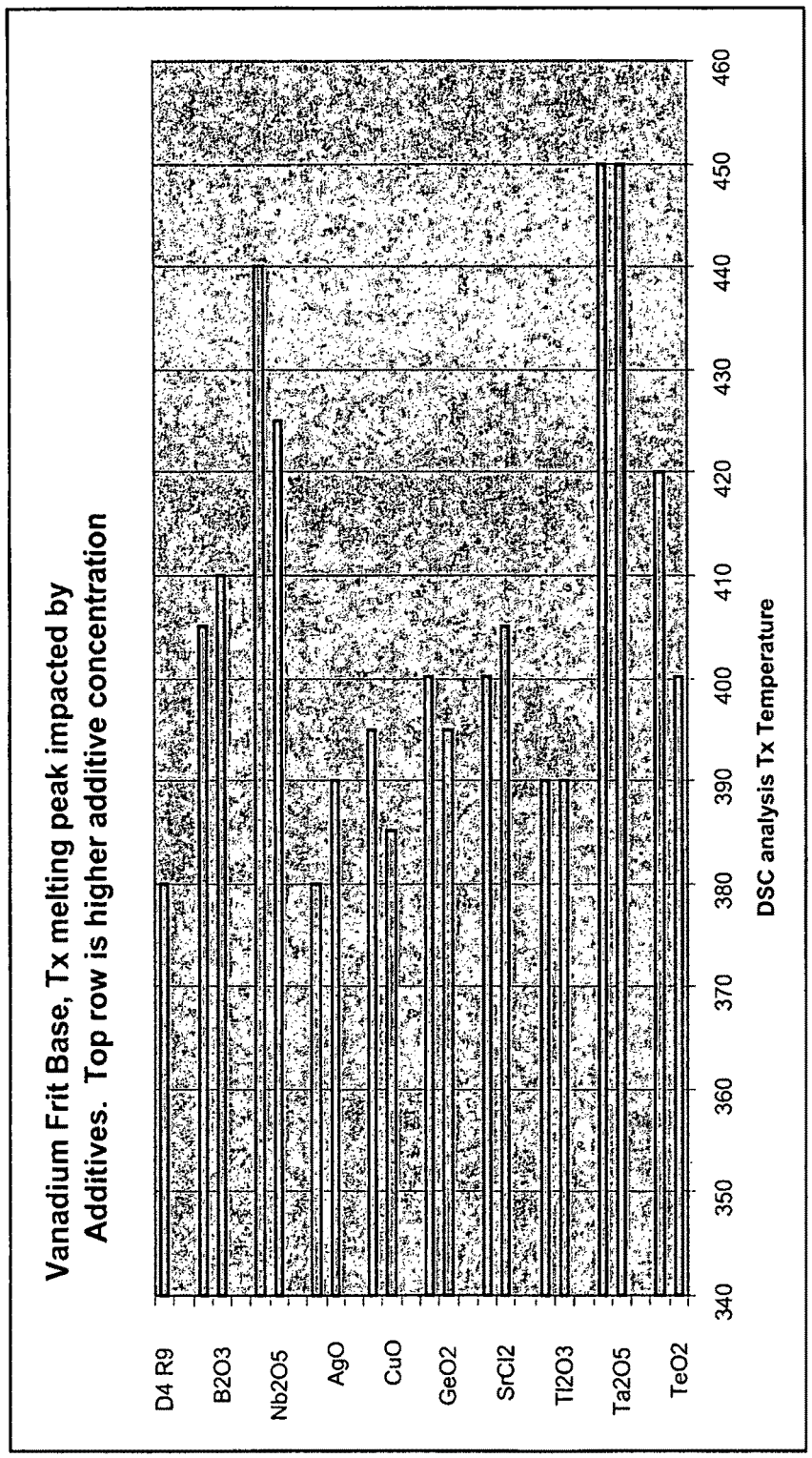

Below, Tables 4A-4D show results of including additives to the base composition of $V_2O_5$, BaO, and ZnO. Table 4D shows the melt quality on a scale of about 0 to 5 for each of the compositions. FIGS. 10A-10C show graphs corresponding to the data shown in the below tables. A BaCO3 factor of 1.2870 was used to form the BaO used for the following examples.

TABLE 4A

| | Weights (gm) | | | | | Normalized Weights | | | |
|---|---|---|---|---|---|---|---|---|---|
| Ex | V2O5 | BaO | ZnO | Additive Type | Amount | V2O5 | BaO | ZnO | Additive |
| 1 | 52.5 | 22.5 | 10 | TeO2 | 2 | 14.175 | 7.819 | 2.700 | 0.540 |
| 2 | 52.5 | 22.5 | 10 | TeO2 | 4 | 13.650 | 7.529 | 2.600 | 1.040 |
| 3 | 52.5 | 22.5 | 10 | Ta2O5 | 5 | 13.650 | 7.529 | 2.600 | 1.300 |
| 4 | 52.5 | 22.5 | 10 | Ta2O5 | 10 | 13.125 | 7.240 | 2.500 | 2.500 |
| 5 | 52.5 | 22.5 | 10 | Ti2O3 | 5 | 13.650 | 7.529 | 2.600 | 1.300 |
| 6 | 52.5 | 22.5 | 10 | Ti2O3 | 10 | 13.125 | 7.240 | 2.500 | 2.500 |
| 7 | 52.5 | 22.5 | 10 | SrCl2 | 2 | 14.175 | 7.819 | 2.700 | 0.540 |
| 8 | 52.5 | 22.5 | 10 | SrCl2 | 4 | 13.650 | 7.529 | 2.600 | 1.040 |
| 9 | 52.5 | 22.5 | 10 | GeO2 | 1 | 14.175 | 7.819 | 2.700 | 0.270 |
| 10 | 52.5 | 22.5 | 10 | GeO2 | 2 | 14.175 | 7.819 | 2.700 | 0.540 |
| 11 | 52.5 | 22.5 | 10 | CuO | 1 | 14.175 | 7.819 | 2.700 | 0.270 |
| 12 | 52.5 | 22.5 | 10 | CuO | 2 | 14.175 | 7.819 | 2.700 | 0.540 |
| 13 | 52.5 | 22.5 | 10 | AgO | 1.5 | 14.175 | 7.819 | 2.700 | 0.405 |
| 14 | 52.5 | 22.5 | 10 | AgO | 3 | 14.175 | 7.819 | 2.700 | 0.810 |
| 15 | 52.5 | 22.5 | 10 | Nb2O5 | 3 | 14.175 | 7.819 | 2.700 | 0.810 |
| 16 | 52.5 | 22.5 | 10 | Nb2O5 | 6 | 13.650 | 7.529 | 2.600 | 1.560 |
| 17 | 52.5 | 22.5 | 10 | B2O3 | .8 | 14.175 | 7.819 | 2.700 | 0.216 |
| 18 | 52.5 | 22.5 | 10 | B2O3 | 1.6 | 14.175 | 7.819 | 2.700 | 0.432 |

TABLE 4B

| | Normalized Weight Percentage | | | | Moles of Batch Composition | | | |
|---|---|---|---|---|---|---|---|---|
| Ex | V2O5 | BaO | ZnO | Additive | V2O5 | BaO | ZnO | Additive |
| 1 | 56.17 | 30.99 | 10.70 | 2.14 | 0.309 | 0.157 | 0.131 | 0.013 |
| 2 | 55.00 | 30.34 | 10.48 | 4.19 | 0.302 | 0.154 | 0.129 | 0.026 |
| 3 | 54.43 | 30.02 | 10.37 | 5.18 | 0.299 | 0.152 | 0.127 | 0.012 |
| 4 | 51.75 | 28.54 | 9.86 | 9.86 | 0.285 | 0.145 | 0.121 | 0.022 |
| 5 | 54.43 | 30.02 | 10.37 | 5.18 | 0.299 | 0.152 | 0.127 | 0.011 |
| 6 | 51.75 | 28.54 | 9.86 | 9.86 | 0.285 | 0.145 | 0.121 | 0.022 |
| 7 | 56.17 | 30.99 | 10.70 | 2.14 | 0.309 | 0.157 | 0.131 | 0.013 |
| 8 | 55.00 | 30.34 | 10.48 | 4.19 | 0.302 | 0.154 | 0.129 | 0.026 |
| 9 | 56.78 | 31.32 | 10.82 | 1.08 | 0.312 | 0.159 | 0.133 | 0.010 |
| 10 | 56.17 | 30.99 | 10.70 | 2.14 | 0.309 | 0.157 | 0.131 | 0.020 |
| 11 | 56.78 | 31.32 | 10.82 | 1.08 | 0.312 | 0.159 | 0.133 | 0.014 |
| 12 | 56.17 | 30.99 | 10.70 | 2.14 | 0.309 | 0.157 | 0.131 | 0.027 |
| 13 | 56.48 | 31.15 | 10.76 | 1.61 | 0.311 | 0.158 | 0.132 | 0.013 |
| 14 | 55.58 | 30.66 | 10.59 | 3.18 | 0.306 | 0.155 | 0.130 | 0.026 |
| 15 | 55.58 | 30.66 | 10.59 | 3.18 | 0.306 | 0.155 | 0.130 | 0.012 |
| 16 | 53.87 | 29.71 | 10.26 | 6.16 | 0.296 | 0.151 | 0.126 | 0.023 |
| 17 | 56.91 | 31.39 | 10.84 | 0.87 | 0.313 | 0.159 | 0.133 | 0.012 |
| 18 | 56.42 | 31.12 | 10.75 | 1.72 | 0.310 | 0.158 | 0.132 | 0.025 |

TABLE 4C

| | Normalized Moles | | | | | | | |
|---|---|---|---|---|---|---|---|---|
| Ex | V2O5 | BaO | ZnO | Additive | Tg (C.) | (Tx1 (C.) | Tx2 (C.) | Tx1 − Tg |
| 1 | 50.57% | 25.71% | 21.53% | 2.20% | 315 | 400 | 525 | 85 |
| 2 | 49.48% | 25.16% | 21.07% | 4.30% | 315 | 420 | 530 | 105 |
| 3 | 50.68% | 25.76% | 21.58% | 1.99% | 320 | 450 | | 130 |
| 4 | 49.69% | 25.26% | 21.16% | 3.90% | 320 | 450 | 530 | 130 |
| 5 | 50.71% | 25.78% | 21.59% | 1.92% | 305 | 390 | 495 | 85 |
| 6 | 49.75% | 25.29% | 21.18% | 3.77% | 295 | 390 | 470 | 95 |

TABLE 4C-continued

| | Normalized Moles | | | | | | | |
|---|---|---|---|---|---|---|---|---|
| Ex | V2O5 | BaO | ZnO | Additive | Tg (C.) | (Tx1 C.) | Tx2 (C.) | Tx1 − Tg |
| 7 | 50.56% | 25.70% | 21.53% | 2.21% | 315 | 405 | 530 | 90 |
| 8 | 49.47% | 25.15% | 21.06% | 4.32% | 315 | 400 | 530 | 85 |
| 9 | 50.83% | 25.84% | 21.64% | 1.68% | 315 | 395 | 530 | 80 |
| 10 | 49.99% | 25.41% | 21.28% | 3.31% | 315 | 400 | 530 | 85 |
| 11 | 50.56% | 25.71% | 21.53% | 2.20% | 315 | 385 | 525 | 70 |
| 12 | 49.47% | 25.15% | 21.06% | 4.31% | 320 | 395 | 545 | 75 |
| 13 | 50.61% | 25.73% | 21.55% | 2.12% | 305 | 390 | 525 | 85 |
| 14 | 49.55% | 25.19% | 21.10% | 4.16% | 300 | 380 | | 80 |
| 15 | 50.68% | 25.76% | 21.58% | 1.98% | 315 | 425 | 550 | 110 |
| 16 | 49.69% | 25.26% | 21.16% | 3.89% | 325 | 440 | 465 | 115 |
| 17 | 50.66% | 25.75% | 21.57% | 2.02% | 315 | 410 | 540 | 95 |
| 18 | 49.66% | 25.25% | 21.14% | 3.95% | 320 | 405 | 545 | 85 |

TABLE 4D

| Example | Melt Quality @ 375 C., 15 min | Melt Quality at 350 C., 15 min |
|---|---|---|
| 1 | 5.0 | 4.0 |
| 2 | 4.5 | 4.0 |
| 3 | 4.5 | 2.0 |
| 4 | 5.0 | 2.0 |
| 5 | 4.5 | 4.5 |
| 6 | 5.0 | 5.0 |
| 7 | 5.5+ | 5.0 |
| 8 | 5.0 | 4.5 |
| 9 | 4.5 | 4.5 |
| 10 | 4.5 | 4.5 |
| 11 | 4.5 | 2.0 |
| 12 | 4.0 | 2.0 |
| 13 | 4.0 | 5.0 |
| 14 | 3.5 | 4.0 |
| 15 | 4.5 | 2.0 |
| 16 | 5.0 | 2.0 |
| 17 | 4.0 | 4.5 |
| 18 | 3.5 | 2.0 |

In certain example embodiments, the molar composition of an additive to a base composition higher than is shown in tables 4A-4D. Table 5A shows additives with an increased additive amount (on a % mole basis). The base composition used with the additive amount may be based on, for example, the base composition shown in Row 1 of Tables 4A-4D. The additives shown in Table 5, in the selected quantities displayed, may improve melt quality when compared to the above base composition. A melt type of Glassy indicates that a "button" of the compound melted onto a glass plate, forming a homogenous glassy structure. Sinter indicates that the compound (in a powder form) fused together, but remained in a powder form.

TABLE 5

| Example | Additive Type | Amount | Melt Type (350 C. for 20 minutes) | Adhesion to glass substrate. |
|---|---|---|---|---|
| 1 | CuCl | 4.00% | Glassy | No Stick |
| 2 | SnCl2 | 3.99% | Glassy | No Stick |
| 3 | SnCl2 | 5.99% | Glassy, Slight Flow | Slight stick |
| 4 | SiO2 | 6.02% | More Glassy | No Stick |
| 5 | Al2O3 | 6.00% | Glassy | No Stick |
| 6 | CeO2 | 4.00% | Sinter | No Stick |
| 7 | TeO2 | 3.99% | Glassy | Slight stick |
| 8 | TeO2 | 6.01% | Glassy | Slight stick |
| 9 | Tl2O3 | 3.99% | Glassy, Slight Flow | No Stick |
| 10 | Tl2O3 | 6.01% | Glassy, Slight Flow | No Stick |

Figure 2:
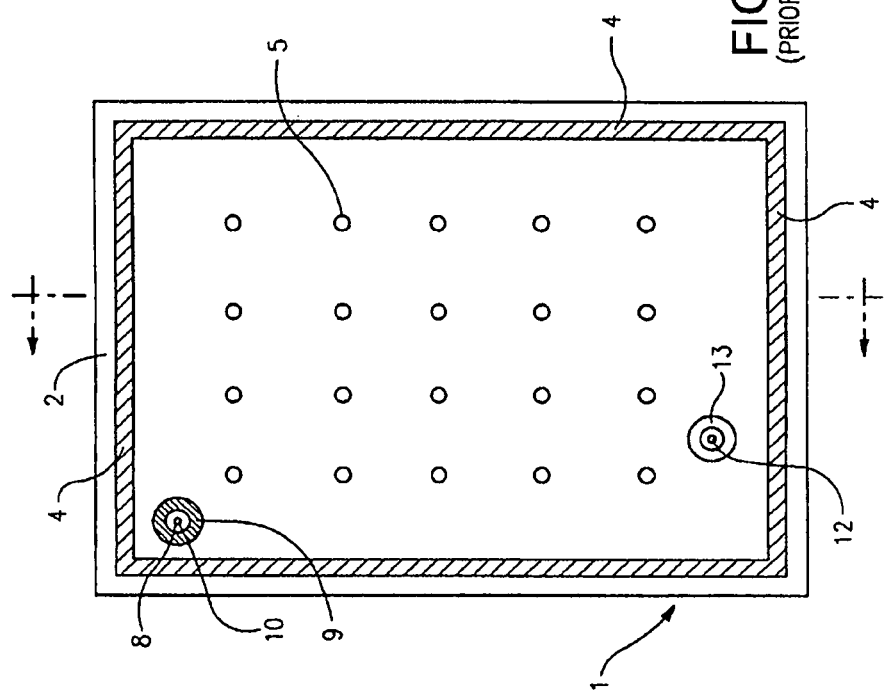
FIG. 2 is a top plan view of the bottom substrate, edge seal, and spacers of the FIG. 1 vacuum IG unit taken along the section line illustrated in FIG. 1.
Figure 1:
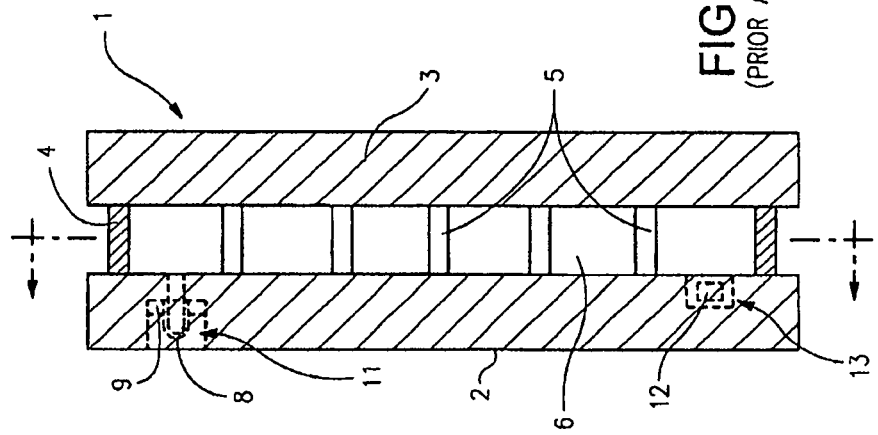
FIG. 1 is a cross-sectional view of a conventional vacuum IG unit.
Figure 3:
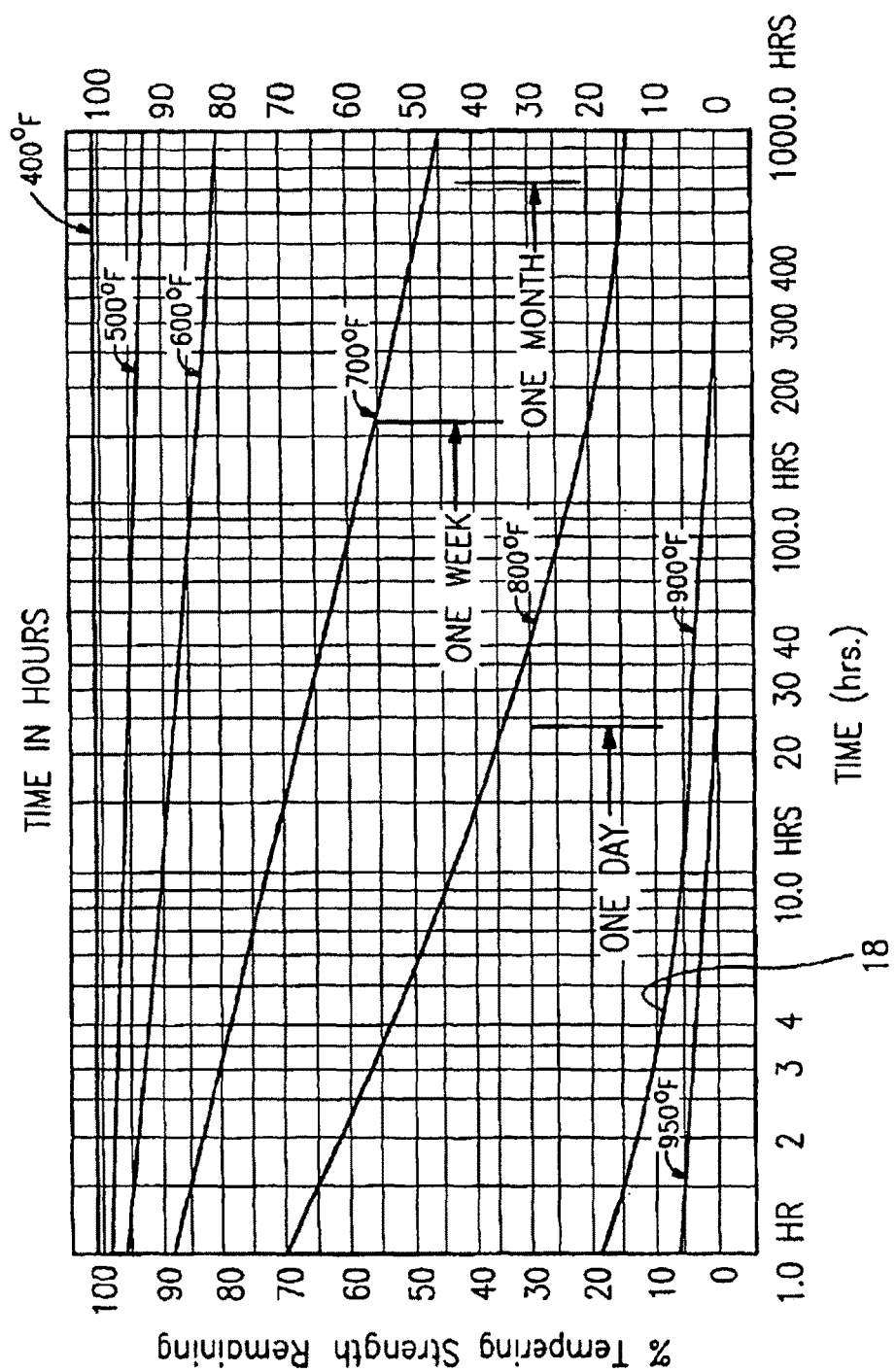
FIG. 3 is a graph correlating time (hours) versus percent tempering strength remaining, illustrating the loss of original temper strength for a thermally tempered sheet of glass after exposure to different temperatures for different periods of time.
Figure 4:
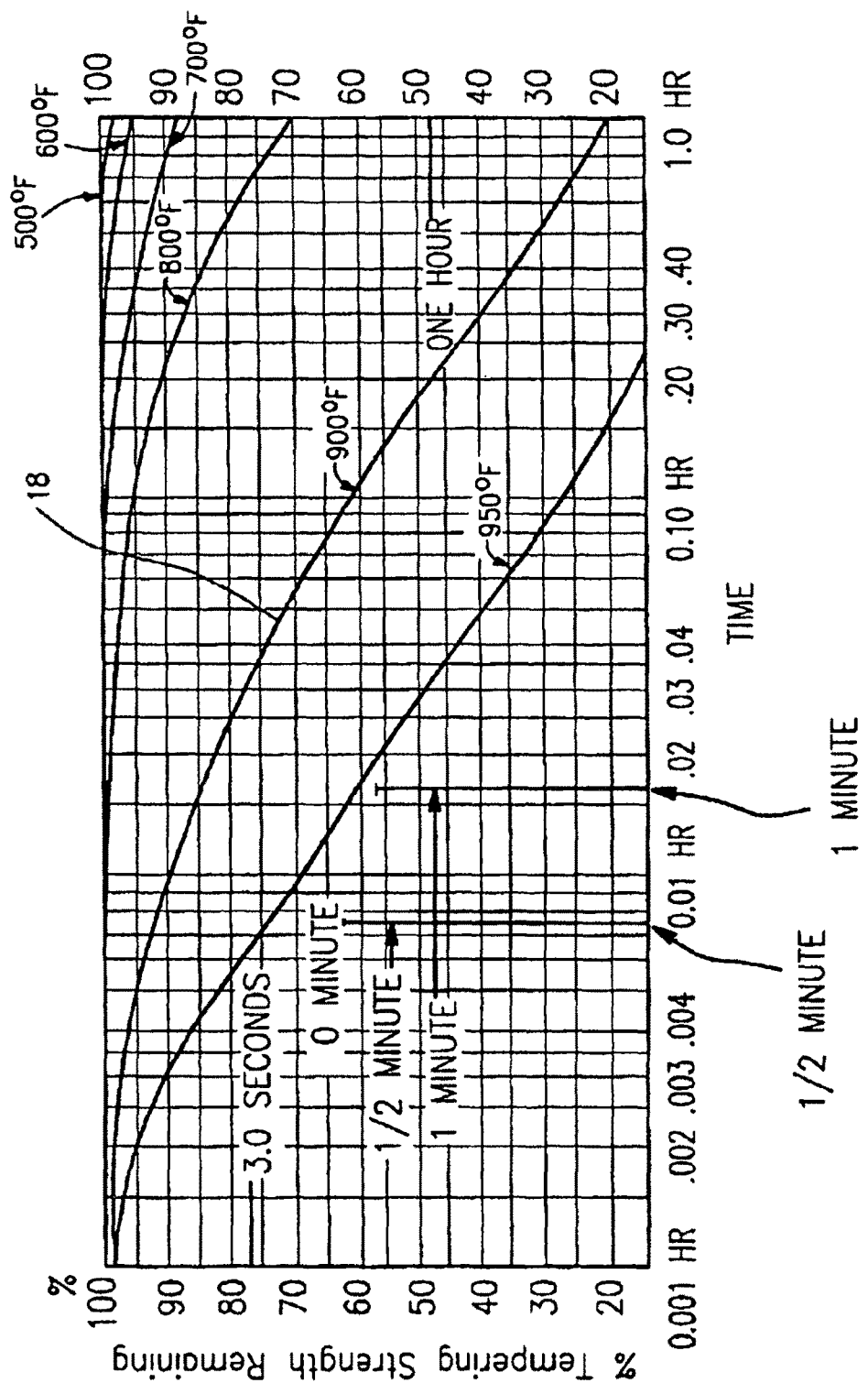
FIG. 4 is a graph correlating time versus percent tempering strength remaining similar to that of FIG. 3, except that a smaller time period is provided on the x-axis.

Accordingly, in certain example embodiments, additives of a relatively increased amount (e.g., versus those shown in FIG. 4) may be added to a base composition. In certain example embodiments, the additives may include, for example, CuCl, SnCl$_2$, SiO$_2$, Al$_2$O$_3$, and TeO$_2$. It will be appreciated that toxic nature of thallium oxide (Tl$_2$O$_3$) may preclude its use in certain instances.

In certain example embodiments, two or more additives may be included in a base compound. Table 6 shows the results of adding two additives to an exemplary base composition. Table 6 includes example melts at 375 and 350. Additionally, 13 mm buttons of the exemplary compounds were tested on a glass plate. The structural strength of the resulting exemplary compound are also shown in the far right column.

TABLE 6

| Ex | Add 1 | Add 2 | Amount 1 (Mole %) | Amount 2 (Mole %) | Melt Quality (375 C. 15-20 Min) | Melt Quality (350 C. 15-20 Min) | 13 mm Button 350 C. 20 Min | Strength |
|---|---|---|---|---|---|---|---|---|
| 1 | TeO2 | Al2O3 | 3.01 | 3.01 | 4.5 | 5.5 | glassy | Fractures |
| 2 | TeO2 | Al2O3 | 2.99 | 5.01 | 5 | 4 | glassy | Fractures |
| 3 | TeO2 | Al2O3 | 4.02 | 3.01 | 6 | 5.5 | glassy | Fractures |
| 4 | TeO2 | Al2O3 | 3.99 | 5.00 | 5 | 4.5 | glassy | Fractures |
| 5 | TeO2 | Al2O3 | 5.01 | 2.99 | 4.5 | 4.5 | glassy | Fractures |
| 6 | TeO2 | Al2O3 | 5.00 | 5.00 | 5 | 4.5 | glassy | Fractures |
| 7 | TeO2 | SiO$_2$ | 3.01 | 3.00 | 5 | 5.5 | glassy | Fractures |
| 8 | TeO2 | SiO$_2$ | 2.99 | 5.02 | 5 | 4.5 | glassy | Fractures |
| 9 | TeO2 | SiO$_2$ | 4.00 | 2.99 | 5 | 4 | glassy | Fractures |
| 10 | TeO2 | SiO$_2$ | 3.99 | 4.99 | 5 | 4.5 | Less glassy | Fractures |
| 11 | TeO2 | SiO$_2$ | 5.00 | 2.99 | 4.5 | 4.5 | Less glassy | Hard |
| 12 | TeO2 | SiO$_2$ | 5.00 | 4.99 | 4.5 | 4.5 | Less glassy | Hard |

TABLE 6-continued

| Ex | Add 1 | Add 2 | Amount 1 (Mole %) | Amount 2 (Mole %) | Melt Quality (375 C. 15-20 Min) | Melt Quality (350 C. 15-20 Min) | 13 mm Button 350 C. 20 Min | Strength |
|---|---|---|---|---|---|---|---|---|
| 13 | SnCl2 | Al2O3 | 3.01 | 3.01 | 5 | 6 | more glassy | Hard |
| 14 | SnCl2 | Al2O3 | 3.00 | 5.01 | 5 | 5.5 | glassy | Hard |
| 15 | SnCl2 | Al2O3 | 4.01 | 3.01 | 4.5 | 6 | glassy | Hard |
| 16 | SnCl2 | Al2O3 | 4.00 | 4.99 | 5.5 | 6 | glassy | Hard |
| 17 | SnCl2 | Al2O3 | 5.00 | 2.99 | 5.5 | 5.5 | glassy | Fractures |
| 18 | SnCl2 | Al2O3 | 5.00 | 5.00 | 5.5 | 5.5 | more glassy | Hard |
| 19 | SnCl2 | SiO2 | 3.00 | 3.00 | 4.5 | 4.5 | glassy | Hard |
| 20 | SnCl2 | SiO2 | 3.00 | 4.99 | 5 | 6 | glassy | Hard |
| 21 | SnCl2 | SiO2 | 4.00 | 2.99 | 6 | 6 | glassy | Fractures |
| 22 | SnCl2 | SiO2 | 4.01 | 4.99 | 5.5 | 5.5 | glassy | Fractures |
| 23 | SnCl2 | SiO2 | 5.00 | 2.99 | 5 | 5.5 | glassy | Hard |
| 24 | SnCl2 | SiO2 | 5.00 | 4.99 | 5.5 | 5.5 | glassy | Fractures |
| 25 | Al2O3 | SiO2 | 3.01 | 3.00 | 4.5 | 4 | less glassy | Hard |
| 26 | Al2O3 | SiO2 | 2.99 | 4.99 | 5 | 5.5 | less glassy | Hard |
| 27 | Al2O3 | SiO2 | 4.00 | 2.99 | 4.5 | 4.5 | less glassy | Hard |
| 28 | Al2O3 | SiO2 | 4.00 | 4.99 | 5 | 4.5 | less glassy | Hard |
| 29 | Al2O3 | SiO2 | 5.01 | 2.99 | 5 | 4.5 | less glassy | Hard |
| 30 | Al2O3 | SiO2 | 5.01 | 4.99 | 4 | 2 | less glassy | Hard |

Accordingly, certain example may include two additives similar to those found in examples 3, 16, and 21 as shown in Table 6 (e.g., TeO2 with SiO2, SnCl2 with Al2O3, and SnCl2 with SiO2). In certain example embodiments, the addition of two or more additives may have beneficial results on an exemplary base composition. For example the addition of SiO2 to another additive may increase the strength of the overall frit. Alternatively, or in addition, TeO2 combined with other additives may increase the melt flow and glass wetting qualities of the frit when compared to a base frit.

In certain example embodiments, the combination of SnCl2 with SiO2 and/or Al2O3 may result in an increase in structural strength for the resulting frit material.

In certain example embodiments, one or more additives may be added to a base composition where the amount is between 1% and 10% by weight or between about 1% and 6% normalized moles for a batch. In certain example embodiments, additives may be added in a smaller amount, for example between about 0.1% and 1% by weight. In certain example embodiments a batch for a base composition (in grams) may include $V_2O_5$ at 52.5, BaO at 22.5, ZnO at 10. In certain example embodiments, additives added to the above base composition may include: 1) TeO2 at 3.85 gm and Al2O3 at 1.84 gm; 2) SnCl2 at 4.65 gm and Al2O3 at 3.12 gm; 3) SnCl2 at 4.55 gm and SiO2 at 1.08 gm. Correspondingly, the additives may then have a normalize weight percentage of: 1) TeO2 at 1.00 and $Al_2O_3$ at 0.48; 2) SnCl2 at 1.21 and Al2O3 at 0.81; 3) SnCl2 at 1.18 and SiO2 at 0.28. These examples may correspond to examples 3, 16, and 21 in the above table 6.

Figure 11A:
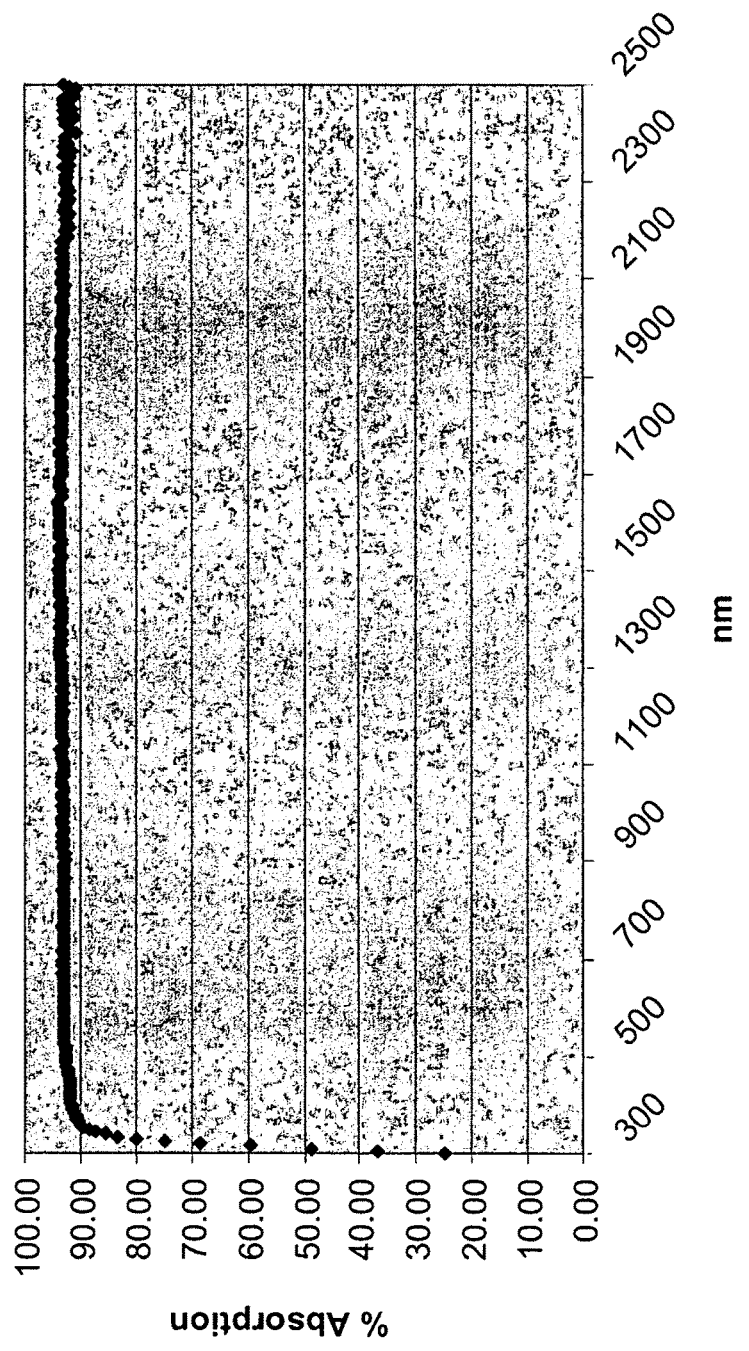
FIGS. 11A-11C show graphs summarizing absorption in the visible and infrared wavelengths for vanadium based frits according to certain example embodiments.
Figure 11B:
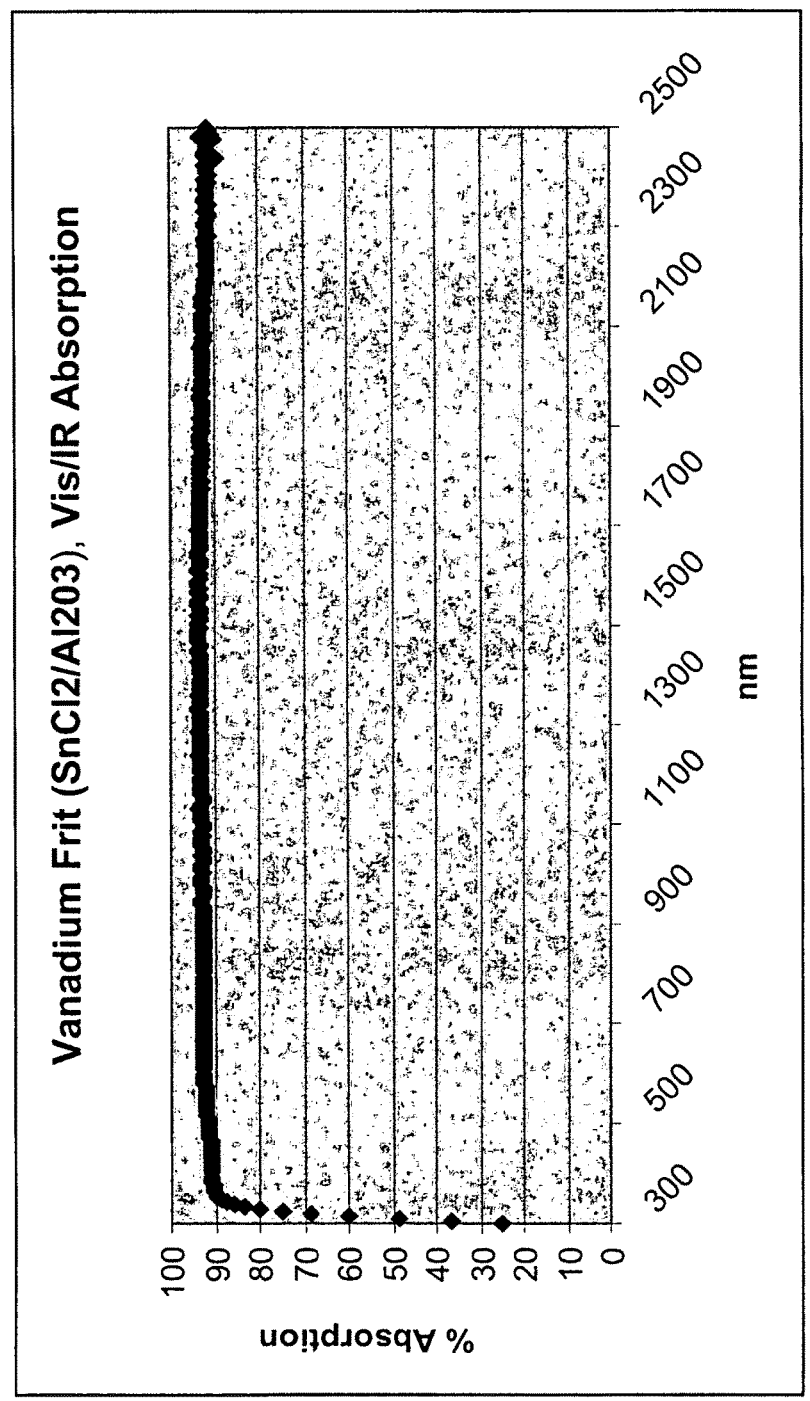
Figure 11C:
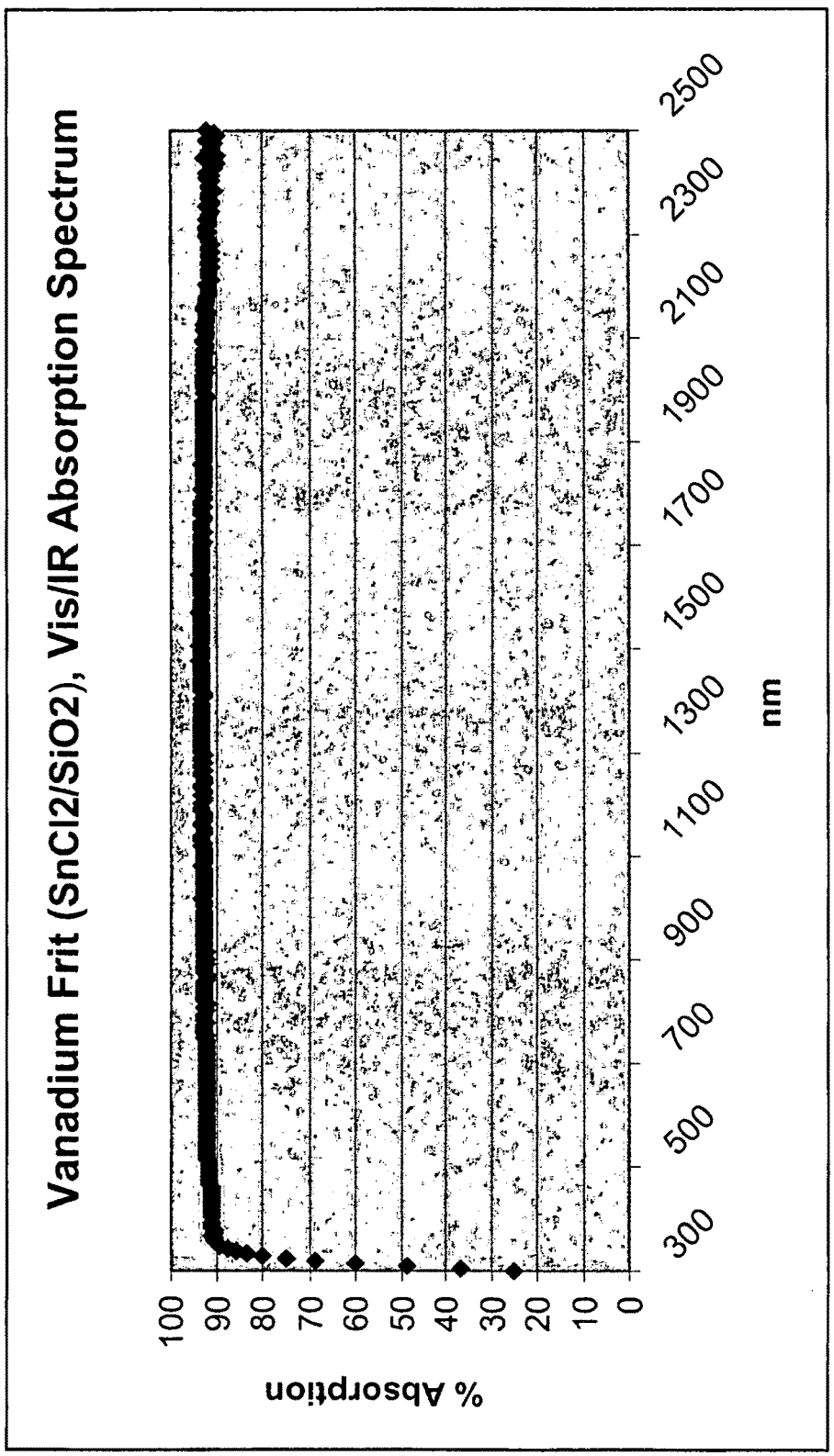

FIGS. 11A-11C show graphs illustrating absorption in the visible and infrared wavelengths for vanadium based frits according to certain example embodiments. As shown in the graphs, example vanadium based frits may have absorption of at least 90% across a substantial breath of the visible and IR spectrum. In certain example embodiments the absorption may be about 95%. As discussed in co-pending application Ser. No. 12/929,874, filed on Feb. 22, 2011, entitled "IMPROVED FRIT MATERIALS AND/OR METHOD OF MAKING VACUUM INSULATING GLASS UNITS INCLUDING THE SAME", the entire contents of which are incorporated herein by reference, frit materials with high visible/IR absorption may be advantageous.

FIG. 11A shows the absorption properties of a vanadium based frit with $TeO_2$ and $Al_2O_3$ used as additives (e.g., Ex. 3 of Table 6). FIG. 11B shows the absorption properties of a vanadium based frit with $SnCl_2$ and $Al_2O_3$ used as additives (e.g., Ex. 16 of Table 6). FIG. 11C shows the absorption properties of a vanadium based frit with $SnCl_2$ and $SiO_2$ used as additives (e.g., Ex. 21 of Table 6).

In certain example embodiments, the application of IR energy to a frit material may be based on a heating profile where the IR energy applied to the frit varies over time. Exemplary heating profiles may be found in co-pending application Ser. No. 12/929,874, the entire contents of which are incorporated herein by reference.

In certain example embodiments, a base composition may be augmented by 3 or 4 additives. For example, a batch for a base composition (in grams) may include $V_2O_5$ at 52.5, BaO at 22.5, ZnO at 10. Accordingly, three and/or more additives from among TeO2, SnCl2, Al2O3, and SiO2 may be selected to augment the base composition. The ranges (in grams) for the additives may vary between 0 to 7.5 grams per additive. Thus, on a normalized molar percentage the above additives may be included at between 0% and 6%. Thus, the normalized molar percentage of a base composition may be $V_2O_5$ at between about 43% and 50%, BaO between about 22% and 26%, ZnO between about 18% and 22%. In certain example embodiments, additives (on a normalized molar basis) of TeO2 at around 2%, SnCl2 around 2%, Al2O3 around 2%, and SiO2 around 4% may be added to the base composition.

The techniques, compositions, etc disclosed herein may be used other methods and/or systems for forming a VIG unit. For example, a vanadium based frit may be used to form an edge seal of a VIG unit. Systems, apparatuses, and/or methods used for creating a VIG unit may be described in co-pending application Ser. No. 12/929,876, filed on Feb. 22, 2011, entitled "LOCALIZED HEATING TECHNIQUES INCORPORATING TUNABLE INFRARED ELEMENT(S) FOR VACUUM INSULATING GLASS UNITS, AND/OR APPARATUSES FOR THE SAME", the entire contents of which are hereby incorporated by reference.

Certain example embodiments may include three or more additives to a base composition that includes vanadium pentaoxide; barium carbonate that coverts in whole or in part to barium oxide; and zinc oxide. The above three "base" frit elements may be included at 35-55% molar for $V_2O_5$, 15-35% for BaO, and 15-25% molar for ZnO or, more preferably, 40-50% molar for $V_2O_5$, 20-30% for BaO, and 18-22% molar for ZnO.

Along with an example base frit composition, one or more additives may be added. The additives may include, for example:
1) $SnCl_2$ at between 1-10% molar, which may help reduce glass softening temperatures and/or reduce crystallization in certain example embodiments;
2) $CuCl_2$ at between 1-5% molar, which may help reduce glass softening temperature in certain example embodiments;
3) $MoO_3$ at between 1-6% molar, which may help reduce glass softening temperatures in certain example embodiments;
4) $TeO_2$ at between 1-10% molar, which may help increase glass flow ability and/or wetting to a substrate glass in certain example embodiments;
5) $Ta_2O_5$ at between 0.5-5% molar, which may help increase softening temperature and/or increase crystallization temperature in certain example embodiments;
6) $Nb_2O_5$ at between 0.5-6% molar, which may help increase softening temperature and/or increase crystallization temperature in certain example embodiments;
7) $Al_2O_3$ at between 0.5-5% molar, which may help increase softening, weathering ability, chemical durability, and/or mechanical strength in certain example embodiments;
8) $SiO_2$ at between 0.5-5% molar, which may help increase softening, weathering ability, chemical durability, and/or mechanical strength in certain example embodiments; and
9) $CsCO_3$ at between 0.5-4% molar, which may help increase melt flow and/or reduce wetting ability in certain example embodiments.

In certain example embodiments, four or more additives, more preferably six or more additives may be added to the above base composition. It will be appreciated that as the number of the additives increases, the interactions between the various additives may produce different results based on the relative weighting of one or more additives (or the base composition). It also will be appreciated that the increased number of additives may create synergistic effects (e.g., in terms of glass softening temperature, flowability, and/or other adjustments) that otherwise might not be observable.

In certain example embodiments, one or more additives may be introduced through the frit creation process rather than being expressly introduced. For example, additive ingredients may be introduced into a frit material as a result of firing the frit material in a crucible. For instance, some ingredients may be "leached" from the crucible and into the frit material. In certain example embodiments, $Al_2O_3$ and $SiO_2$ may be leached by this process.

Tables 7-10 show example frit compositions according to certain example embodiments. The different tables each include one or more additives that are varied while the other ingredients are kept substantially the same between the example compounds of the give table.

In tables 7A-7C, molybdenum oxide is varied between the example compounds; in tables 8A-8C tellurium oxide is varied between the example compounds; in tables 9A-9C cesium carbonate is varied between the example compounds; and in tables 10A-10D tantalum oxide and niobium oxide are varied between the example compounds.

Tables 7A, 8A, 9A, and 10A show the example frit compositions by normalized weight percentage. Tables 7B, 8B, 9B, and 10B show the example frit compositions by normalized mole percent. The values given in tables 7-10 A and B are normalized to approximately 100% for shown compositions. For example, $V_2O_5$ from example 1 in table 7A is 54.88% by weight of the frit composition for the frit composition. Similarly, $V_2O_5$ for the same example frit composition is shown as 49.76% mole of the resulting frit composition (e.g., from Table 7B). Thus, the normalized weight and mole percentages may add up to about 100% for the example frit compositions shown in the various tables herein. Tables 7C, 8C, 9C, 10C, and 10D show exemplary results for the example frit compositions. As can be seen in the results of the above noted tables (e.g., tables 7-10), performance of one or more of the above examples may be improved over a base frit material, or a frit material with only one additive as discussed above. For example, example frit materials 9 and 11 shown in Table 8 show good flow at 375 degrees C. (5 and 6.5, respectively).

TABLE 7A $MoO_3$ Examples

Normalized Weight Percentage

| Example | $V_2O_5$ | BaO | ZnO | $MoO_3$ | $TeO_2$ | $Ta_2O_5$ | $Al_2O_3$ | $SiO_2$ | $Nb_2O_5$ |
|---|---|---|---|---|---|---|---|---|---|
| 1 | 54.88 | 26.61 | 10.45 | 0.87 | 4.15 | 1.38 | 0.00 | 0.00 | 1.65 |
| 2 | 54.64 | 26.49 | 10.41 | 1.31 | 4.13 | 1.37 | 0.00 | 0.00 | 1.64 |
| 3 | 54.39 | 26.38 | 10.36 | 1.75 | 4.11 | 1.37 | 0.00 | 0.00 | 1.64 |
| 4 | 54.15 | 26.26 | 10.31 | 2.19 | 4.10 | 1.36 | 0.00 | 0.00 | 1.63 |
| 5 | 53.91 | 26.14 | 10.27 | 2.63 | 4.08 | 1.36 | 0.00 | 0.00 | 1.62 |
| 6 | 53.67 | 26.02 | 10.22 | 3.07 | 4.06 | 1.35 | 0.00 | 0.00 | 1.62 |

TABLE 7B

MoO₃ Examples

Normalized Moles of Batch Composition

| Ex. | $V_2O_5$ | BaO | ZnO | $MoO_3$ | $TeO_2$ | $Ta_2O_5$ | $Al_2O_3$ | $SiO_2$ | $Nb_2O_5$ |
|---|---|---|---|---|---|---|---|---|---|
| 1 | 49.76% | 22.24% | 21.18% | 0.99% | 4.29% | 0.51% | 0.00% | 0.00% | 1.02% |
| 2 | 49.50% | 22.12% | 21.08% | 1.50% | 4.27% | 0.51% | 0.00% | 0.00% | 1.02% |
| 3 | 49.25% | 22.01% | 20.97% | 2.00% | 4.24% | 0.51% | 0.00% | 0.00% | 1.01% |
| 4 | 49.00% | 21.90% | 20.86% | 2.50% | 4.22% | 0.51% | 0.00% | 0.00% | 1.01% |
| 5 | 48.75% | 21.79% | 20.75% | 3.00% | 4.20% | 0.50% | 0.00% | 0.00% | 1.00% |
| 6 | 48.50% | 21.67% | 20.65% | 3.50% | 4.18% | 0.50% | 0.00% | 0.00% | 1.00% |

TABLE 7C

MoO₃ Examples

Test Results

| Ex. | Slides 350 C. 15 min | Slides 375 C. 15 min | 375 C. 13 mm button 20 min | Results | 400 C. 13 mm button 20 min | Results |
|---|---|---|---|---|---|---|
| 1 | 5.0 | 5.5 | 12.39 | glass | 13.76 | light haze |
| 2 | 3.0 | 4.5 | 12.80 | glass | 14.06 | light haze |
| 3 | 4.0 | 5.5 | 12.51 | glass | 14.14 | light haze |
| 4 | 4.5 | 5.0 | 13.08 | glass | 14.22 | light haze |
| 5 | 5.5 | 5.0 | 12.93 | glass | 14.26 | light haze |
| 6 | 5.5 | 5.5 | 12.88 | glass | 14.50 | light haze |

TABLE 8A

TeO₂ Examples

Normalized Weight Percentage

| Example | $V_2O_5$ | BaO | ZnO | $MoO_3$ | $TeO_2$ | $Ta_2O_5$ | $Al_2O_3$ | $SiO_2$ | $Nb_2O_5$ |
|---|---|---|---|---|---|---|---|---|---|
| 7  | 54.84 | 26.59 | 10.45 | 2.67 | 2.42 | 1.38 | 0.00 | 0.00 | 1.65 |
| 8  | 54.56 | 26.46 | 10.39 | 2.66 | 2.91 | 1.37 | 0.00 | 0.00 | 1.64 |
| 9  | 54.29 | 26.33 | 10.34 | 2.65 | 3.39 | 1.37 | 0.00 | 0.00 | 1.63 |
| 10 | 54.02 | 26.19 | 10.29 | 2.63 | 3.88 | 1.36 | 0.00 | 0.00 | 1.63 |
| 11 | 53.74 | 26.06 | 10.24 | 2.62 | 4.37 | 1.35 | 0.00 | 0.00 | 1.62 |
| 12 | 53.47 | 25.93 | 10.18 | 2.61 | 4.86 | 1.34 | 0.00 | 0.00 | 1.61 |
| 13 | 53.20 | 25.80 | 10.13 | 2.59 | 5.34 | 1.34 | 0.00 | 0.00 | 1.60 |
| 14 | 52.92 | 25.66 | 10.08 | 2.58 | 5.83 | 1.33 | 0.00 | 0.00 | 1.59 |

TABLE 8B

TeO₂ Examples

Normalized Moles of Batch Composition

| Ex. | $V_2O_5$ | BaO | ZnO | $MoO_3$ | $TeO_2$ | $Ta_2O_5$ | $Al_2O_3$ | $SiO_2$ | $Nb_2O_5$ |
|---|---|---|---|---|---|---|---|---|---|
| 7  | 49.61% | 22.17% | 21.12% | 3.06% | 2.50% | 0.51% | 0.00% | 0.00% | 1.02% |
| 8  | 49.36% | 22.06% | 21.01% | 3.04% | 3.00% | 0.51% | 0.00% | 0.00% | 1.02% |
| 9  | 49.11% | 21.95% | 20.91% | 3.03% | 3.50% | 0.51% | 0.00% | 0.00% | 1.01% |
| 10 | 48.85% | 21.83% | 20.80% | 3.01% | 4.00% | 0.51% | 0.00% | 0.00% | 1.01% |
| 11 | 48.59% | 21.72% | 20.69% | 2.99% | 4.50% | 0.50% | 0.00% | 0.00% | 1.00% |
| 12 | 48.34% | 21.60% | 20.58% | 2.98% | 5.00% | 0.50% | 0.00% | 0.00% | 1.00% |
| 13 | 48.09% | 21.49% | 20.47% | 2.96% | 5.50% | 0.50% | 0.00% | 0.00% | 0.99% |
| 14 | 47.83% | 21.38% | 20.36% | 2.95% | 6.00% | 0.49% | 0.00% | 0.00% | 0.98% |

TABLE 8C

TeO$_2$ Examples

Test Results

| Ex. | Slides 350 C. 15 min | Slides 375 C. 15 min | 375 C. 13 mm button 20 min | Results | 400 C. 13 mm button 20 min | Results |
|---|---|---|---|---|---|---|
| 7 | 5.5 | 6.0 | 12.89 | glass | 14.37 | haze |
| 8 | 3.0 | 6.5 | 13.08 | glass | 14.63 | light haze |
| 9 | 3.0 | 5.0 | 13.38 | glass | 14.93 | light haze |
| 10 | 6.5 | 5.0 | 13.17 | glass | 14.66 | light haze |
| 11 | 4.5 | 6.5 | 13.04 | glass | 14.72 | glass |
| 12 | 6.0 | 6.5 | 12.72 | glass | 14.53 | light haze |
| 13 | 5.5 | 5.0 | 12.94 | glass | 14.59 | light haze |
| 14 | 5.5 | 6.0 | 13.24 | glass | 14.92 | light haze |

TABLE 9A

CsCO$_3$ Examples

Normalized Weight Percentage

| Example | V$_2$O$_5$ | BaO | ZnO | MoO$_3$ | TeO$_2$ | Ta$_2$O$_5$ | Al$_2$O$_3$ | SiO$_2$ | Nb$_2$O$_5$ | CsCO$_3$ |
|---|---|---|---|---|---|---|---|---|---|---|
| 15 | 52.95 | 25.68 | 10.09 | 2.58 | 4.31 | 1.33 | 0.00 | 0.00 | 1.59 | 1.47 |
| 16 | 52.69 | 25.55 | 10.04 | 2.57 | 4.29 | 1.32 | 0.00 | 0.00 | 1.59 | 1.97 |
| 17 | 52.43 | 25.43 | 9.99 | 2.56 | 4.26 | 1.32 | 0.00 | 0.00 | 1.58 | 2.44 |
| 18 | 52.17 | 25.30 | 9.94 | 2.54 | 4.24 | 1.31 | 0.00 | 0.00 | 1.57 | 2.92 |
| 19 | 51.91 | 25.17 | 9.89 | 2.53 | 4.22 | 1.31 | 0.00 | 0.00 | 1.56 | 3.41 |
| 20 | 51.65 | 25.05 | 9.84 | 2.52 | 4.20 | 1.30 | 0.00 | 0.00 | 1.55 | 3.89 |

TABLE 9B

CsCO$_3$ Examples

Normalized Moles of Batch Composition (%)

| Ex. | V$_2$O$_5$ | BaO | ZnO | MoO$_3$ | TeO$_2$ | Ta$_2$O$_5$ | Al$_2$O$_3$ | SiO$_2$ | Nb$_2$O$_5$ | CsCO$_3$ |
|---|---|---|---|---|---|---|---|---|---|---|
| 15 | 48.23 | 21.55 | 20.53 | 2.97 | 4.47 | 0.50 | 0.00 | 0.00 | 0.99 | 0.75 |
| 16 | 48.11 | 21.50 | 20.48 | 2.96 | 4.46 | 0.50 | 0.00 | 0.00 | 0.99 | 1.00 |
| 17 | 47.99 | 21.45 | 20.43 | 2.96 | 4.45 | 0.50 | 0.00 | 0.00 | 0.99 | 1.25 |
| 18 | 47.87 | 21.39 | 20.38 | 2.95 | 4.44 | 0.50 | 0.00 | 0.00 | 0.99 | 1.50 |
| 19 | 47.74 | 21.34 | 20.33 | 2.94 | 4.43 | 0.49 | 0.00 | 0.00 | 0.98 | 1.75 |
| 20 | 47.62 | 21.28 | 20.27 | 2.93 | 4.41 | 0.49 | 0.00 | 0.00 | 0.98 | 2.00 |

TABLE 9C

CsCO₃ Examples

Test Results

| Ex. | Slide 350 C.-15 min | Slide 375 C.-15 min | 13 mm button-375 C. 20 min | Results | 13 mm button-400 C. 20 min | Results |
|---|---|---|---|---|---|---|
| 15 | 5.5 | 6.5 | 13.40 | glass | 14.88 | haze |
| 16 | 5.5 | 5.5 | 13.05 | glass | 15.40 | glass |
| 17 | 4.0 | 6.5 | 13.60 | glass | 15.17 | light haze |
| 18 | 4.5 | 6.5 | 13.33 | glass | 14.81 | haze |
| 19 | 6.0 | 4.5 | 13.28 | glass | 14.59 | haze |
| 20 | 4.5 | 7.0 | 13.97 | glass | 16.36 | light haze |

TABLE 10A

Ta₂O₅ and Nb₂O₅ Examples

Normalized Weight Percentage

| Example | $V_2O_5$ | BaO | ZnO | $MoO_3$ | $TeO_2$ | $Ta_2O_5$ | $Al_2O_3$ | $SiO_2$ | $Nb_2O_5$ |
|---|---|---|---|---|---|---|---|---|---|
| 21 | 53.87 | 26.12 | 10.26 | 2.63 | 3.37 | 1.34 | 0.00 | 0.00 | 2.41 |
| 22 | 53.42 | 25.90 | 10.18 | 2.60 | 3.34 | 1.34 | 0.00 | 0.00 | 3.22 |
| 23 | 52.98 | 25.69 | 10.09 | 2.58 | 3.31 | 1.33 | 0.00 | 0.00 | 4.01 |
| 24 | 53.59 | 25.99 | 10.21 | 2.61 | 3.35 | 2.65 | 0.00 | 0.00 | 1.60 |
| 25 | 53.15 | 25.77 | 10.12 | 2.59 | 3.32 | 2.65 | 0.00 | 0.00 | 2.39 |
| 26 | 52.71 | 25.56 | 10.04 | 2.57 | 3.29 | 2.65 | 0.00 | 0.00 | 3.18 |
| 27 | 52.28 | 25.35 | 9.96 | 2.55 | 3.27 | 2.63 | 0.00 | 0.00 | 3.97 |
| 28 | 52.86 | 25.63 | 10.07 | 2.58 | 3.30 | 3.97 | 0.00 | 0.00 | 1.59 |
| 29 | 52.43 | 25.43 | 9.99 | 2.56 | 3.28 | 3.94 | 0.00 | 0.00 | 2.38 |
| 30 | 52.00 | 25.21 | 9.90 | 2.54 | 3.25 | 3.94 | 0.00 | 0.00 | 3.16 |
| 31 | 51.57 | 25.01 | 9.82 | 2.51 | 3.22 | 3.93 | 0.00 | 0.00 | 3.93 |

TABLE 10B

Ta₂O₅ and Nb₂O₅ Examples

Normalized Moles of Batch Composition

| Ex. | $V_2O_5$ | BaO | ZnO | $MoO_3$ | $TeO_2$ | $Ta_2O_5$ | $Al_2O_3$ | $SiO_2$ | $Nb_2O_5$ |
|---|---|---|---|---|---|---|---|---|---|
| 21 | 48.87% | 21.84% | 20.81% | 3.01% | 3.48% | 0.50% | 0.00% | 0.00% | 1.50% |
| 22 | 48.61% | 21.73% | 20.70% | 3.00% | 3.46% | 0.50% | 0.00% | 0.00% | 2.00% |
| 23 | 48.37% | 21.62% | 20.59% | 2.98% | 3.44% | 0.50% | 0.00% | 0.00% | 2.50% |
| 24 | 48.87% | 21.84% | 20.81% | 3.01% | 3.48% | 1.00% | 0.00% | 0.00% | 1.00% |
| 25 | 48.62% | 21.73% | 20.70% | 3.00% | 3.46% | 1.00% | 0.00% | 0.00% | 1.50% |
| 26 | 48.37% | 21.62% | 20.59% | 2.98% | 3.44% | 1.00% | 0.00% | 0.00% | 2.00% |
| 27 | 48.12% | 21.51% | 20.49% | 2.96% | 3.43% | 1.00% | 0.00% | 0.00% | 2.50% |
| 28 | 48.62% | 21.73% | 20.70% | 3.00% | 3.46% | 1.50% | 0.00% | 0.00% | 1.00% |
| 29 | 48.37% | 21.62% | 20.59% | 2.98% | 3.44% | 1.50% | 0.00% | 0.00% | 1.50% |
| 30 | 48.12% | 21.50% | 20.49% | 2.96% | 3.43% | 1.50% | 0.00% | 0.00% | 2.00% |
| 31 | 47.87% | 21.39% | 20.38% | 2.95% | 3.41% | 1.50% | 0.00% | 0.00% | 2.50% |

TABLE 10C

Ta₂O₅ and Nb₂O₅ Examples

Test Results

| Ex. | Slide 350 C.-15 min | Slide 375 C.-15 min | 13 mm button-375 C. 20 min | Results | 13 mm button-400 C. 20 min | Results |
|---|---|---|---|---|---|---|
| 21 | 4.5 | 6.5 | 13.24 | glass | 15.21 | glass |
| 22 | 4.0 | 6.5 | 12.42 | glass | 14.50 | glass |
| 23 | 2.5 | 6.0 | 12.24 | glass | 14.55 | glass |
| 24 | 4.5 | 6.5 | 12.56 | glass | 14.47 | glass |
| 25 | 3.0 | 5.0 | 12.35 | glass | 14.16 | glass |
| 26 | 4.5 | 6.0 | 12.19 | glass | 14.88 | glass |
| 27 | 4.5 | 5.0 | 12.30 | glass | 14.48 | glass |
| 28 | 3.0 | 5.5 | 12.16 | glass | 14.34 | glass |
| 29 | 3.0 | 5.5 | 11.62 | glass | 14.07 | glass |
| 30 | 3.0 | 5.5 | 11.79 | glass | 14.20 | glass |
| 31 | 3.0 | 6.0 | 11.77 | glass | 13.96 | glass |

TABLE 10D

Ta₂O₅ and Nb₂O₅ Examples

Test Results Continued

| Example | 13 mm button - 425 C. 20 min | Result |
|---|---|---|
| 21 | 16.07 | Haze |
| 22 | 15.86 | Haze |
| 23 | 16.08 | light haze |
| 24 | 14.79 | Haze |
| 25 | 15.99 | Glass |
| 26 | 16.40 | light haze |
| 27 | 16.15 | light haze |

TABLE 10D-continued

Ta$_2$O$_5$ and Nb$_2$O$_5$ Examples

Test Results Continued

| Example | 13 mm button - 425 C. 20 min | Result |
|---|---|---|
| 28 | 15.33 | Haze |
| 29 | 15.55 | Glass |
| 30 | 15.71 | light haze |
| 31 | 14.57 | Haze |

In certain example embodiments, the use of Ta$_2$O$_5$ and/or Nb$_2$O$_5$ may help reduce the crystallization of the frit material. As the percentage of contribution by such additives increases, the softening temperature (e.g., a temperature at which the frit material may flow) may also increase. In certain example embodiments, such properties may be desirable for a tip off seal in a VIG unit (e.g., sealing the vacuum hole in a VIG unit).

Frit materials used for tipping off a vacuum hole may have different desirable properties than frit materials for a perimeter seal for a VIG unit. For example, a frit material used in a tip off seal may be completely or substantially exposed to IR and therefore may reach a higher temperature than that of a perimeter seal. Conversely, the perimeter seal may have the glass absorb some percentage of the SWIR directed at the frit of a perimeter seal (e.g., 10%-30% of the SWIR). Thus, an exemplary frit material (e.g., example 21) may be used for a perimeter seal while example 26 may be used for tip off seal.

As shown in Table 10D, the example frit compositions may provide increased resistance, or greater tolerance, to crystallization. The example compositions shown in Tables 7-10 were done in an alumina crucible. With such a crucible, a certain amount of Al$_2$O$_3$ and SiO$_2$ may be "leached" from the crucible during the frit preparation process. Thus, while Al$_2$O$_3$ and SiO$_2$ may not be shown in the above tables 7-10, these additives (or others depending on the crucible type) may yet be present in the frit composition due to the leaching process from the crucible. The leaching of Al$_2$O$_3$ and SiO$_2$ may be a result of melting or firing the frit compositions at certain temperatures (e.g., 800 C degrees C., 1000 degrees C., etc). Different firing temperatures and/or different lengths of time of firing may affect the amount of material leached from the crucible. The variation of Al$_2$O$_3$ and SiO$_2$ may change the frit performance for sealing at 375 degrees C. and 400 degrees C.

In certain example embodiments, Al$_2$O$_3$ may be included in a frit material at between 0% and 2% normalized moles by composition, or at a normalized weight percentage between 0% and 1.2%, or more preferably about 0.8%. SiO$_2$ may be included at between 1 and 5% normalized mole by composition and/or between about 0.5 and 2% by weight, and more preferably about 1.2% by normalized weight. The inventor has determined that in certain instances, having SiO$_2$ or Al$_2$O$_3$ in amount greater than about 2-5%, resulted in undesirable flow qualities of the frit composition. In particular, when bonding to an example glass substrate, in certain instances, higher percentages of SiO$_2$ or Al$_2$O$_3$ (e.g., in excess of 2 or 4%) resulted in concrete like qualities for the final frit composition.

Table 11 shows example results in a platinum crucible. Such a crucible may reduce or even prevent the leaching of excess additives during the firing process of the frit material.

TABLE 11

Platinum Crucible - Normalized Moles (%)

| V$_2$O$_5$ | BaO | ZnO | CuCl | SnCl$_2$ | TeO$_2$ | Ta$_2$O$_5$ | Al$_2$O$_3$ | SiO$_2$ | Nb$_2$O$_5$ |
|---|---|---|---|---|---|---|---|---|---|
| 44.56 | 21.96% | 18.21% | 1.42% | 4.66% | 3.88% | 0.47% | 1.19% | 2.73% | 0.93% |
| 44.25 | 21.81% | 18.09% | 1.41% | 4.62% | 3.85% | 0.46% | 1.20% | 3.38% | 0.92% |
| 43.95 | 21.66% | 17.96% | 1.40% | 4.59% | 3.83% | 0.46% | 1.19% | 4.05% | 0.91% |
| 44.38 | 21.87% | 18.14% | 1.41% | 4.64% | 3.86% | 0.46% | 1.60% | 2.71% | 0.92% |
| 44.08 | 21.72% | 18.02% | 1.40% | 4.61% | 3.84% | 0.46% | 1.59% | 3.36% | 0.92% |
| 43.78 | 21.57% | 17.89% | 1.39% | 4.57% | 3.81% | 0.46% | 1.58% | 4.03% | 0.91% |
| 44.20 | 21.78% | 18.07% | 1.41% | 4.62% | 3.85% | 0.46% | 1.99% | 2.70% | 0.92% |
| 43.89 | 21.63% | 17.94% | 1.40% | 4.59% | 3.82% | 0.46% | 1.99% | 3.38% | 0.91% |
| 43.60 | 21.48% | 17.82% | 1.39% | 4.56% | 3.80% | 0.46% | 1.98% | 4.01% | 0.91% |

Figure 12A:
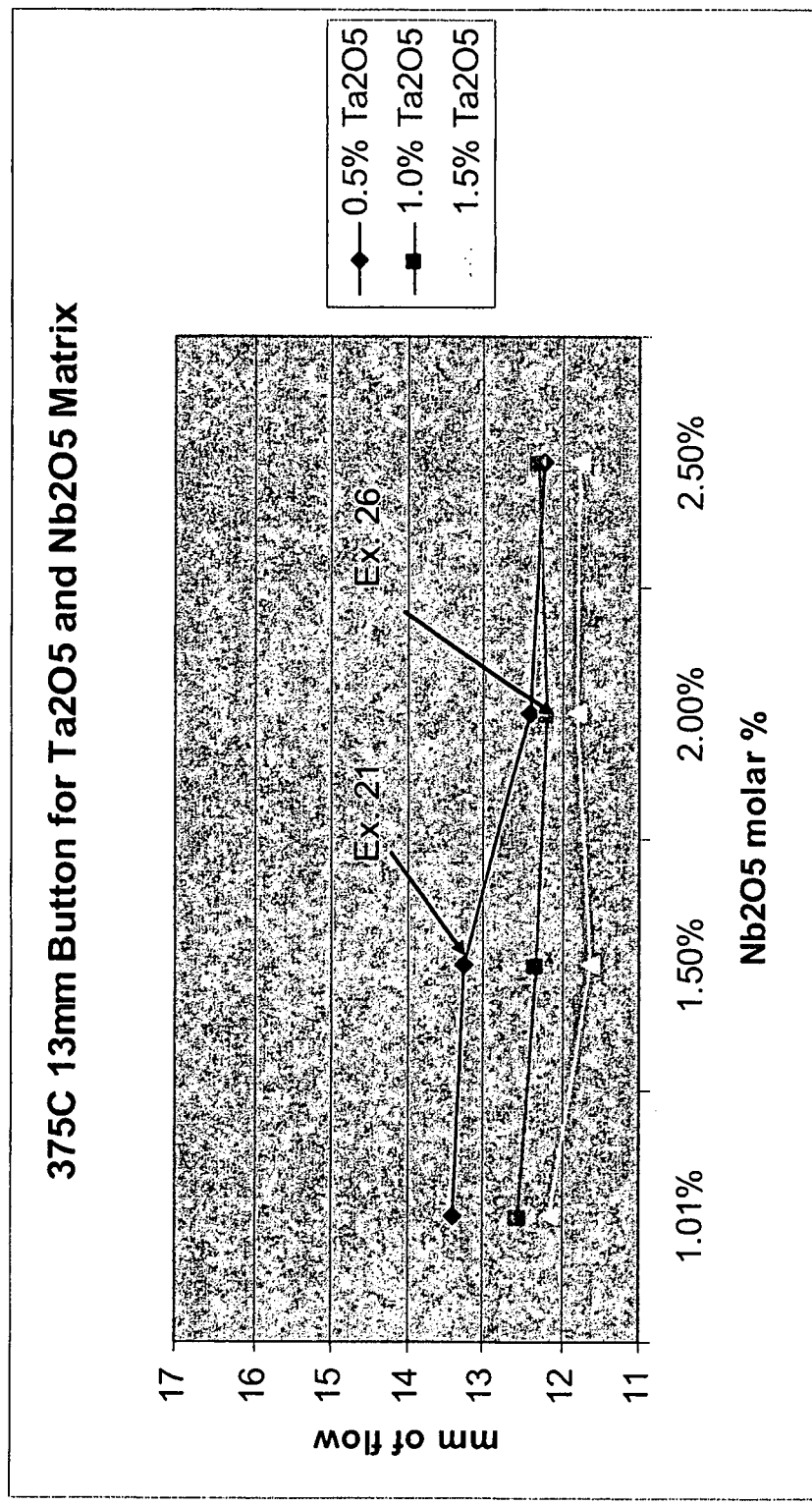
FIGS. 12A-12C are graphs summarizing flow characteristics of example frit materials according to certain example embodiments.
Figure 12B:
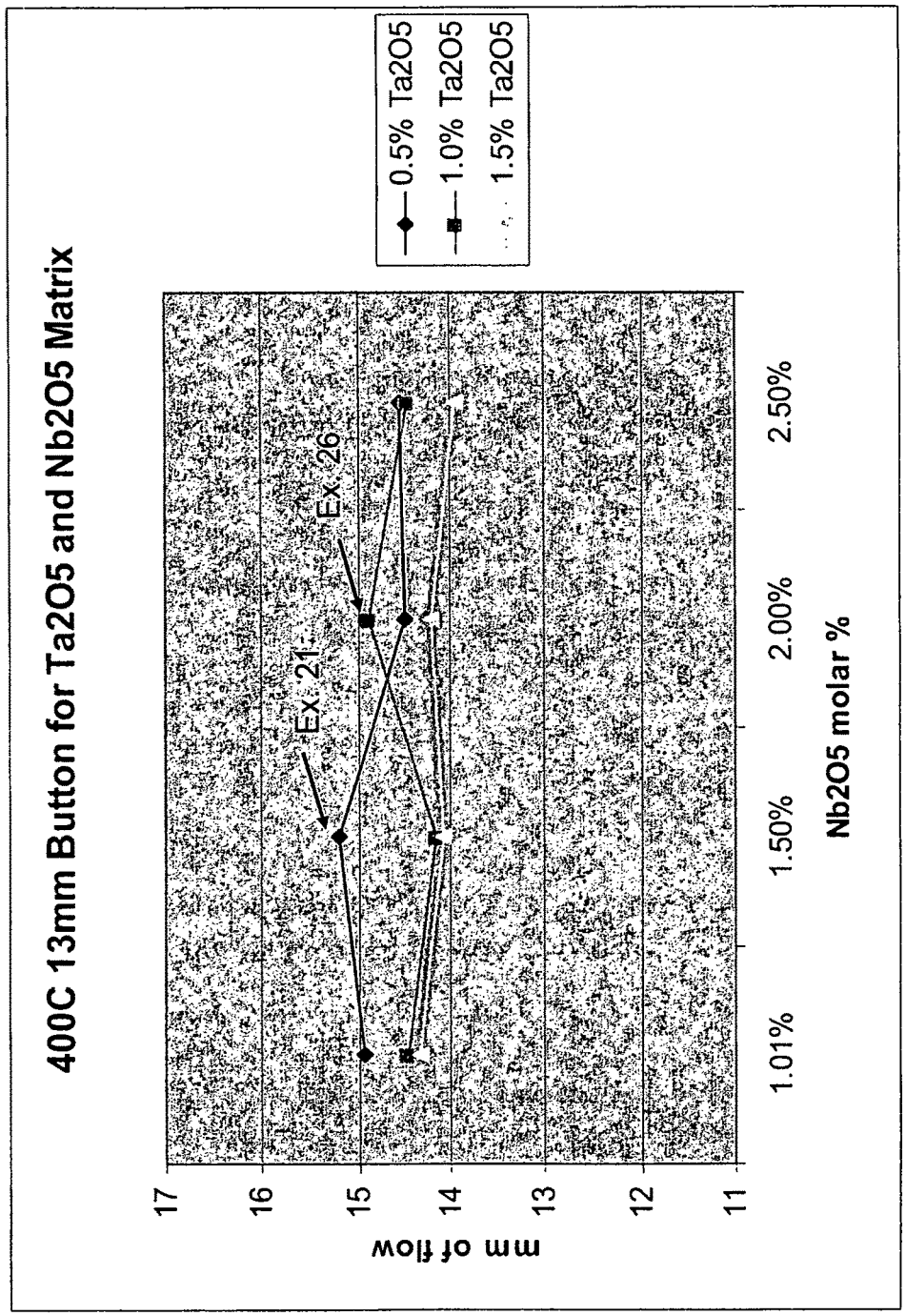
Figure 12C:
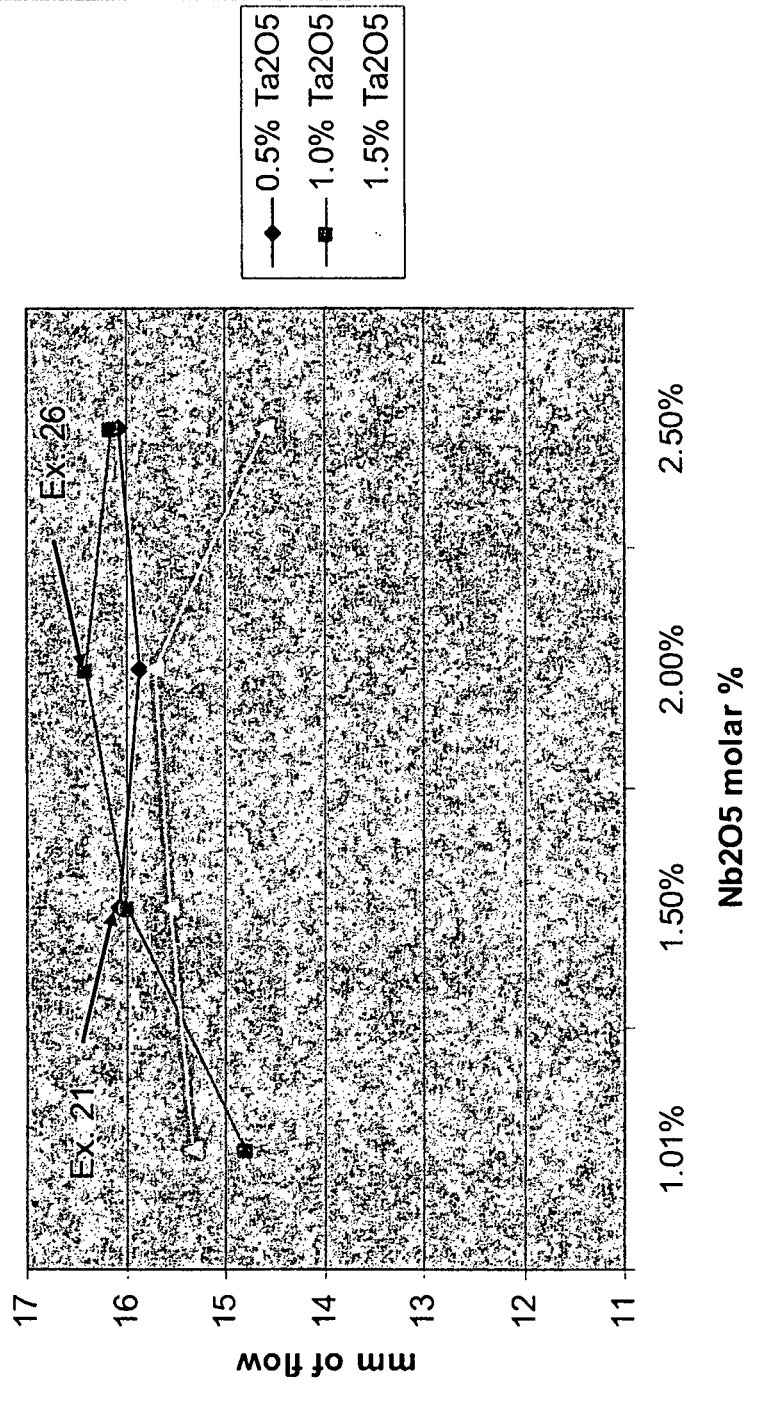

FIGS. 12A-12C are graphs summarizing flow characteristics of example frit materials according to certain example embodiments.

FIG. 12A shows that, at 375 degrees C., increasing Ta$_2$O$_5$ percentage may cause an increase in the initial softening temperature and resulting reduction in the flow (e.g., the diameter of the 13 mm button) for the example frit material. In certain example embodiments, increasing Nb$_2$O$_5$ percentage may provide less of a reduction in flow. As noted above, a frit (e.g., Ex. 21) with this composition may be used for a perimeter seal of a VIG unit.

FIG. 12B shows that, at 400 degrees C., Ex. 21 has improved flow characteristics. For example, with 1.0% Ta$_2$O$_5$, the frit flows well.

FIG. 12C shows, at 425 degrees C., Ex. 21 continuing to flow at higher temperatures, although, as shown above in Table 10D, the frit composition may become crystallized at such a temperature. However, Ex. 26 may continue to have good flow and has only a slight crystallization. Accordingly, Ex. 26 may continue to flow at higher temperatures.

As discussed herein, a binding agent may be applied to (or combined with) a frit material (e.g., a frit material based on the materials described herein). The inventor of the instant application has recognized that the reduced melting temperatures of certain example frit materials may provide for melting points that are less than the burnout temperature for certain types of binding agents that may be used in conjunction with the frit material. It is noted the following tests were performed using Ex. 26 as the frit composition, although the other frit compositions disclosed herein are expected to have similar performance characteristics, unless otherwise specifically noted below. It also is noted that a CTE matching material may be added in certain instances. One example is GM31682 available from Schott, which was added at 6.9 wt. % in conducting the following tests.

Figure 13:
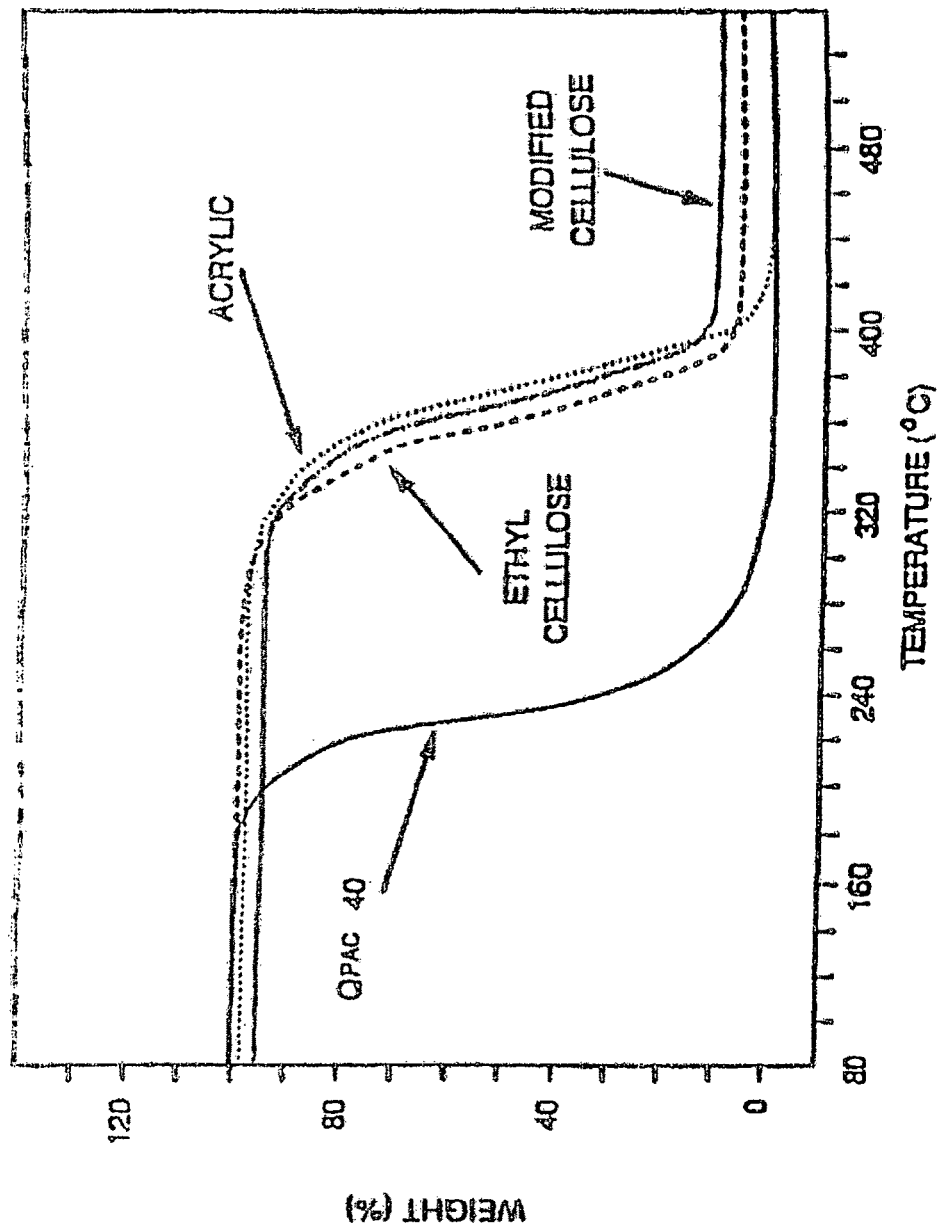
FIG. 13 is a graph showing thermogravimetric analysis of certain example binding agents.

FIG. 13 is a graph showing a thermogravimetric analysis (TGA) of certain example binding agents. The TGA analysis was performed in nitrogen and, as can be seen, the example "QPAC" binding agents (discussed in more detail below) has a burn range that is approximately 100° C. lower than other binders in the cellulose family of compounds.

In certain example embodiments, the following example binder materials may be used in conjunction with certain frit materials.

Example 1

A methyl cellulose polymer binder. Example 1 included 0.75 wt % methyl cellulose (400 cps molecular weight polymer) in DI water. TGA analysis of this material indicated a burn out of the binder at around 320-380° C.

Example 2

A polyethylene carbonate binder, for example, $[CH_2CH_2OCO_2]_n$ or $C_3H_4O_3$. One example of such a binder is available under the material trade name QPAC® 25 from Empower Materials Inc. It will be appreciated that other carbonate inclusive binder materials may be used in certain example embodiments.

Example 3

A polypropylene carbonate binder, for example, $[CH_3CHCH_2OCO_2]_n$ or $C_4H_6O_3$. One example of such a binder is available under the material trade name QPAC® 40 from Empower Materials Inc. As noted above, in FIG. 13, TGA analysis of these examples 2 and 3 indicated that the burnout of the binder material may be around 250-275° C.

The examples shown in FIGS. 14B, 15B, 16B, and 17-19 included a 5:1 (gram) ratio frit-to-binder solution. These were dried into layers on microscope slides, and the slides were placed on a 71/38 coated glass. It will be appreciated that this ratio of frit to binder solution is given by way of example and that other ratios may be used. For example, the ratio may be between ratios of 4:1 and 6:1.

Figure 14A:
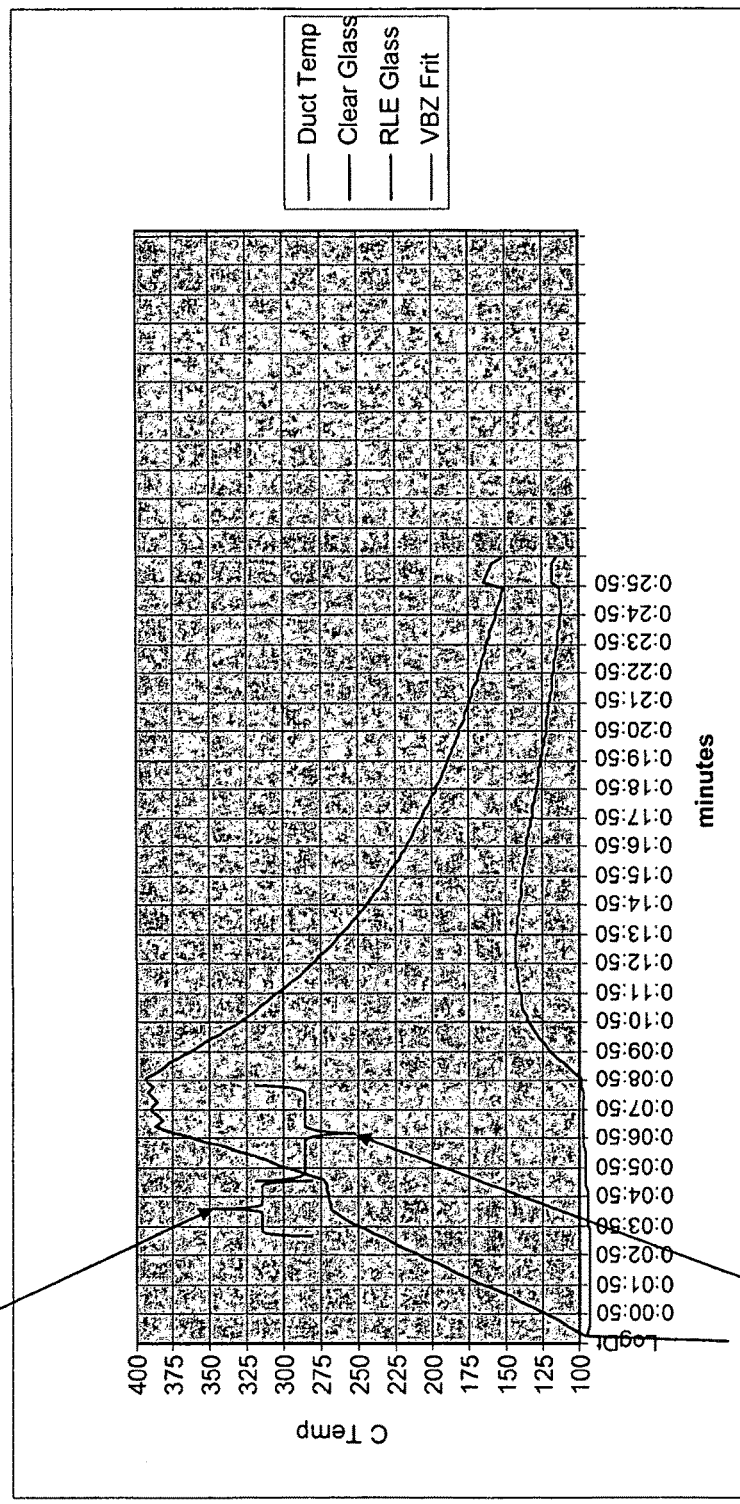
FIGS. 14A and 14B respectively show a heating profile graph and the example frit materials melted according to the heating profile.
Figure 15A:
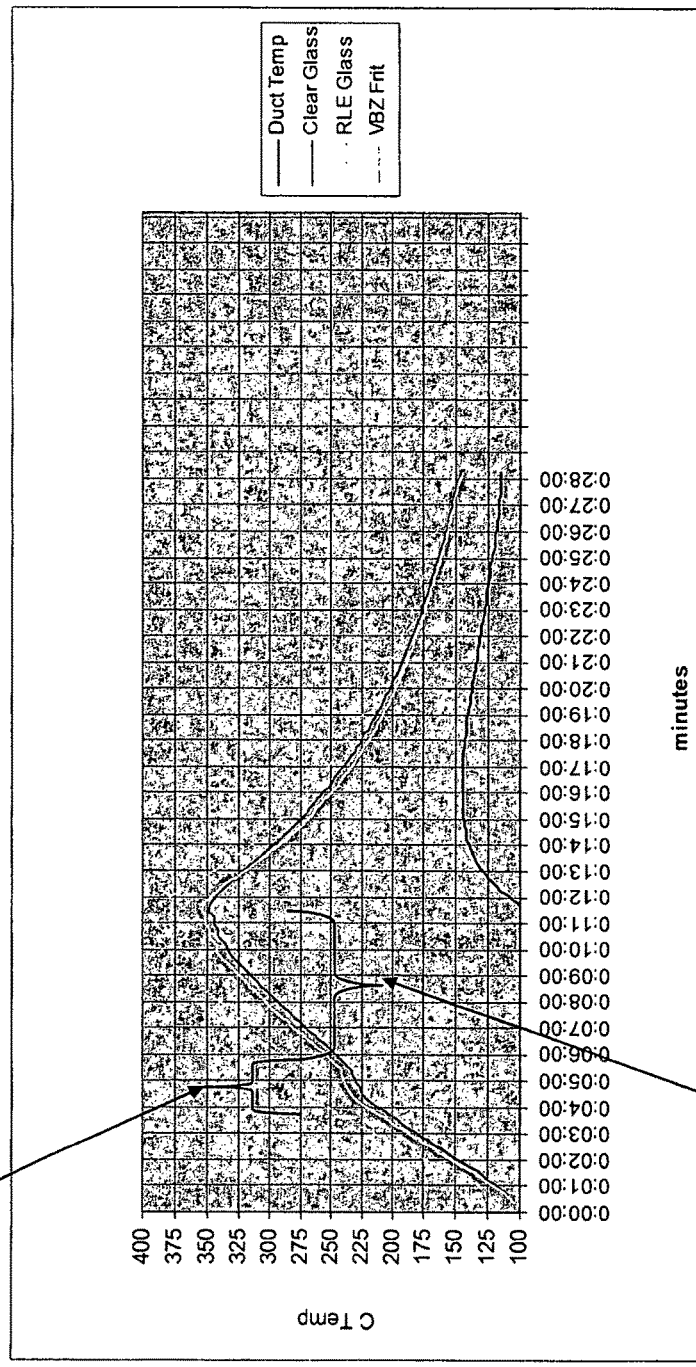
FIGS. 15A and 15B respectively show another heating profile graph and the example frit materials melted according to the heating profile.
Figure 16:
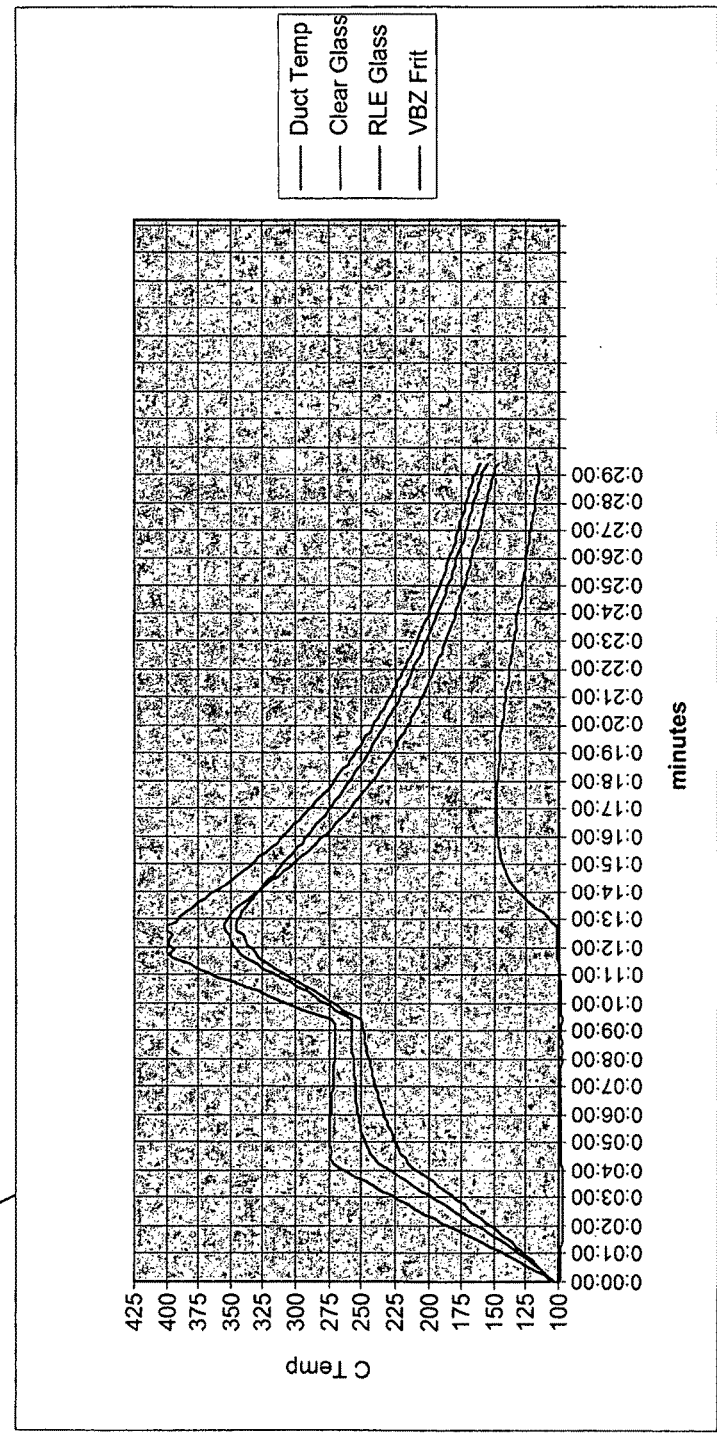
FIG. 16 shows yet another heating profile graph.

FIGS. 14A, 15A, and 16 are temperature vs. time graphs that each show various temperatures at varying times of an example frit material, a duct temperature (e.g., where the IR energy is applied), and two glass substrates that are respectively coated (e.g., with a low-E coating) and non-coated (e.g., "clear").

Figure 14B:
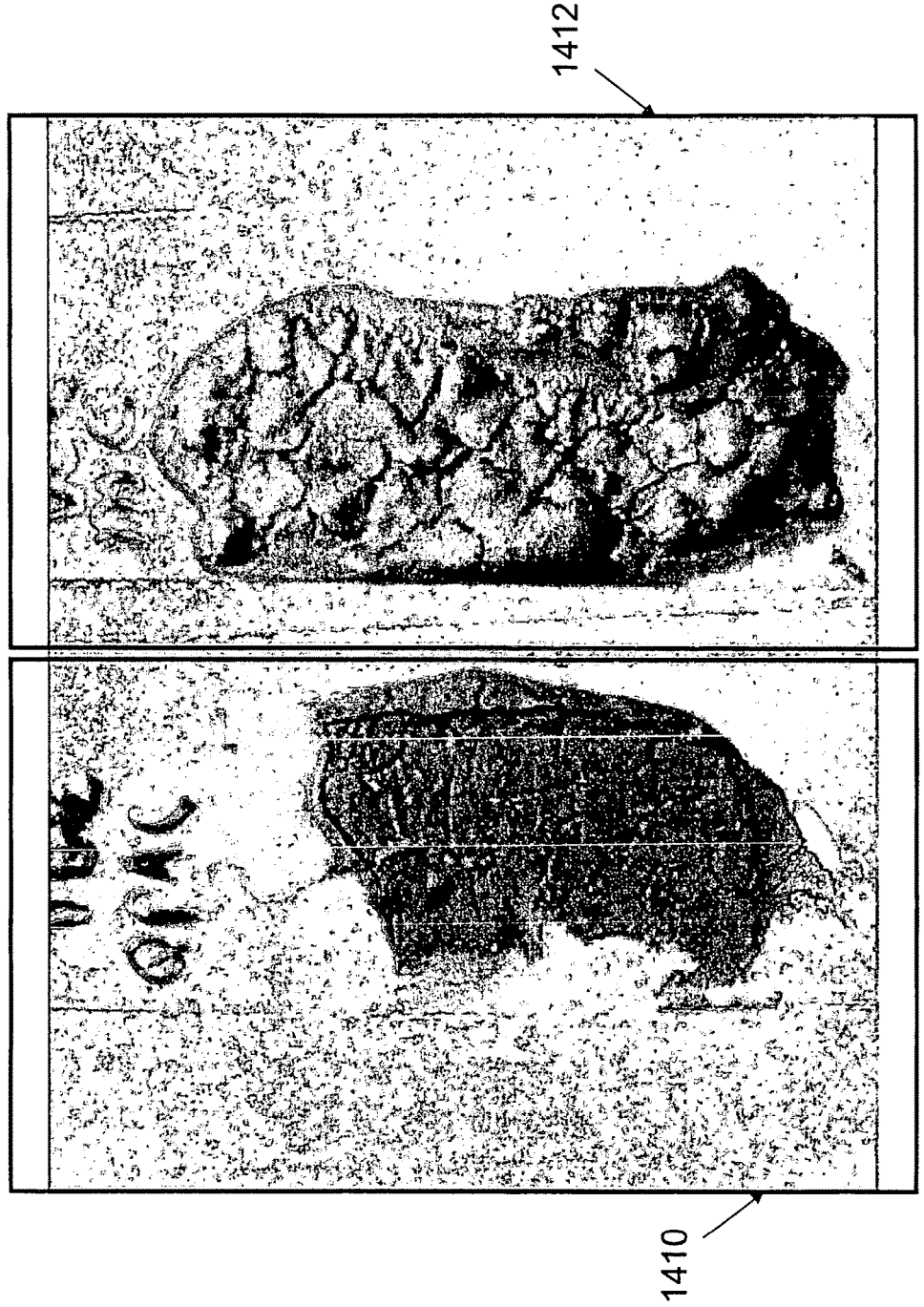

FIGS. 14A and 14B respectively show a heating profile graph and example fit materials melted according to the heating profile of FIG. 14A. The heating profile reflected in the graph of FIG. 14A included an approximately 1 minute hold time 1402 at around 270-275° C. Subsequent to this hold time, the temperature was increased to a frit melting temperature. The ramp time for this increase may be between 1.8 and 2.3 minutes or, more preferably, about 2.1 minutes.

FIG. 14B shows example frit materials that include different binding agents. The melted frit material 1410 included the above noted example 2 binding agent, whereas the melted frit material 1412 included the above noted exampled 1 binding agent. Frit 1410 had properties that included being fused and porous, not glassy, and/or delaminating from the substrate. Frit 1412 had properties that included being rough and poorly fused, not glassy, and and/or delaminating from the substrate.

Figure 15B:
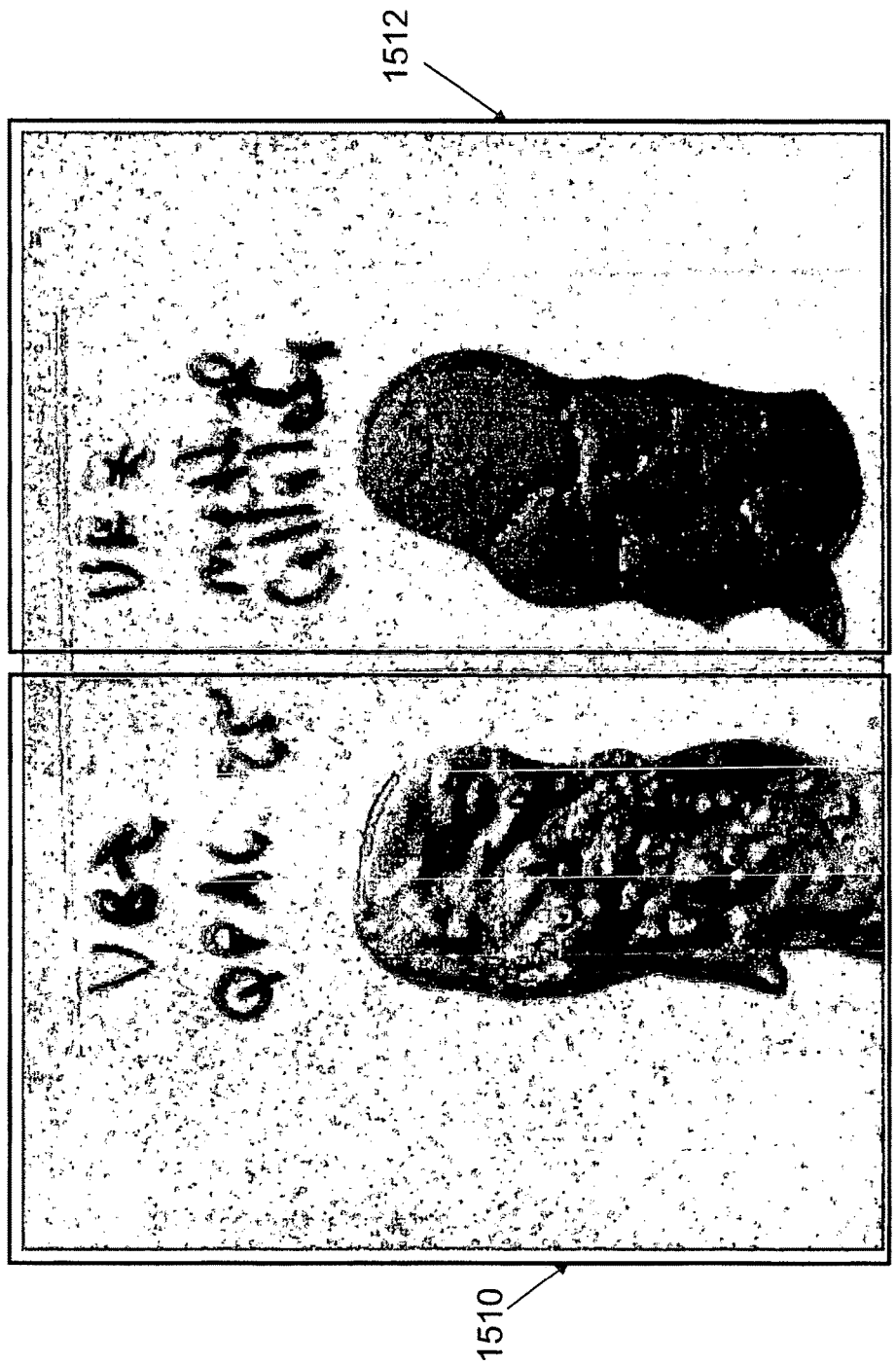

FIGS. 15A and 15B respectively show another heating profile graph and the example melted frit materials according to the heating profile. The heating profile reflected in the graph of FIG. 15A included an approximately 1 minute hold time 1502 at around 265-275° C. Subsequent to this hold time, the temperature was increased to a frit melting temperature. The ramp time for this increase may be between 4.3 and 5.7 minutes, more preferably between about 4.5 and 5.2, and even more preferably between about 4.7 and 5 minutes. It will be appreciated that such an increased ramp time (e.g., over the example shown in FIG. 14A) may be achieved by reducing the IR voltage related to the energy applied to the frit material. For example, the voltage may be reduced from about 80% to around 50%. It will be appreciated that such percentages may be adjusted depending on the energy output of the heating elements involved in the melting process.

FIG. 15B shows example frit materials that include different binding agents. The melted frit material 1510 included the above noted example 2 binding agent, whereas the melted frit material 1512 included the above noted exampled 1 binding agent. Frit 1410 had properties that included having a glossy appearance (e.g., an increase over the frits shown in FIG. 14B) while being rough with no flowed look and delaminating from the substrate. Frit 1512 had properties that included being rough and cracking (e.g., indicating the binding agent is still present) and/or delaminating from the substrate. Such results may indicate that the binding agent is still present in the example frit material.

FIG. 16 shows yet another heating profile graph that may be used for applying energy to a frit material disposed onto a substrate. The heating profile reflected in the graph of FIG. 16A included an approximately 5 minute hold time 1602 at around 270-275° C. According to certain example embodiments, the hold time may be between about 235-290° C. Subsequent to this hold time, the temperature was increased to a frit melting temperature (e.g., 380-400° C. or less than 400° C.). The ramp time for this increase may be between 2 and 3 minutes, more preferably between about 2.2 and 2.8, and even more preferably about 2.4 minutes.

FIGS. 17-20 shows example frit materials that include different binding agents melted as a result of applying exemplary heating profiles. Frit materials 1702, 1802, 1902, and 2002 are based on a frit material that includes the above noted example 2 binding agent. Frit materials 1704, 1804, 1904, and 2004 are based on a frit material that includes the above noted example 3 binding agent. Frit materials 1706, 1806, 1906 and 2006 are based on a frit material that includes the above noted example 1 binding agent.

Figure 17:
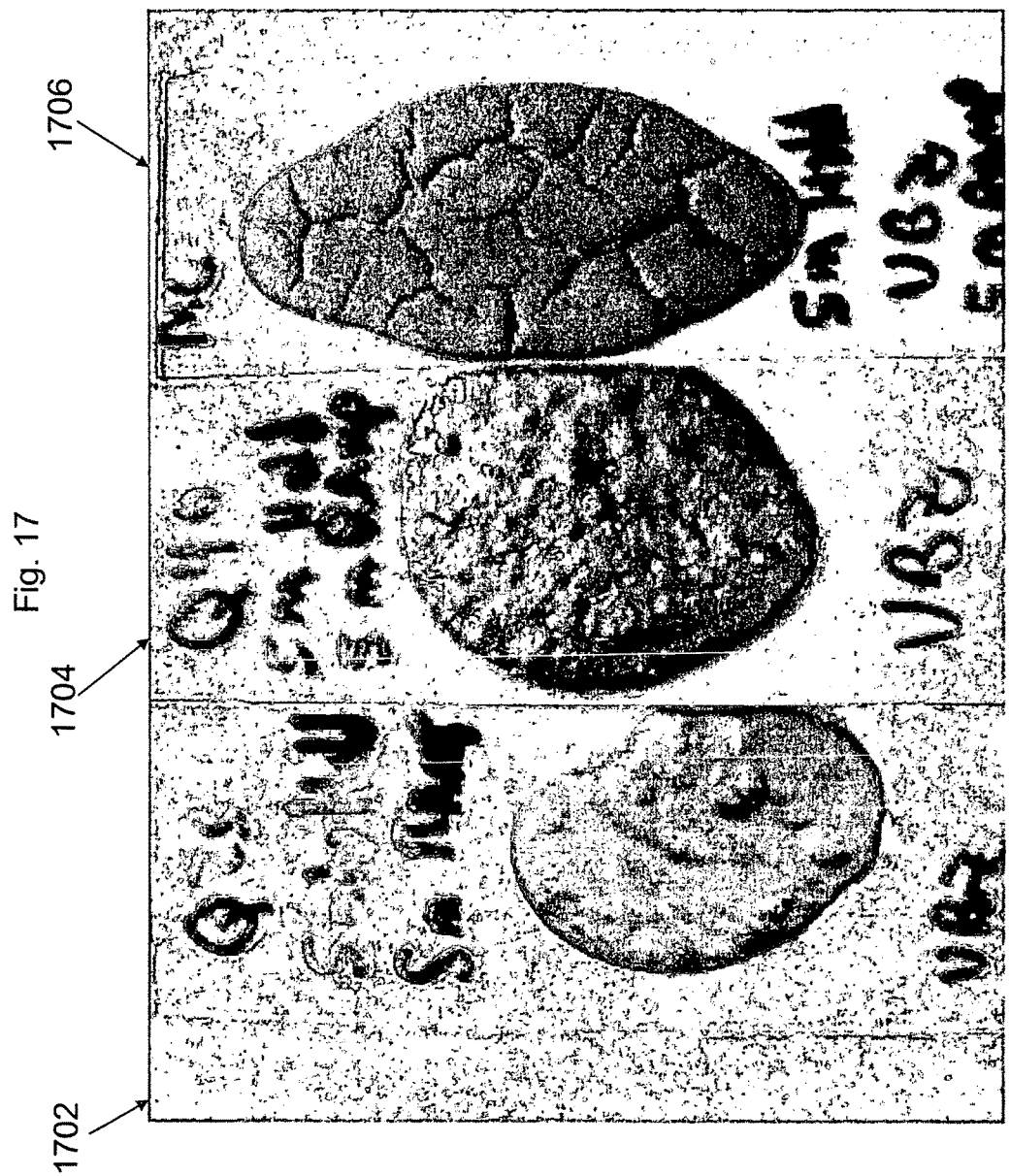
FIGS. 17-20 show example frit materials melted according to certain example embodiments.

In FIG. 17, the heating profile used included about a 5 minute hold time at around 275° C. with a subsequent 5 minute ramp time to seal (e.g., to the melting temp of the frit material) was used. Frit materials 1702 and 1704 both had good flow and solid bonds to the respective substrates. However, frit material 1706 was rough and not glassy and delaminated from the substrate.

Figure 18:
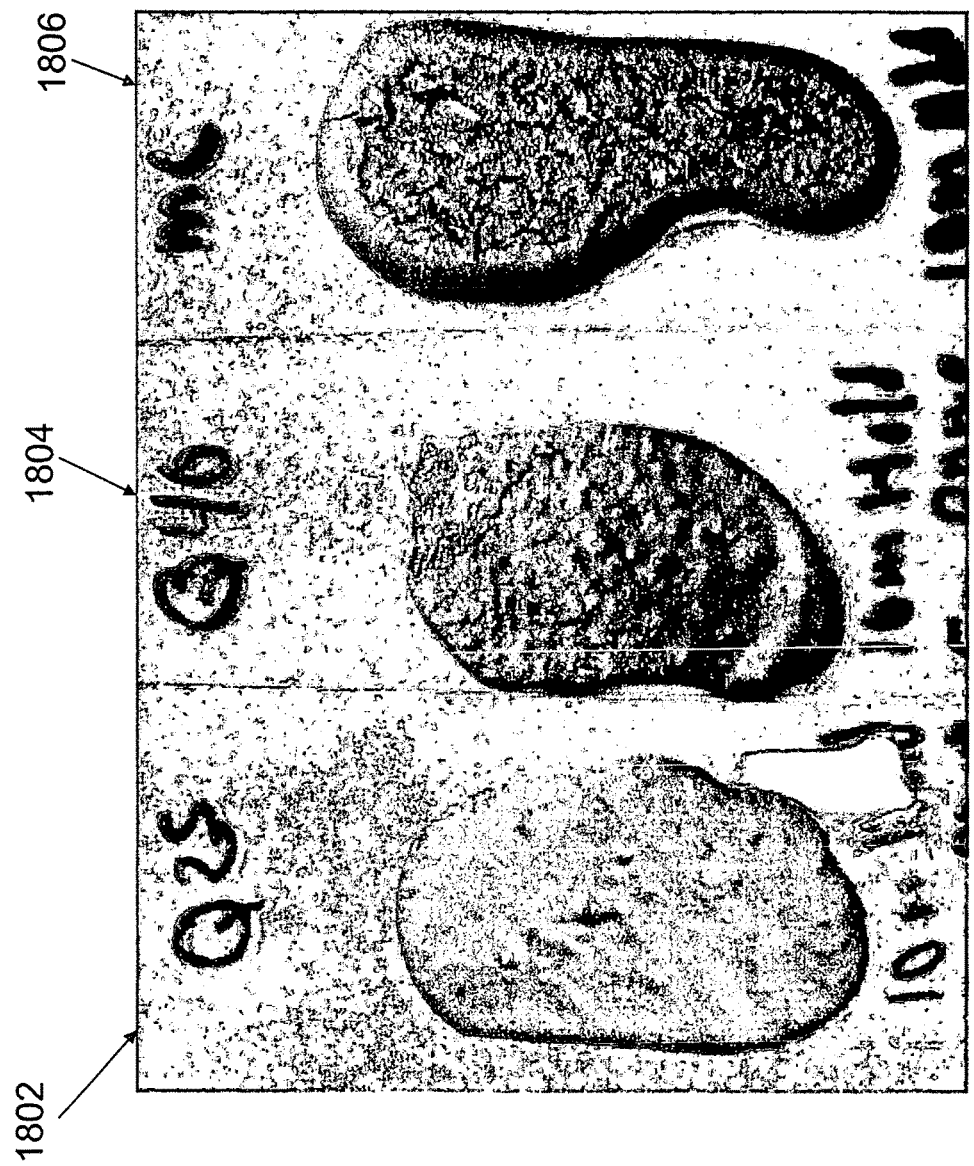

In FIG. 18, the heating profile used included about a 5 minute hold time at around 275° C. with a subsequent 5 minute ramp time to seal (e.g., to the melting temp of the frit material) was used. Frit materials 1802 and 1804 both had good flow, but delaminated some from the substrate. Frit material 1806 completely delaminated from the substrate. Also, while the edges of the frit may have melted, the roughness of the frit still was present in the melted version.

Figure 19:
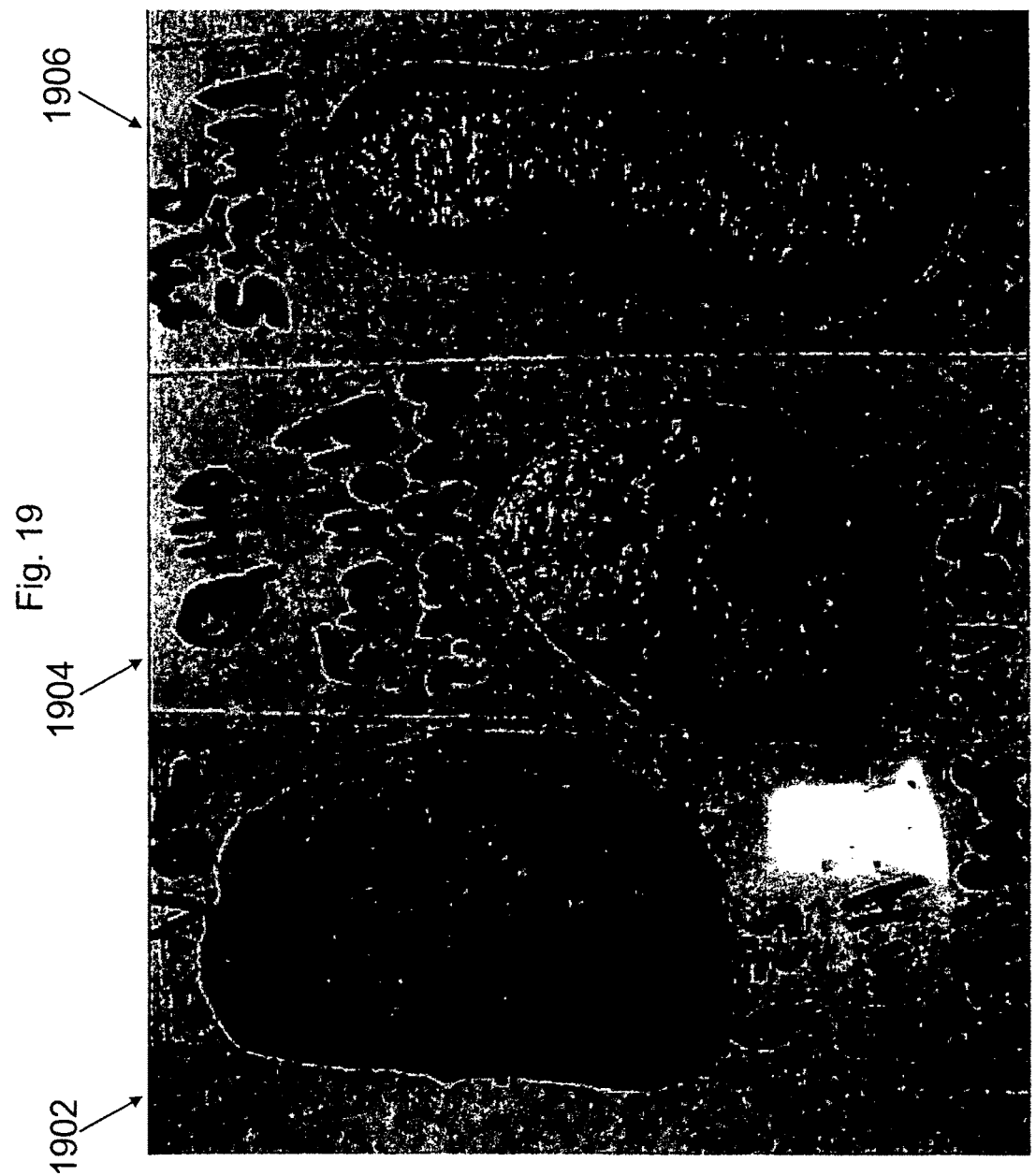

In FIG. 19, the heating profile used included about a 5 minute hold time at around 275° C. A subsequent 2.3 minute ramp time to seal (e.g., to the melting temp of the frit material) was used. Frit materials 1902 and 1904 both had a good melt along with a good bond to the respective substrates. Frit material 1906 had some melting along the edges, but still lifted off the substrate. Frit materials 1 and 2 may then, along with the heating profile used in FIG. 19, be applied to a glass substrate and may be used to form a VIG unit.

Figure 20:
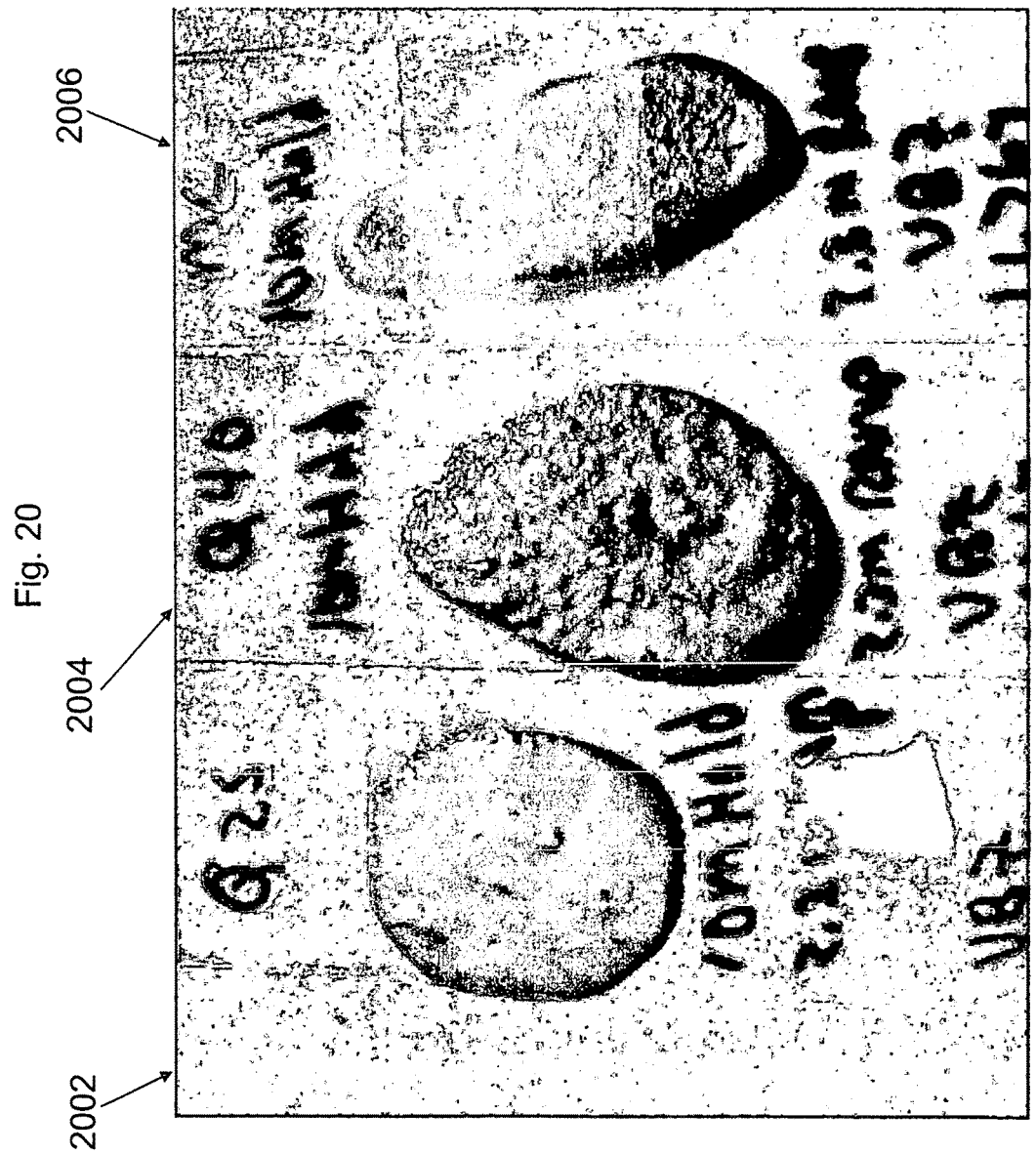

In FIG. 20, the heating profile used included about a 10 minute hold time at around 275° C. A subsequent 2.3 minute ramp time to seal (e.g., to the melting temp of the frit material) was used. Frit materials 2002 and 2004 both had good melts and adhesion to the substrate. Frit material 2006 had a relatively poor melt and completely lifted off the substrate slide.

While certain example embodiments may use a holding temperature of around 275° C., other temperatures between about 235° C. to 325° C., or more preferably between about 260° C. and 285° C. may be used. In certain example embodiments, a holding temperature may be less than about 300° C. In one example, a holding temperature of about 267° C. was used. In certain example embodiments, the temperature may vary, or slowly increase during this time period (e.g., to hold under a certain temperature or within a certain range for a period of time).

Furthermore, hold times using these and other hold temperatures may be used. For example, a hold time may be between 1 and 30 minutes, more preferably between about 2 and 15 minutes, and even more preferably between about 5 and 10 minutes may be used. In certain example embodiments, the hold time may be less than 5 or 10 minutes.

The named inventor of the instant application determined that in certain instances a burnout time that is too short (e.g., less than a minute) may lead to leftover carbon residue. Such a characteristic may be undesirable under certain conditions. The named inventor also determined that in certain conditions, an increased hold time (e.g., in excess of 30 minutes) may result in the frit material having a reduced bond strength to an underlying substrate. Accordingly, it will be appreciated that a length of time used to "burn out" a binder solution may influence a quality of the frit (e.g., the frit to substrate seal). For example, certain example timeframes as disclosed herein may be used to reduce (or in some cases eliminate) the negative effects of the above undesirable characteristics.

Also, in certain example embodiments, the ramp time to the sealing temperature may vary between about 1 minute and 10 minutes, more preferably between about 2 and 5 minutes. Certain example embodiments may employ a ramp time of less than 5 minutes, or more preferably less than 3 minutes. Accordingly, certain example embodiments may use relatively reduced ramp times (e.g., times that are less than the holding temperature).

Figure 21:
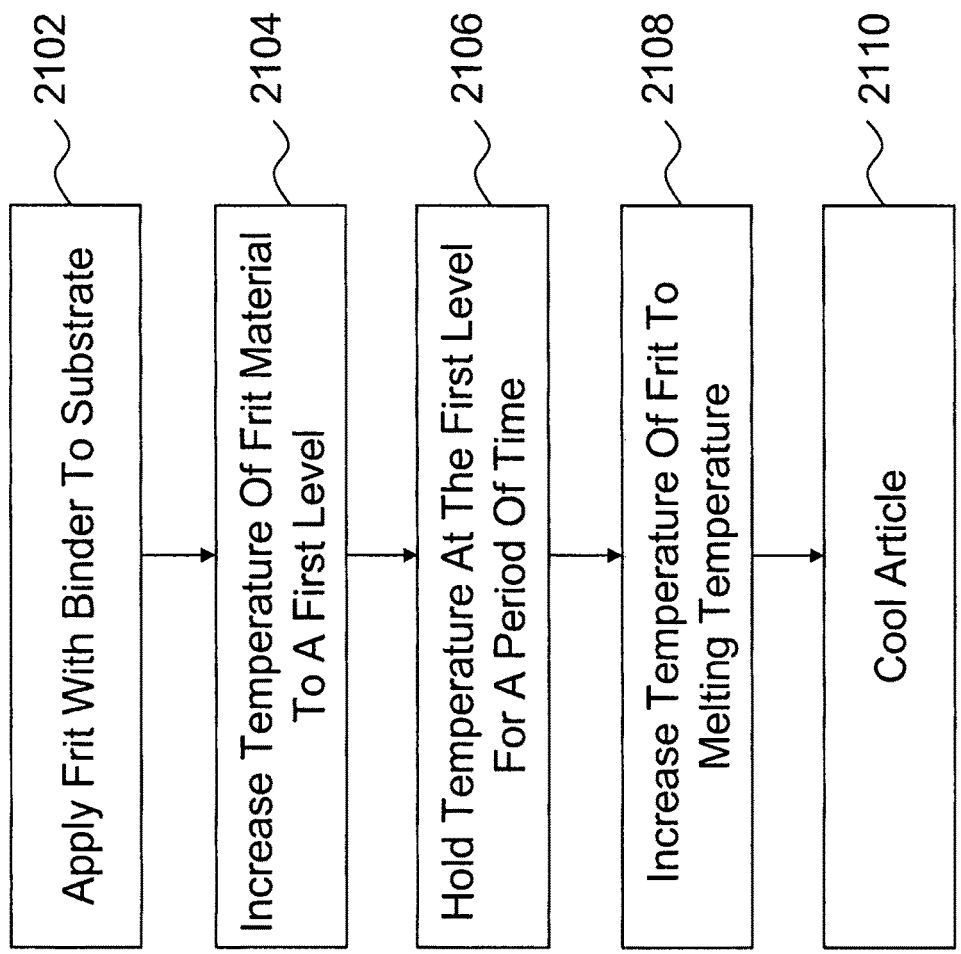
FIG. 21 is a flowchart illustrating a process for melting a frit material onto a substrate according to certain example embodiments.

FIG. 21 is a flowchart illustrating a process for melting a frit material onto a substrate according to certain example embodiments. In step 2102, a frit that includes a binder is applied to a substrate. In step 2104, the substrate is then disposed in an environment that raises the temperature of the frit material applied to the substrate to a first level. Such a temperature may be between about 200° C. and 350° C., or more preferably between about 250° C. and 300° C., or even more preferably about 275° C.

In step 2106 the temperature of the frit material is held at a relatively stable level for a period of time, e.g., between about 1 and 10 minutes, or about 5 minutes. The temperature of the frit is then raised to the melting temperature of the frit in step 2108. This may happen over a period of less than about 5 minutes, more preferably less than about 3 minutes, or even more preferably about 2.3 minutes. In step 2110, the substrate, frit, and other entities are then cooled. As a result, the frit material may be bonded to the substrate, and the binder material that was originally included with the frit may be substantially or completely burned off.

It will be appreciated by those skilled in the art that CTE adjustments may be carried out on the overall frit material (e.g., the compound) for the glass wetting and bonding properties of the frit to cooperate with an underlying substrate (e.g., a glass substrate). In certain example embodiments, CTE matching compounds may be added for these and/or other purposes.

It will be appreciated that one or more metal oxide, chloride, and/or fluoride additives may be used as additives in different embodiments of this invention. Furthermore, in certain example implementations, the metal oxide, chloride, and/or fluoride additives may be stoichiometric or sub-stoichiometric.

It is noted that the example embodiments discussed herein may be used in connection with other applications such as, for example, MEMS applications. In the MEMS context, the CTE filler may be increased to lower overall expansion to silicon and/or alumina. For example, 3 ppm CTE matcher with 40 wt % $ZrW_2O_8$ may be sufficient for the former, and 8 ppm CTE with 35 wt molybdenum-based spheres may be sufficient for the latter.

In certain example embodiments, a method of making a vacuum insulated glass (VIG) unit is provided. First and second glass substrates are provided in substantially parallel, spaced apart relation to one another, with a gap being defined between the first and second substrates. A material is disposed proximate to the first and/or second glass substrates, with the material comprising at least a frit material and a binder solution. Energy is applied to the frit material so as to melt the frit material at a melting temperature, with the melting temperature being less than about 400 degrees C. The applying of the energy substantially burns off the binder solution of the material. The frit material is formed from a base composition including: ~45-50% vanadium oxide, ~20-23% barium oxide, and ~19-22% zinc oxide. These percentages are given as normalized mole percentages.

In addition to the features of the previous paragraph, in certain example embodiments, the applying of the energy to the frit material may includes holding a temperature of the frit material at a first temperature for a first period of time; and increasing the temperature of the frit material to the melting temperature over a second period of time.

In addition to the features of the previous paragraph, in certain example embodiments, the first period of time may be greater than the second period of time.

In addition to the features of either or the two previous paragraphs, in certain example embodiments, the first period of time may be between about 2 and 15 minutes.

In addition to the features of the previous paragraph, in certain example embodiments, the first period of time may be between about 5 and 10 minutes.

In addition to the features of any of the previous four paragraphs, in certain example embodiments, the second period of time may be less than about 5 minutes.

In addition to the features of the previous paragraph, in certain example embodiments, the second period of time may be less than about 3 minutes.

In addition to the features of any of the previous six paragraphs, in certain example embodiments, the first temperature may be less than about 300 degrees C.

In addition to the features of any of the previous eight paragraphs, in certain example embodiments, a ratio between the frit material and the binder solution may be about 5 to 1.

In addition to the features of any of the previous nine paragraphs, in certain example embodiments, the binder solution may include polypropylene carbonate or polyethylene carbonate.

In addition to the features of any of the previous ten paragraphs, in certain example embodiments, the base composition may include at least four oxide-, chloride-, and/or fluoride-based additives.

In certain example embodiments, there is provided a material comprising a binder solution; and a frit material having a composition that includes: ~45-50% vanadium oxide, ~20-23% barium oxide, and ~19-22% zinc oxide. These percentages are given as normalized mole percentages. The binder solution has a burnout temperature that is less than a melting temperature of the frit material.

In addition to the features of the previous paragraph, in certain example embodiments, a melting temperature of the frit material may be less than about 400 degrees C.

In addition to the features of either or the two previous paragraphs, in certain example embodiments, the binder solution may include polypropylene carbonate or polyethylene carbonate.

In addition to the features of any of the previous three paragraphs, in certain example embodiments, the binder solution may be substantially burned out of the material when a temperature of the material is raised to between 250 degrees C. and 400 degrees C. for no more than 15 minutes.

In addition to the features of any of the previous four paragraphs, in certain example embodiments, the composition further includes a least six additives selected from the group consisting of: $Ta_2O_5$, $Ti_2O_3$, $SrCl_2$, $GeO_2$, $CuO$, $AgO$, $Nb_2O_5$, $B_2O_3$, $MgO$, $SiO_2$, $TeO_2$, $Tl_2O_3$, $Y_2O_3$, $SnF_2$, $SnO_2$, $SnCl_2$, $CeO_2$, $AgCl$, $In_2O_3$, $SnO$, $SrO$, $MoO_3$, $CsCO_3$, and $Al_2O_3$.

In certain example embodiments, a vacuum insulted glass (VIG) unit is provided. First and second substantially parallel, spaced apart glass substrates are provided. An edge seal is provided around a periphery of the first and/or second substrates to form a hermetic seal therebetween and at least partially define a gap between the first and second substrates. The gap is provided at a pressure less than atmospheric. The edge seal is formed from the material, at least initially, according to any of the previous five paragraphs.

In certain example embodiments, a method of making a material is provided. A composition is provided to a holder, the composition comprising: ~45-50% vanadium oxide, ~20-23% barium oxide, and 19-22% zinc oxide. These percentages are given as normalized mole percentages. The composition is melted. The melted composition is cooled and/or the melted composition is allowed to cool so as to form an intermediate article. A base frit material is created (e.g., by grinding) from the intermediate article. The base frit material is combined with a binder solution. A burnout temperature for the binder solution is less than a melting temperature of the base frit material.

In addition to the features of the previous paragraph, in certain example embodiments, the composition nay include at least four additives selected from the group consisting of: $Ta_2O_5$, $Ti_2O_3$, $SrCl_2$, $GeO_2$, $CuO$, $AgO$, $Nb_2O_5$, $B_2O_3$, $MgO$, $SiO_2$, $TeO_2$, $Tl_2O_3$, $Y_2O_3$, $SnF_2$, $SnO_2$, $SnCl_2$, $CeO_2$, $AgCl$, $In_2O_3$, $SnO$, $SrO$, $MoO_3$, $CsCO_3$, and $Al_2O_3$.

In addition to the features of either or the two previous paragraphs, in certain example embodiments, the melting temperature may be less than about 400 degrees C.

In addition to the features of any of the previous three paragraphs, in certain example embodiments, the burnout temperature may be less than about 300 degrees C.

In addition to the features of any of the previous four paragraphs, in certain example embodiments, the binder solution may include polypropylene carbonate or polyethylene carbonate.

In certain example embodiments, a method of bonding a frit material to a substrate is provided. The frit material is combined with a binder solution to form a combined material. The combined material is disposed on the substrate. The combined material is heated to a first temperature of less than about 300 degrees C. A temperature of the combined material is held within a range of the first temperature for a first period of time to burnout the binder solution of the frit material. Subsequent to holding the temperature of the combined material, energy applied to the combined material is increased so as to raise the temperature of the combined material to a second temperature, greater than the first temperature and less than about 400 degrees C., over a second period of time. The frit material includes a composition comprising: ~45-50% vanadium oxide, ~20-23% barium oxide, and ~19-22% zinc oxide. These percentages are given as normalized mole percentages.

In addition to the features of the previous paragraph, in certain example embodiments, the binder solution may include polypropylene carbonate or polyethylene carbonate.

In addition to the features of either or the two previous paragraphs, in certain example embodiments, the first temperature may be about 275 degrees C.

In addition to the features of any of the previous three paragraphs, in certain example embodiments, the first period of time may be between about 5 and 10 minutes.

In addition to the features of any of the previous four paragraphs, in certain example embodiments, the second period of time may be less than the first period of time.

In addition to the features of any of the previous five paragraphs, in certain example embodiments, the second period of time may be less than about 5 minutes.

In addition to the features of any of the previous six paragraphs, in certain example embodiments, the second period of time may be less than about 3 minutes.

In addition to the features of any of the previous seven paragraphs, in certain example embodiments, a ratio between the frit material and the binder solution may be about 5 to 1.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers there between.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a vacuum insulated glass (VIG) window unit, the method comprising:
providing a sealing material on, directly or indirectly, a first glass substrate and/or a second glass substrate, the material comprising at least a frit material and a binder solution;
wherein the first and second glass substrates are thermally tempered;
providing the first and second glass substrates in substantially parallel, spaced apart relation to one another, where the sealing material is provided on at least one of the glass substrates, and a gap being defined between the first and second substrates, and wherein at least a portion of the sealing material is located between the first and second glass substrates;

applying energy to the frit material so as to melt the frit material at least at a melting temperature, the melting temperature being less than about 400 degrees C., wherein after the energy is applied the first and second glass substrates are sealed to each other directly or indirectly in making the VIG window unit, and wherein the frit material is formed from a base composition comprising:

| Ingredient | Normalized Mole % |
| --- | --- |
| vanadium oxide | >=35% |
| barium oxide | 15-35% |
| zinc oxide | <=25% |
| tellurium oxide | 1-10% |
| molybdenum oxide | 1-6%, | wherein the vanadium oxide, the barium oxide, and the zinc oxide are the largest three elements making up the base composition of the frit material.

2. The method of claim 1, wherein the applying of the energy to the frit material includes: holding a temperature of the frit material at a first temperature for a first period of time; and increasing the temperature of the frit material to the melting temperature over a second period of time.

3. The method of claim 2, wherein the first period of time is greater than the second period of time.

4. The method of claim 1, wherein prior to applying the energy, a ratio between the frit material and the binder solution is about 5 to 1.

5. The method of claim 1, further comprising evacuating the gap between the first and second glass substrates to a pressure less than atmospheric pressure after a seal has been formed via at least said frit material.

6. A method of making a vacuum insulated glass (VIG) window unit, the method comprising:

providing a sealing material on, directly or indirectly, a first glass substrate and/or a second glass substrate, the sealing material comprising at least a frit material;

providing the first and second glass substrates in substantially parallel, spaced apart relation to one another, where the sealing material is provided on at least one of the first and second glass substrates, and a gap being defined between the first and second substrates, and wherein at least a portion of the sealing material is located between the first and second glass substrates;

applying energy to the frit material so as to melt the frit material at least at a melting temperature, the melting temperature being less than about 400 degrees C., wherein after the energy is applied the first and second glass substrates are sealed to each other, directly or indirectly, in making the VIG window unit, and wherein the frit material is formed from a base composition comprising:

| Ingredient | Normalized Mole % |
| --- | --- |
| vanadium oxide | >=35% |
| barium oxide | 15-35% |
| zinc oxide | <=25% |
| tellurium oxide | 1-10% |
| molybdenum oxide | 1-6%, | wherein the vanadium oxide, the barium oxide, and the zinc oxide are the largest three elements making up the base composition of the frit material.

7. The method of claim 6, wherein the applying of the energy to the frit material includes: holding a temperature of the frit material at a first temperature for a first period of time; and increasing the temperature of the frit material to the melting temperature over a second period of time.

8. The method of claim 7, wherein the first period of time is greater than the second period of time.

9. The method of claim 6, further comprising evacuating the gap between the first and second glass substrates to a pressure less than atmospheric pressure after a seal has been formed via at least said frit material.

10. The method of claim 6, wherein a plurality of spacers is provided between the first and second glass substrates.

11. The method of claim 6, wherein the first and second glass substrates are thermally tempered.

* * * * *